(12) United States Patent
Block et al.

(10) Patent No.: US 8,070,055 B2
(45) Date of Patent: Dec. 6, 2011

(54) BANKING TERMINAL THAT OPERATES TO CAUSE FINANCIAL TRANSFERS RESPONSIVE TO DATA BEARING RECORDS

(75) Inventors: James Block, North Lawrence, OH (US); Natarajan Ramachandran, Uniontown, OH (US); Ashok Modi, Canton, OH (US); Jeffrey A. Hill, Canton, OH (US); Raymond P. Motz, Massillon, OH (US); Klaus Steinbach, Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 147 days.

(21) Appl. No.: 12/387,149

(22) Filed: Apr. 27, 2009

(65) Prior Publication Data

US 2011/0266340 A9    Nov. 3, 2011

Related U.S. Application Data

(60) Continuation of application No. 11/235,837, filed on Sep. 26, 2005, now Pat. No. 7,523,856, and a continuation-in-part of application No. 10/795,761, filed on Mar. 8, 2004, now Pat. No. 7,207,477, which is a continuation-in-part of application No. 09/826,675, filed on Apr. 5, 2001, now Pat. No. 6,702,181, which is a division of application No. 09/076,051, filed on May 11, 1998, now Pat. No. 6,315,195.

(60) Provisional application No. 60/614,923, filed on Sep. 29, 2004, provisional application No. 60/082,299, filed on Apr. 17, 1998.

(51) Int. Cl.
*G06K 5/00*     (2006.01)

(52) U.S. Cl. ............... 235/380; 235/462.44; 235/472.01

(58) Field of Classification Search ............ 235/462.44, 235/462.45, 472.01, 472.02, 472.03, 379, 235/380
See application file for complete search history.

(56) References Cited

U.S. PATENT DOCUMENTS 6,702,181 B2 *   3/2004   Ramachandran ............. 235/380

* cited by examiner

*Primary Examiner* — Karl D. Frech
(74) *Attorney, Agent, or Firm* — Ralph E. Jocke; Daniel D. Wasil; Walker & Jocke

(57) ABSTRACT

A portable terminal operates to cause financial transfers responsive to data read from data bearing records in the form of user cards. The user cards include credit and/or debit cards. Data corresponding to the card data is stored in at least one memory of the terminal. The terminal includes a wireless communication device. The terminal operates to wirelessly communicate data corresponding to card data wirelessly to one or more remote computers to cause financial transfers to or from selected accounts. The terminal also operates to provide outputs corresponding to account balances and to receive data corresponding to receipts.

24 Claims, 33 Drawing Sheets

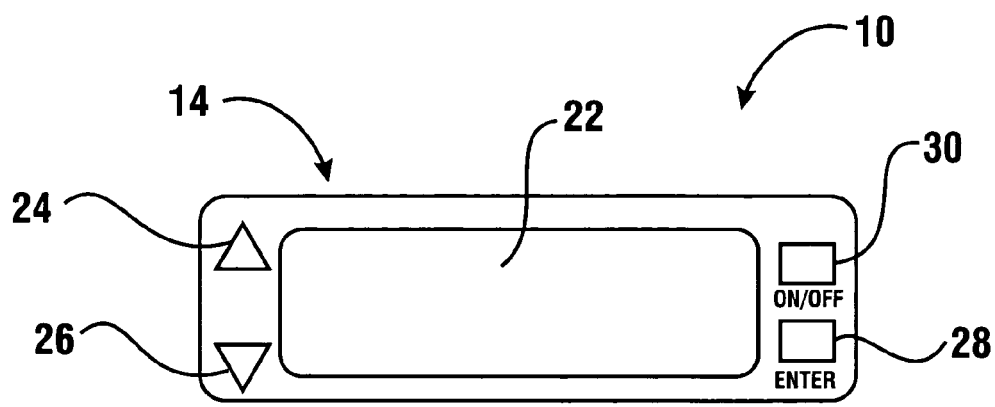
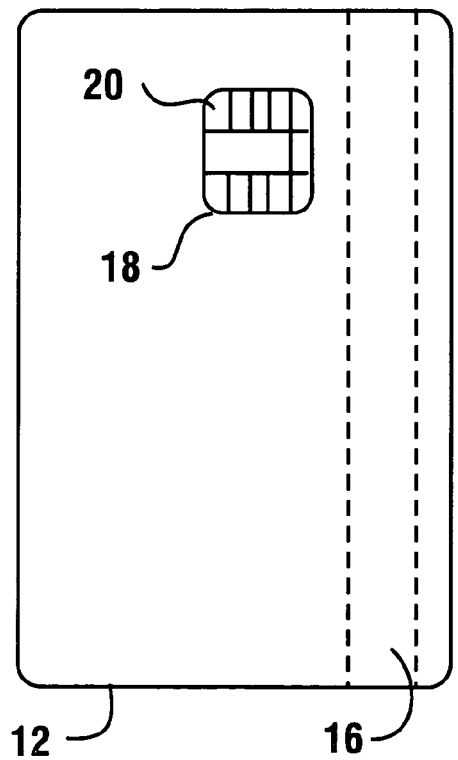
FIG. 1

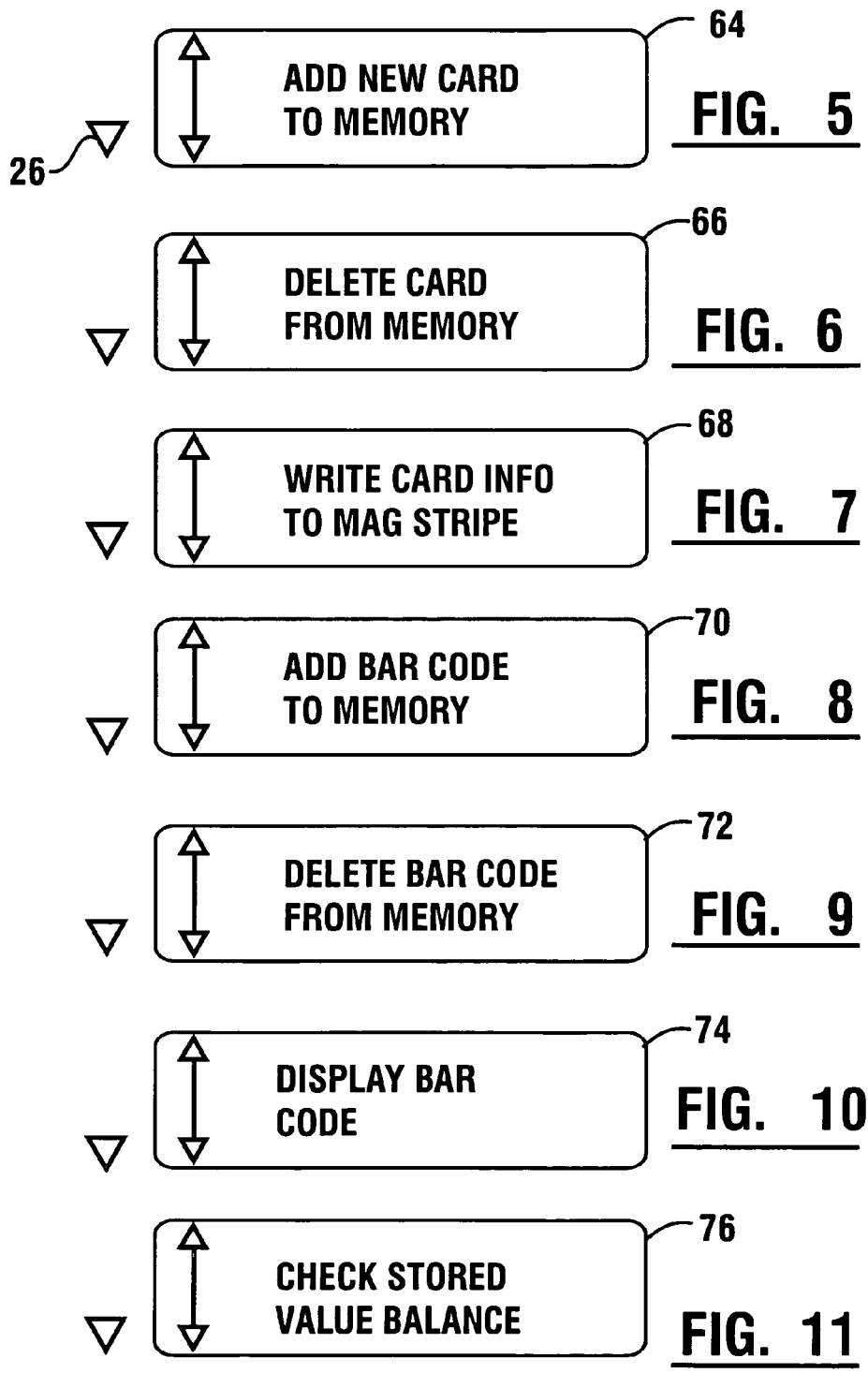

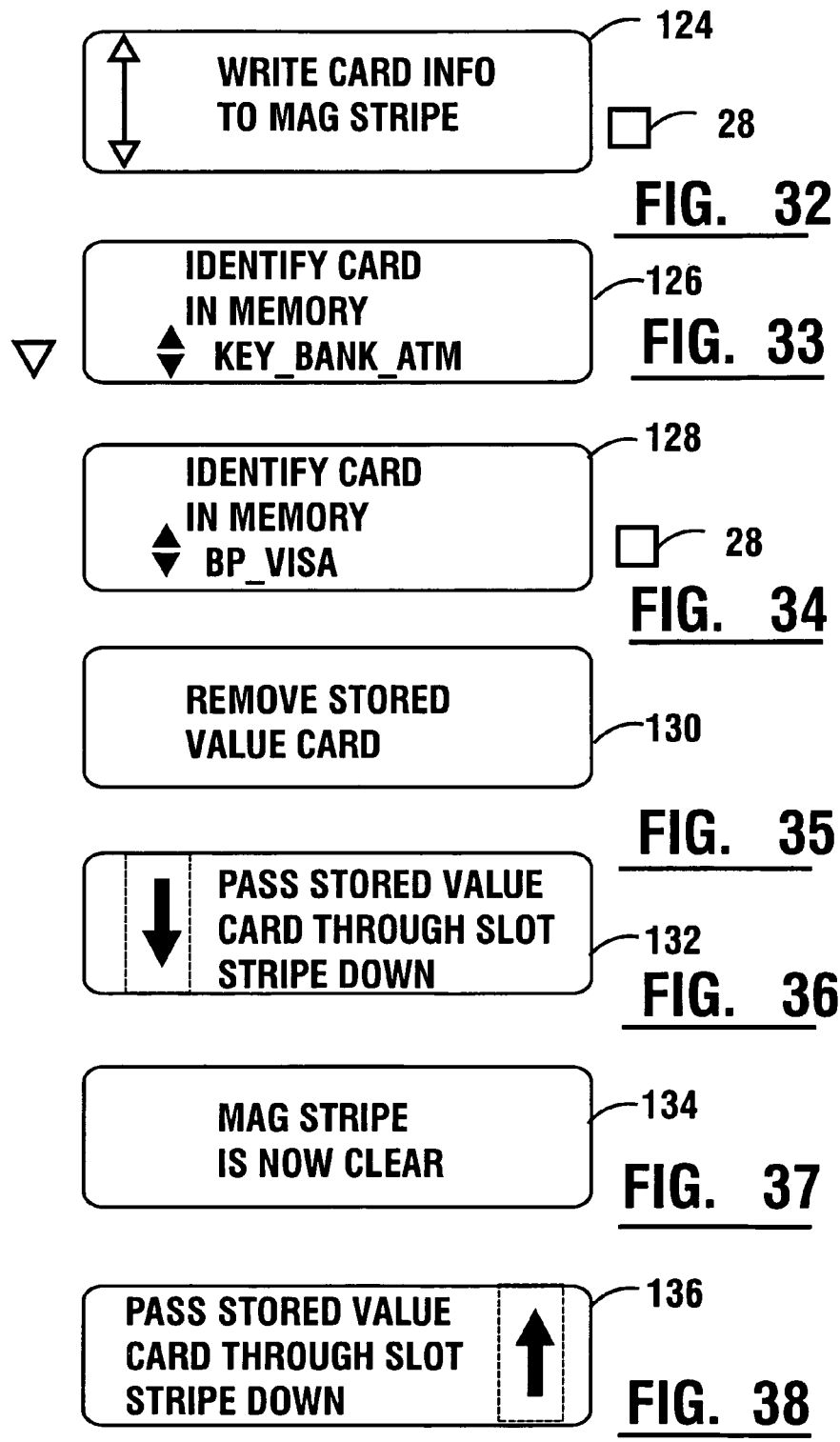

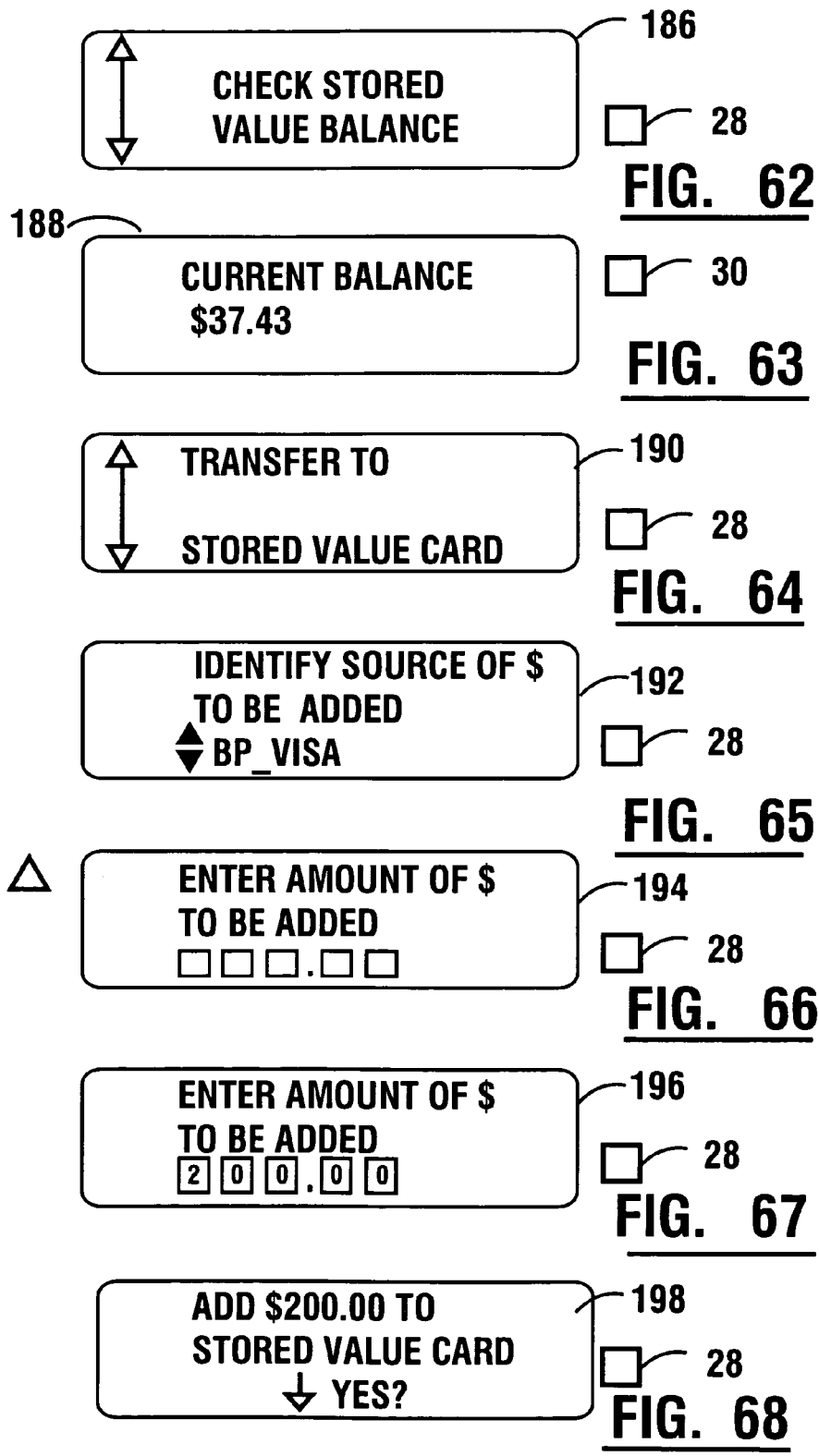

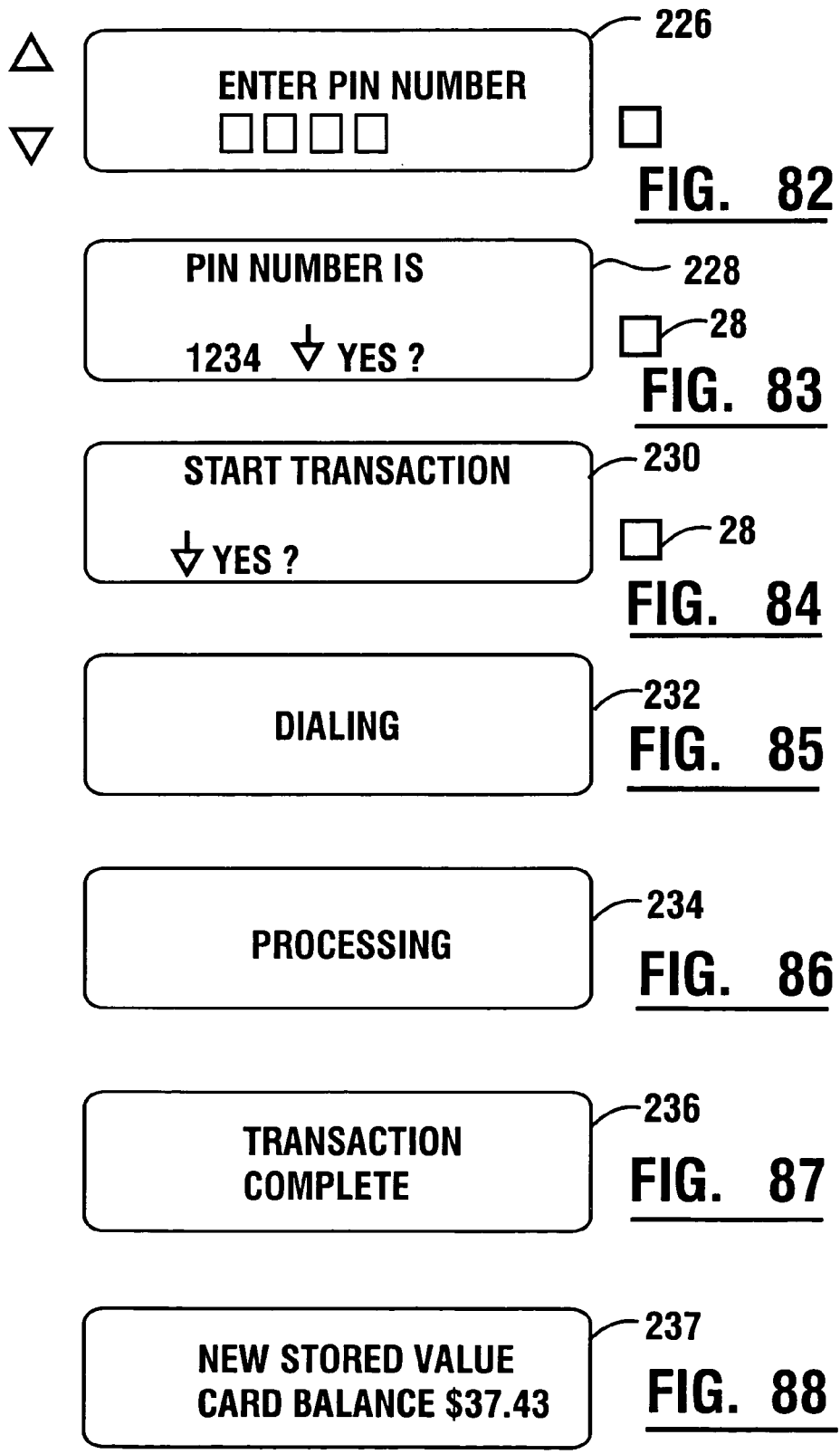

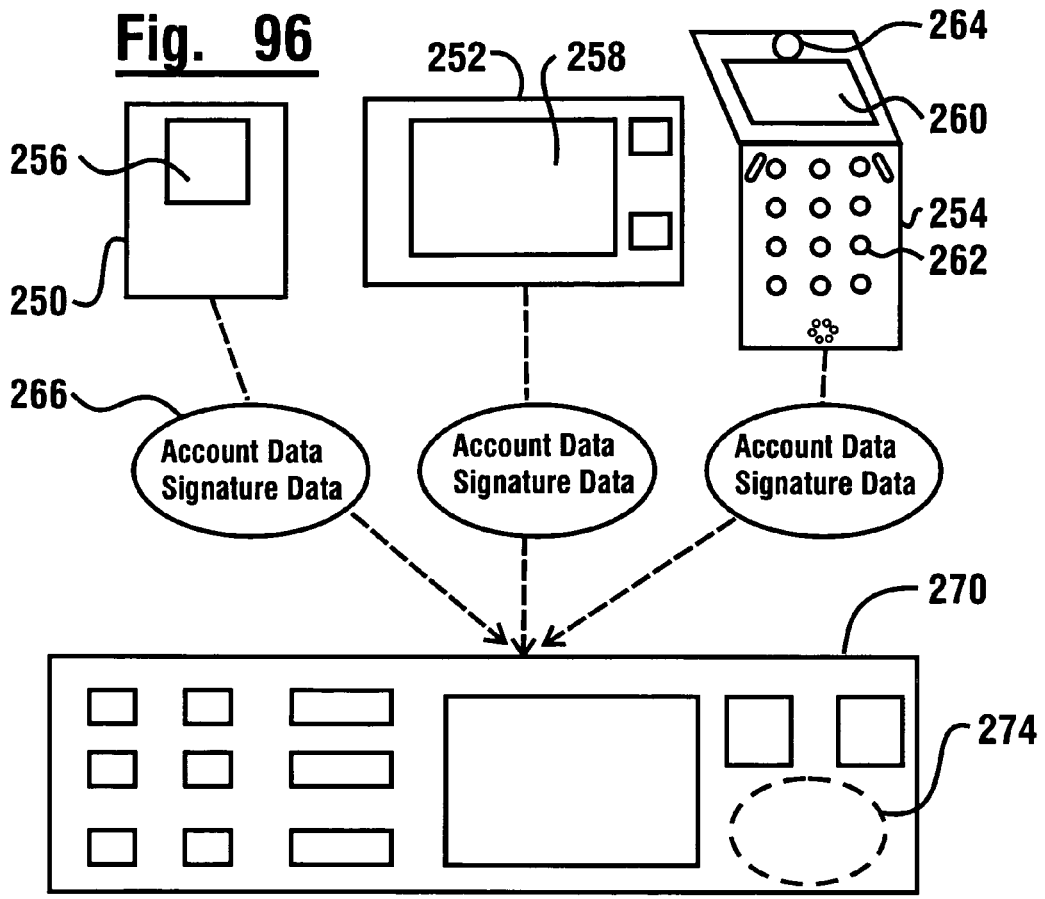
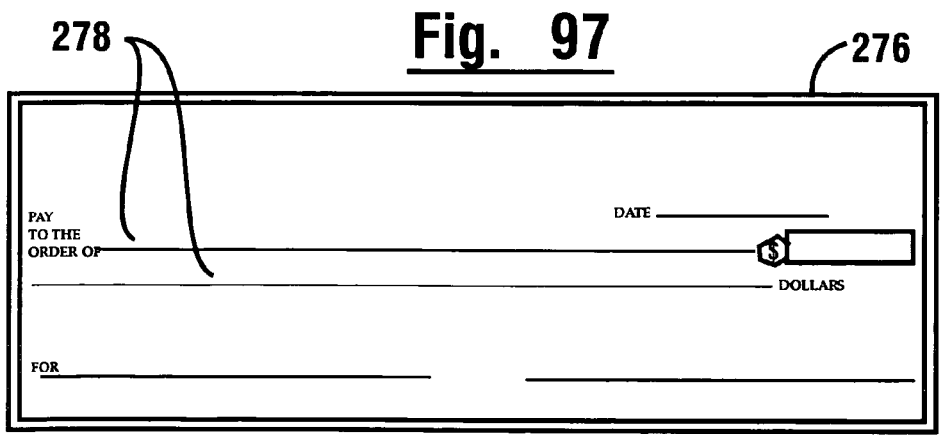

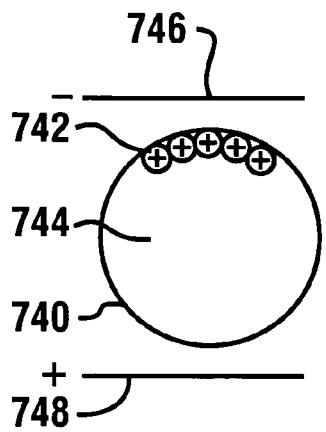
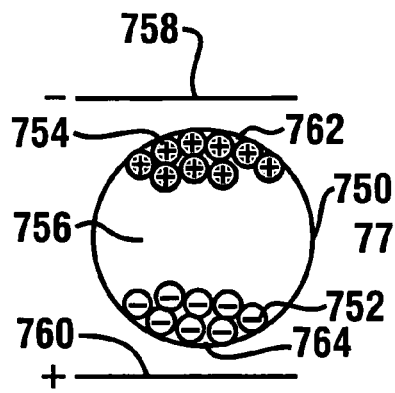
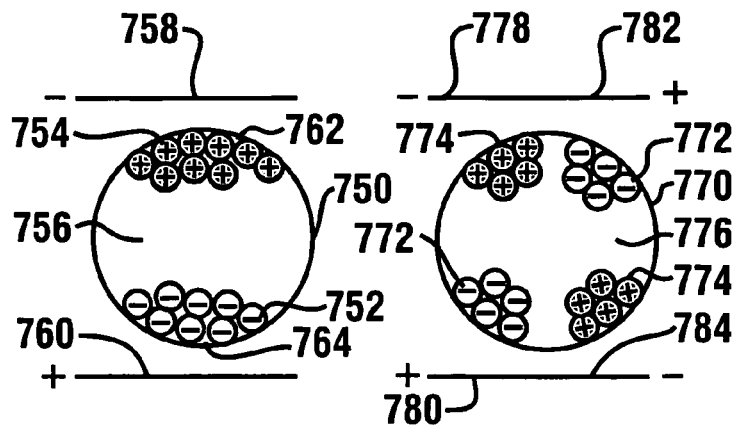
FIG. 107    FIG. 108    FIG. 109
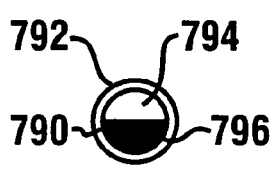
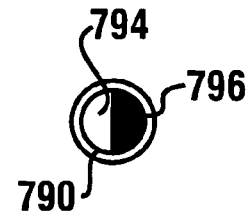
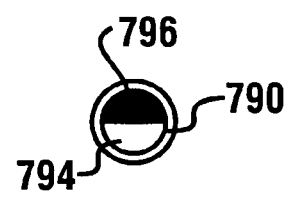
FIG. 110    FIG. 111    FIG. 112
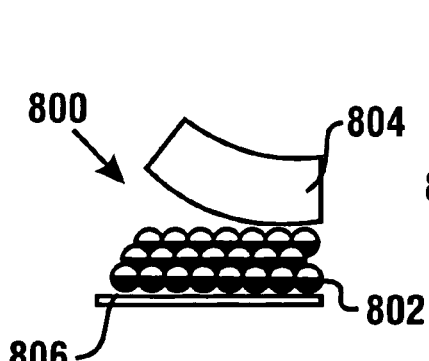
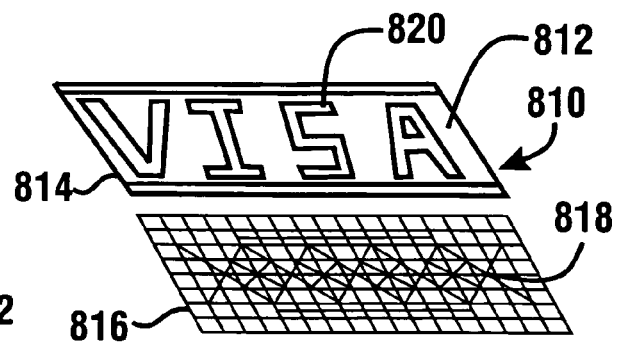
FIG. 113    FIG. 114

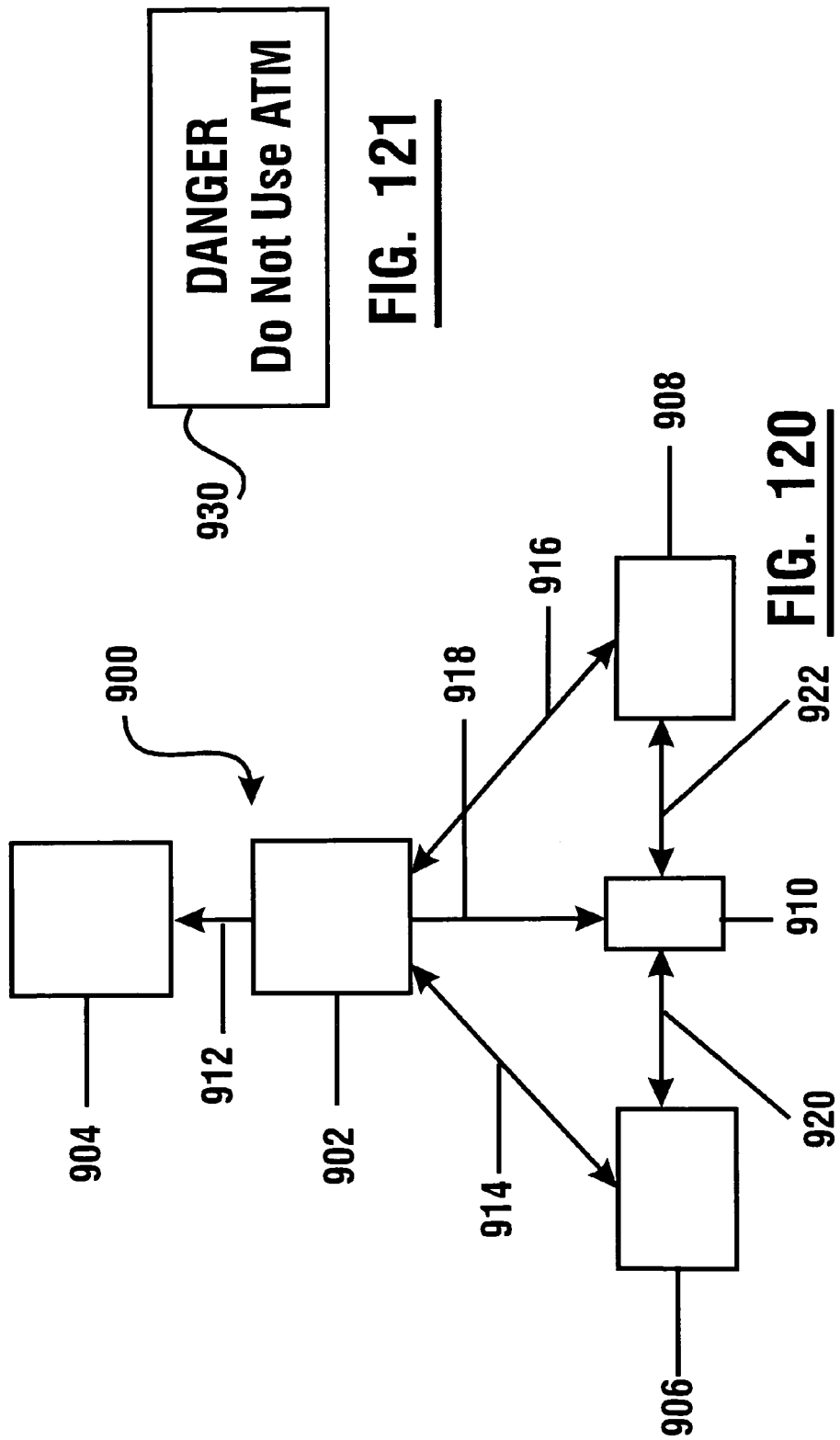

BANKING TERMINAL THAT OPERATES TO CAUSE FINANCIAL TRANSFERS RESPONSIVE TO DATA BEARING RECORDS

CROSS-REFERENCE TO RELATED APPLICATIONS

This application is a continuation application of U.S. application Ser. No. 11/235,837 filed Sep. 26, 2005. Ser. No. 11/235,837 claims benefit pursuant to 35 U.S.C. §119(e) of U.S. Provisional Application Nos. 60/614,923 filed Sep. 29, 2004. Ser. No. 11/235,837 also claims benefit pursuant to 35 U.S.C. §120 of U.S. application Ser. No. 10/795,761 filed Mar. 8, 2004, which claims benefit pursuant to 35 U.S.C. §120 of U.S. application Ser. No. 09/826,675 filed Apr. 5, 2001, which claims benefit pursuant to 35 U.S.C. §120 of U.S. application Ser. No. 09/076,051 filed May 11, 1998, which claims benefit pursuant to 35 U.S.C. §119(e) of U.S. Provisional Application No. 60/082,299 filed Apr. 17, 1998. The entire disclosures of each and all of the foregoing applications are incorporated herein by reference as if fully rewritten herein.

TECHNICAL FIELD

This invention relates to devices for conducting financial transactions responsive to data read from data bearing records which may be classified in U.S. Class 235, Subclass 379. More specifically, this invention relates to method and apparatus which enables various variable displays in an automated transaction machine environment.

BACKGROUND ART

Automated transaction machines, such as an automated banking machine, are known in the prior art. A common type of automated banking machine is an automated teller machine ("ATM"). ATMs are increasingly used by consumers to conduct banking transactions. Common banking transactions conducted by users of ATMs include deposits and cash withdrawals. Some ATMs accept deposits in the form of envelopes, checks, cash, or other items. ATMs may also be used for paying bills, transferring funds between accounts, and making balance inquiries. ATMs and other types of automated banking machines may also be used to dispense media or documents (e.g., tickets, financial checks, coupons, scrip, wagering slips, vouchers, travelers checks, gaming materials, receipts, or other items). Other types of automated banking machines may include devices which count or deliver cash, sheets, documents, or other items of value to a consumer, bank teller, service provider, or other user, as well as point of sale (POS) terminals and other terminals which enable users to carry out transactions of value. Automated banking machines are useful for carrying out transactions that include transfer of value.

Automated banking machines typically include a user interface. The user interface can be used to provide visual outputs to a user as well as to receive user inputs. A common output device for a user interface is a visual display. A display can be used to provide outputs and other information to the machine user. Many different types of displays can be used with regard to automated banking machines. The displays may be of the conventional type or of the touch screen type. A touch screen may serve as both an output device and an input device.

A common type of credit and debit cards in use today are magnetic stripe type cards. The standardized format used for such cards includes indicia on a front side of the card. Such indicia identifies the card owner, an account number, a card type, a card issuer, an expiration date as well as possibly other information. Such indicia is presented as raised letters and numbers which can be used to make an impression on a multipart carbon or carbonless form. The rear of such cards have a magnetic stripe supported thereon. The magnetic stripe includes several tracks of information. This information includes magnetic indicia representative of the information found on the front of the card as well as other information that is used in processing transactions electronically. Magnetic stripe cards are commonly used for credit card types such as MasterCard®, VISA®, Discover®, American Express®, Diner's Club® and others.

Most people also carry debit cards which allow them to access money in their checking and savings accounts using automated banking machines. Some debit cards also function as credit cards. Most debit cards in use today are magnetic stripe cards similar in format to credit cards.

Due to the convenience of using credit and debit cards most people carry several such cards in their wallet. Because of financial incentives associated with the issuance and sponsorship of credit cards, many users are offered cards by different banks, clubs, fraternal organizations and merchandising organizations. As a result it is common for people to have several different MasterCard® and VISA® accounts. This gives consumers the opportunity to take advantage of premiums such as frequent flyer miles and rebates offered by card sponsors. Having several different credit cards also enables consumers to take advantage of the credit limits on all their cards. While having many credit and debit cards is a benefit to consumers, it also requires them to carry several cards. It also exposes consumers to a greater risk if their wallet or purse, which includes all their credit and debit cards, is lost or stolen.

Most individuals also carry a number of other objects or cards which include machine readable indicia. These often include, for example, a health insurance card which indicates that a person is a member of a particular group insurance plan. Such cards are often magnetic stripe cards similar to credit cards. Alternatively such health insurance cards may include bar code indicia or other visible indicia which can be read with a scanner. Some health insurance cards include both visible and magnetic indicia. Persons who are members of a health insurance plan can identify themselves and their account to medical providers by showing their card which can be read or scanned by appropriate devices.

Persons also commonly carry other types of cards with visible or magnetic indicia. These may include for example, library cards, identification, or access cards, employee identification cards, student identification cards, driver's license cards, professional license cards and other types of cardlike objects. The magnetic or visible indicia on these cards is usually read when presented by the card holder to identify the person as an authorized user of services or facilities.

Another type of card which has been developed is the stored value card commonly referred to as a "smart card." Stored value cards are similar to credit and debit cards in construction in that they include a front side which has raised identifying indicia which can be transferred to a carbon or carbonless multipart form. Such cards also commonly include a magnetic stripe including magnetic indicia which enables the card to work like any other credit or debit card. Stored value cards also include a programmable memory mounted on the card. Such programmable memory stores data representative of cash value. The value on the stored value card can be used like cash by the bearer to purchase goods or services. The stored value data on the card is also often encrypted or stored using schemes to prevent fraud or tampering therewith.

Stored value cards, like debit and credit cards, require the customer to interact with a stationary terminal device to utilize the card. For example, in the case of credit cards, credit is obtained when the customer presents their card to a merchant. The merchant (unless they process transactions manually) utilizes a point of sale or electronic funds transfer terminal to charge an amount to the customer's account and credit the merchant's account. Similarly the use of a debit card requires that the user present their card to an automated banking machine, such as an ATM. The ATM operates to add or deduct amounts from the user's account as funds are deposited or received by the user. Similarly, stored value cards are used in connection with a stationary terminal device such as an electronic funds transfer terminal or automated banking machine which has the special capabilities to handle the particular type of stored value card used. The terminal modifies the value information stored in memory on the card to reflect the addition or subtraction of value represented thereon as transactions are conducted.

Having to use a stationary terminal device to conduct transactions is often inconvenient. Most merchants only accept certain types of credit cards. Locating an ATM that accepts the debit card of a person's financial institution can be difficult. Often the use of a "foreign" card at another bank's ATM results in a significant service charge. It is also difficult to find a merchant or ATM that can process stored value cards.

Thus there exists a need for an apparatus and method that can reduce the number of credit, debit, and other cards or card-like objects that a person must carry while still obtaining the benefit of carrying all such cards and objects individually.

There further exists a need for an apparatus and method which changes the character of the indicia on a card, such as a stored value card, so as to give a single card the ability to be used as a substitute for any one of a plurality of credit, debit, or other cards.

Finally, there further exists a need for an apparatus and method for carrying out transactions using a hand-held device that enables a user to remotely interact with a transaction terminal device, such as an automated banking machine, electronic cash register, or electronic funds transfer terminal.

DISCLOSURE OF INVENTION

It is an object of an exemplary form of the present invention to provide a novel transaction apparatus.

It is an object of an exemplary arrangement to provide a transaction apparatus which enables a user to use a single card which can be changed to conduct transactions using a plurality of the user's accounts.

It is a further object of an exemplary arrangement to provide a transaction apparatus which can be used in lieu of a plurality of credit, debit and other cards and objects.

It is a further object of an exemplary arrangement to provide a transaction apparatus that selectively displays visible indicia reproduced from a card or object, which visible indicia can be read by individuals or with a machine.

It is a further object of an exemplary arrangement to provide a transaction apparatus which can transfer value to or from a stored value card without the use of a stationary terminal device.

It is a further object of an exemplary arrangement to provide a transaction apparatus that is compact, portable and lightweight.

It is a further object of an exemplary arrangement to provide a transaction apparatus that can be configured in a manner which conforms to the shape of a conventional purse, wallet, or keyfob and which may perform the functions thereof as well as the functions associated with carrying out transactions.

It is a further object of an exemplary arrangement to provide a transaction apparatus that authorizes operation based on a physical characteristic of an authorized user.

It is a further object of an exemplary arrangement to provide a transaction apparatus which includes a rechargeable power supply.

It is a further object of an exemplary arrangement to provide a transaction apparatus that is economical to produce and easy to operate.

It is a further object of an exemplary arrangement to provide a method for storing data about a plurality of accounts held by user in a single memory carried on a card.

It is a further object of an exemplary arrangement to provide a method for accessing data corresponding to plurality of accounts from the memory on a single card and selectively transferring such data to a magnetic stripe or visual display in connection with the card.

It is a further object of an exemplary arrangement to provide a method for selectively deleting and writing indicia corresponding to any one of a plurality of selected accounts onto the magnetic stripe of a single card.

It is a further object of an exemplary arrangement to provide a method for transferring value between a plurality of accounts and the memory of a stored value card without using a stationary terminal device.

It is a further object of an exemplary arrangement to provide an apparatus and method for carrying out transactions using a portable hand-held device that enables a user to remotely interact with a transaction terminal device.

It is a further object of an exemplary arrangement to enable a portable hand-held device to wirelessly transmit account information during a transaction.

It is a further object of an exemplary arrangement to enable a portable hand-held device to wirelessly transmit account information to an electronic check generating system.

It is a further object of an exemplary arrangement to enable a portable hand-held device to capture and transmit an image of a merchandise item identifier during the purchase of the item in a self-service checkout.

It is a further object of an exemplary arrangement to enable a portable hand-held device to capture and transmit an image of an automated banking machine identifier during a self-service cash withdrawal transaction.

It is a further object of an exemplary arrangement to provide an apparatus and method for accessing data corresponding to one of a plurality of accounts stored in the memory of a single card, where the accessed card data can be selectively used to modify both the magnetic stripe and the appearance of the card. Thus, both the external image of the card and the magnetic stripe data can correspond to the same account selected from the card memory.

Further objects of exemplary arrangements will be made apparent in the following Best Mode for Carrying Out Invention and the appended claims.

The foregoing objects are accomplished in an exemplary embodiment by an apparatus which includes a card which is of a type which includes a magnetic stripe supported thereon. The magnetic stripe may be of a conventional configuration and capable of having magnetic indicia recorded or written thereon. The card also includes a programmable memory which is supported on the card. The programmable memory preferably includes data representative of a plurality of accounts which the user has, such as various credit card accounts, debit card accounts and other accounts.

The apparatus further includes a portable terminal. The portable terminal is preferably sufficiently small so as to be readily portable. The terminal may be incorporated into a wallet, purse or keyfob. The portable terminal is releasably engageable with the card and includes a memory reading device which is operative to read the account data from the memory on the card. The portable terminal also includes an input device which enables the user to select data from the card memory corresponding to any one of the plurality of the user's accounts. The portable terminal preferably further includes a magnetic writing device which enables the user to write magnetic indicia corresponding to a selected account in the programmable memory to the magnetic stripe on the card. This enables the user to use the card in place of the dedicated credit card for that particular account. The portable terminal further preferably includes a magnetic stripe erasing device which enables the user to erase the indicia from the magnetic stripe so that the user may subsequently write data corresponding to a different account to the magnetic stripe when desired.

The card memory may further include data representative of a stored amount. This amount represents a monetary value which the user may use as a cash substitute. The portable terminal device preferably includes a communications device which enables the user to make the transfers between the accounts for which data is held in memory and the monetary amount stored on the card. In addition the monetary amount stored on the card may be transferred using stationary terminals such as ATMs and point of sale terminals which have stored value card capabilities.

The card memory may further include data representative of visual indicia which are found on a plurality of cards or other objects associated with the user. The visible indicia may include for example, bar code indicia representative of a user's account with a group health plan. Alternatively such visible indicia may include bar code or other indicia associated with a student I.D., employee access card, driver's license, or other types of objects. The visible indicia may also include a reproduction of the user's signature or other identifying characteristics. The portable terminal may include a display upon which the stored visible indicia may be reproduced in response to inputs to an input device. This enables visible indicia to be read with a machine from the display, which serves as a substitute for scanning off the card or object which the user is no longer required to carry. The card memory may also include data representative of icons or other graphics as well as data representative of instructions which are used by a processor in the portable terminal for carrying out transactions.

In some embodiments the portable terminal may further include object reading devices such as a magnetic stripe reader and a bar code scanner. Such devices are used to read magnetic indicia from the original credit and debit cards, and to enable transfer of such information for storage in the programmable memory of an exemplary card. Similarly, the object reader in the form of a scanner may read the visible indicia such as a bar code from an object so that such indicia may be stored in the memory on the card. The input device of the exemplary terminal is used to input designators which are stored in correlated relation with the data which corresponds to the various types of magnetic stripes and bar codes. The memory on the card may further include data representative of an access code as well as instructions to minimize the risk that an unauthorized user may gain access to the data stored in memory. Alternatively, the card memory may further include data uniquely associated with the user such as fingerprint data or other biometric data. The terminal may include a reader for reading such data to assure that the user is the person authorized to use the card.

An exemplary arrangement enables a user to carry a single card which the user may use in lieu of a plurality of cards or other objects which the user would otherwise be required to carry. The exemplary arrangement further enables a user to transfer amounts between a stored value card and their various accounts without having to use a stationary terminal such as a point of sale terminal or an automated banking machine.

BRIEF DESCRIPTION OF DRAWINGS

FIG. 1 shows a top plan view of an exemplary form of a transaction apparatus including a multifunction card and a portable terminal.

FIGS. 5-14 show views of exemplary function selection screens through which a user may select functions to be executed using the transaction apparatus.

FIGS. 32-42 show screens displayed on the portable terminal and associated with the logic flow for writing selected card information to the magnetic stripe of the multifunction card.

FIGS. 62 and 63 show screens displayed on the portable terminal and associated with the logic flow for checking the stored cash value represented by the data stored in the programmable memory on the multifunction card.

FIGS. 64-74 show screens displayed on the portable terminal and associated with the logic flow for transferring cash value to the programmable memory on the multifunction card.

FIGS. 75-88 show screens displayed on the portable terminal and associated with the logic flow for transferring value from the programmable memory on the multifunction card to a selected user account.

FIG. 96 shows an electronic check-generating arrangement.

FIG. 97 shows an example of an electronic check format prior to adding entries.

FIG. 107 shows an electronic ink microcapsule containing white chips and liquid.

FIG. 108 shows an arrangement of white chips and black chips in a microcapsule including a clear liquid.

FIG. 109 shows another arrangement of white chips and black chips in a microcapsule containing a clear liquid.

FIG. 110 shows a bichromal bead in a first position in a cavity.

FIG. 111 shows the bead of FIG. 110 in a second position.

FIG. 112 shows the bead of FIG. 110 in a third orientation.

FIG. 113 shows a sheet including two-tone beads.

FIG. 114 shows portions of an electronic ink display arrangement.

FIG. 120 shows an arrangement of automated banking machine components and their connections.

FIG. 121 shows an electronic ink display module displaying a warning.

BEST MODE FOR CARRYING OUT INVENTION

Figure 2:
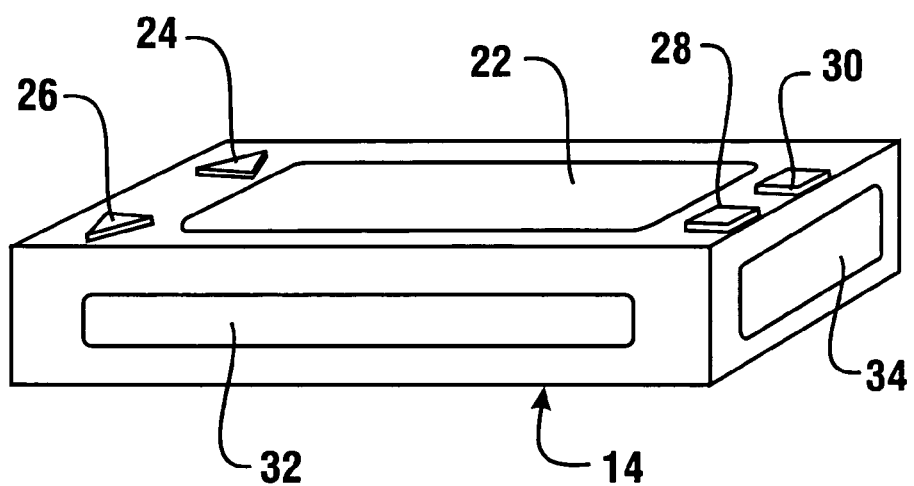
FIG. 2 shows an isometric view of the portable terminal of the type shown in FIG. 1.

Referring now to the drawings and particularly to FIG. 1 there is shown therein a transaction apparatus of an exemplary embodiment, generally indicated 10. The apparatus includes a multifunction card 12 and a portable terminal 14. The exemplary portable terminal and multifunction card are releasably engageable in a manner later discussed to enable carrying out a plurality of functions and transactions.

The multifunction card 12 may have the dimensional configuration of conventional credit and debit cards. It includes a magnetic stripe 16 on a rear face thereof. The magnetic stripe is capable of holding magnetic indicia similar to the magnetic stripes on conventional debit, credit and similar cards. Like the stripes on such cards, magnetic stripe 16 is also preferably capable of having the magnetic indicia thereon erased with an erase head or similar device, and having new indicia recorded or written thereon.

Multifunction card 12 further includes a programmable memory 18 supported thereon. Programmable memory 18 includes a plurality of electrical or other contacts 20 which are accessible on the front of the card. In the exemplary embodiment the card and programmable memory are a type and configuration such as is commercially available from a number of suppliers including Diebold, Incorporated, the Assignee of the present invention. The contacts 20 and the magnetic stripe 16 are positioned in predetermined locations on the card to enable the card to be used with a variety of devices. Of course in other embodiments, nonconventional orientations and configurations of the magnetic stripe and the programmable memory contacts may be used.

As later explained, multifunction card 12 is designed to be used as a substitute for a plurality of varied types of credit, debit and other cards. However in some embodiments, card 12 may include information on the face or rear thereof so as to identify the particular user to whom the card belongs, an issuer of the card, as well as other data. In some embodiments, the front side of the card may include raised numbers and letters corresponding to a particular credit card account and from which an impression may be made onto a carbon or carbonless form. For example information on the face of the card may correspond to a user's MasterCard®, VISA®, American Express®, Discover®, Novus®, Diner's Club® or other card. This enables the exemplary multifunction card to be used as the user's regular credit card when purchasing goods or services in establishments that do manual processing of credit card transactions. Of course while in the embodiment discussed, conventional credit card indicia may be included on the front of the multifunction card, in other embodiments special indicia may be presented on the card.

Portable terminal 14 includes a display 22 on the front face thereof. In one exemplary arrangement the display 22 is an LCD type display or other suitable display that may be used for displaying words, graphics and other visible indicia in a manner later explained. Portable terminal 14 further includes at least one input device that may be used to input information by a user. In the embodiment shown, the input device includes a manual input device which consists of a plurality of buttons. These buttons include a scroll up button 24 and a scroll down button 26. These scroll up and scroll down buttons 24, 26 which may be referred to hereafter as "up button" and "down button" respectively, are pressed by a user to selectively display items on the display.

The input device of the terminal further includes an enter button 28. The enter button is used in a manner later explained to initiate execution of a function corresponding to the information displayed on display 22. Terminal 14 further includes an on/off button 30. Button 30 is preferably used in the manner later explained to initiate a transaction or to signify completion of a transaction and to turn the terminal off. It should be understood that the input device comprising manual input buttons 24, 26, 28 and 30 are exemplary only and that other embodiments may incorporate other arrangements of manual and other types of input devices.

As shown in FIG. 2 portable terminal 14 further includes a slot 32. Slot 32 extends through the body of the terminal and is sized to enable multifunction card 12 to be passed therethrough. An exemplary form of the portable terminal includes an external object reading device 34 positioned on the exterior of the terminal body. In an exemplary form the external object reading device may include a bar code reader which enables reading bar code off of cards and other objects so that information corresponding to such visible indicia may be read and stored in the memory of the multifunction card.

Figure 4:
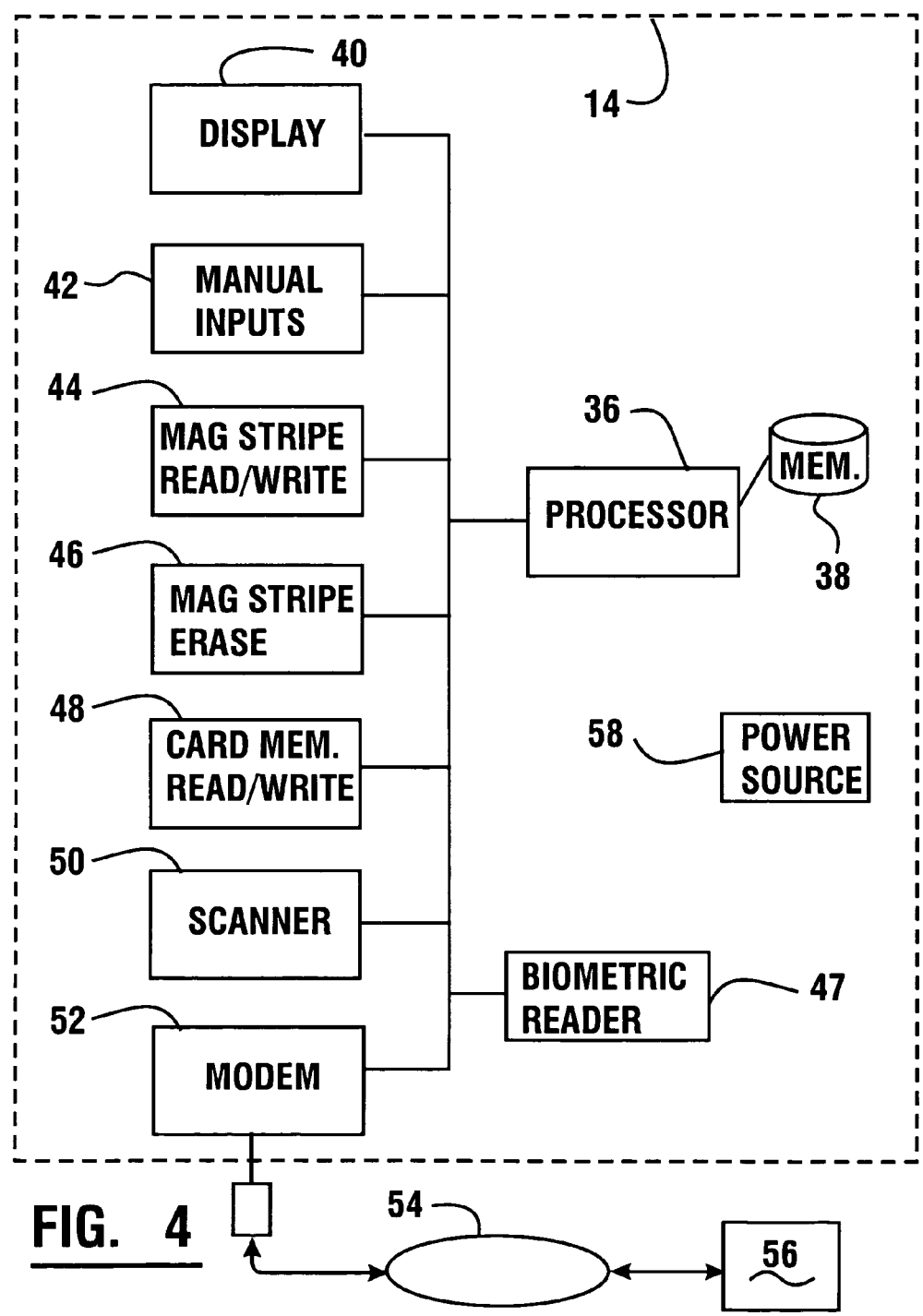
FIG. 4 shows a schematic view of the components of the portable terminal as well as a system through which the portable terminal communicates.

The components which comprise an exemplary embodiment of the portable terminal 14 are schematically indicated in FIG. 4. Terminal 14 includes at least one onboard processor 36 which is in operative connection with the other components of the portable terminal. Processor 36 is also in connection with at least one data store or memory 38. Memory 38 may be a volatile or nonvolatile memory which is capable of holding and recovering data which is received from or delivered to the processor 36.

Processor 36 is in operative connection with other components within the portable terminal 14. These components are represented schematically in FIG. 4 and are indicative of hardware and software components operatively connected with the processor. These components include the display component 40. Display component 40 includes display 22 as well as the other hardware and software devices which enable the display to provide visual outputs in response to processor 36. A manual input component 42 corresponds to a manual input device which in the described exemplary form of the terminal includes buttons 24, 26, 28 and 30. Component 42 includes the hardware and software which enables communicating the inputs from the user through the buttons to the processor so that the processor may carry out the functions of the portable terminal in response thereto.

Portable terminal 14 further includes a magnetic stripe read and write component 44. In an exemplary arrangement this component includes magnetic heads which are selectively operated to read magnetic indicia from the stripe of a card as well as to write magnetic indicia thereto. It should be understood while component 44 shows these functions as combined, it actually represents two separate functions. These are the functions of reading magnetic indicia from a card and writing magnetic indicia to a card stripe. These functions may be separate in other embodiments. Component 44 includes the necessary hardware and software interfaces to the processor 36 to carry out these functions in a manner later discussed. A magnetic stripe erase component 46 is further indicated schematically as part of the portable terminal FIG. 4. This magnetic stripe erase component includes an erase head or other comparable device as well as the hardware and software devices that may be used to selectively erase or otherwise clear magnetic indicia from the magnetic stripe of the multifunction card. In some embodiments the magnetic stripe erase component may be combined with the components which function to read and write indicia to the magnetic stripe of cards. In an exemplary form the heads, which operate to read, write and erase magnetic stripe indicia from credit cards are positioned in the interior of terminal 14 and adjacent to slot 32. This enables the reading, writing and erasing functions to be carried out as a card is passed manually therethrough. It should be understood however that in other embodiments other methods may be provided for reading, writing and erasing magnetic stripe data.

As shown in FIG. 4 portable terminal 14 further includes a card memory read/write component 48. Component 48 serves to read and write data to the programmable memory 18 on multifunction card 12. In the embodiment shown, the memory reading and writing functions are combined. However it should be understood that these are separate functions and may be carried out through separate arrangements of hardware and software. Component 48 also includes electrical contacts which are positioned adjacent to slot 32 in the portable terminal. These electrical contacts are configured to engage the contacts 20 which enable communication with the programmable memory 18 of the multifunction card 12. Component 48 further includes the hardware and software devices required to read data from and write data into the programmable memory on the card.

Portable terminal 14 in the embodiment shown includes a scanner component 50. Scanner component 50 includes bar code scanner 34 or similar device for reading visible indicia from an object. Component 50 further includes the hardware and software devices necessary to communicate with processor 36 and the other components of the portable terminal. It should be understood that while the embodiment of the portable terminal shown includes object reading devices for reading magnetic stripe indicia, visual indicia and indicia stored in the programmable memory of cards, other embodiments may include other types of object reading devices. Likewise other types of object writing devices may be included depending on the particular uses made of the portable terminal.

For example in some embodiments scanner 50 may be a scanner suitable for scanning and reading written indicia. This may include the signature of an authorized user. Data representative of such a signature may be input and produced with the scanning device and stored in the programmable memory of the card. The signature may then be reproduced on the display or transmitted to a remote location for purposes of identifying the authorized user or the authenticity of a transaction.

Alternative embodiments may include a biometric reader component 47. The biometric reader component may include hardware and software components that can be used to sense a characteristic of a user which uniquely identifies the person as an authorized user. In some embodiments the biometric reader component 47 may include a fingerprint reading device. Alternatively, the reader may include an audio input device which can be used to identify a user by voice. Alternatively, visual readers for identifying unique visible features, or a combination of identifying features of the user may be used. The programmable memory of the card may include data representative of the identifying biometric features of the authorized user or users. This stored data is used to enable authorized users of the card to operate the terminal with the card while others are prevented from such operation.

Terminal 14 in the embodiment shown includes a communications component 52. Communications component 52 may include a modem or other communications devices that are selectively operative under the control of the processor to communicate with other systems and devices located outside and preferably remote from the portable terminal. In some embodiments the communications component 52 may include a connector for communicating through a network 54 to a computer or similar device at a remote location, schematically indicated 56. A connection to the remote location may be selectively made based on an address which is used by the communications component 52 to selectively communicate to the desired remote location.

In one arrangement the communications component includes a wireless type modem. In such an embodiment network 54 includes a cellular phone network which enables communicating to a transaction network. This is done through computers located at one or more remote addresses which are accessed via a phone number which serves as the address. Alternatively communications component 52 may communicate through a conventional telephone access port which includes a telephone connector on the body of the portable terminal. In other embodiments the communications network 54 may include communications intranets or public networks such as the internet, which selectively enable communication by the portable terminal to selected nodes in the network. In such environments the addresses to which the portable terminal communicates are the addresses of the network nodes which may properly receive transaction messages.

As shown in FIG. 4 the portable terminal includes a power source schematically indicated 58. Power source 58 may include any suitable source of power for the components in the portable terminal. Suitable power sources may include rechargeable or nonrechargeable batteries or connectors to external power sources such as the cigarette lighter of a vehicle. The power source 58 may further include a renewable energy source, such as a solar panel 60 which may be used to provide energy from the sun or other available light source.

Figure 3:
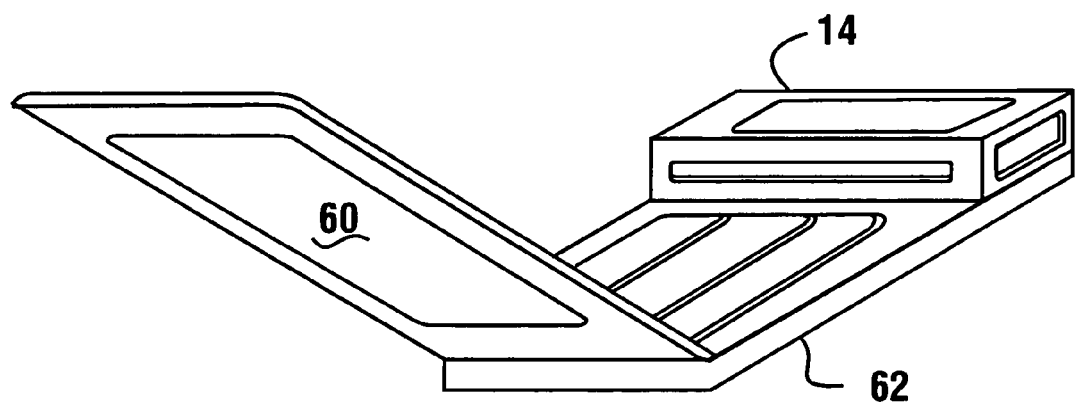
FIG. 3 shows an isometric view of the portable terminal shown in FIG. 2 in combination with a wallet structure.

As shown in FIG. 3 portable terminal 14 may be integrated into a carrier 62 which may take the form of a wallet such as that shown in FIG. 3. Alternatively the carrier may be of a type which performs other functions such as those of a purse, personal digital assistant, notebook computer, keyfob, pager, cellular phone or other component carried by a user. As demonstrated by the carrier 62 shown in FIG. 3, the portable terminal 14 may be integrated into a wallet type device which includes spaces for holding the multifunction card as well as other credit cards and identification cards. The carrier may further include spaces for holding cash, keys and other items in a manner of a conventional wallet. Similarly the carrier 62 may include a supporting surface for the solar panel 60 as well as other features and components which may be desired by a user. The small size and portability of the terminal 14 of the exemplary embodiment enables it to be integrated into any one of a plurality of carrier type devices while still enabling such devices to carry out their traditional and/or nontraditional functions.

In an exemplary arrangement the portable terminal 14 operates to perform a plurality of functions. These functions are carried out based on instructions which may be included in whole or in part in the programmable memory 18 of the multifunction card 12. The processor 36 of the portable terminal 14 carries out instruction steps in response to the inputs provided by the user of the card and portable terminal. In some embodiments, the memory 38 in connection with the portable terminal may also include certain programmed instructions which are permanently stored therein so as to facilitate certain operations of the terminal. The programmable memory on the card may also include the data representative of accounts, indicia, access codes, monetary values, graphics, location data and other information which is used in the operation of the apparatus.

In an exemplary embodiment, the functions which are enabled to be executed include adding a new card to the memory. This is accomplished by reading information off of a magnetic stripe of an existing dedicated card with the portable terminal and storing it in the programmable memory of the multifunction card. This information can be recovered later and the magnetic indicia written on the magnetic stripe of the multifunction card.

Another function executed in an exemplary embodiment is to selectively delete card data from the memory on the card. This could be done for example when a user no longer desires to use the multifunction card as a substitute for the dedicated card.

Another exemplary function or embodiment includes writing the indicia stored in the memory of the magnetic stripe card onto the magnetic stripe of the multifunction card or perhaps another magnetic stripe card.

Another function which is carried out in an exemplary embodiment is to add visual indicia such as a bar code to the memory of the multifunction card. Likewise, another function is to delete a bar code or other visual indicia stored in the card memory. A further function is to display one of the selected visual indicia such as a bar code or a user's signature which is stored in the memory of the card.

Other functions of embodiments can include carrying out financial transactions without the need to use a stationary terminal. Such functions include checking the cash equivalent value stored in the memory of the multifunction card. Another transaction is to transfer value stored in the memory of the multifunction card to another account. The transfer of funds from an account to the programmable memory on the multifunction card so that it can be used as a cash equivalent therefrom is a further transaction which may be carried out by these embodiments.

Figure 95:

The various functions which the described embodiments of the transaction apparatus may carry out and the logic associated therewith are now explained with reference to FIGS. 5-95 which disclose transaction steps carried out by a user in executing the various functions. In the form described, the programmable memory 18 on the card includes data representative of prompt messages. When the multifunction card 12 is extended in the terminal so that the contacts 20 thereon can be read by the connectors of the card memory read/write component 48, the stored instructions which include the prompt messages and the associated logic may be read. The processor 36 then operates the display component 40 to selectively display prompt messages on the display 22 of the terminal 14.

In an exemplary arrangement, security measures are provided to assure that only a proper authorized user is enabled to operate the system. This may be accomplished by requiring a user to input an access code which is known only to them before the terminal functions may be accessed. This access code may be programmed in the programmable memory 18 using a separate terminal device. Alternatively provisions may be made for executing a software program which enables the user to select their access code the first time that the multifunction card is used in connection with the portable terminal. This program may be stored in the memory of the terminal or on the card. In alternative embodiments the card holds biometric data related to authorized users. The biometric data of a user is input through the biometric reader 47. For example, when the reader 47 includes a fingerprint reader a user may place a predetermined finger adjacent to the reader. If the input data corresponds to an authorized user, the terminal may be operated. In some embodiments the user may scan a single fingerprint to gain access. The particular finger selected may be one chosen by and known only to the user. In other embodiments a plurality of fingerprints from one or both hands, may need to be read in a selected order. This may increase the security level.

One form of the logic flow associated with assuring that an authorized user uses an apparatus of the invention is demonstrated with reference to FIGS. 89-95. In initiating the operation of the terminal the user is first required to place the multifunction card 12 in the slot 32 of the portable terminal 14. The card is preferably inserted into the slot in a manner which enables the electrical connectors associated with component 48 to engage the contacts 20 on the card. The slot corresponds closely to the width of the card and serves as a guide for positioning the card as it is passed therethrough. A spring loaded finger or other releasable stop may be positioned adjacent the slot to stop the card at the proper depth inside the terminal to engage the contacts. The user preferably knows how to insert the card into the slot in order to achieve this connection based on experience. Alternatively, instructions printed on the face of the card and/or the terminal may instruct the user in how to insert the card. The memory 38 in the terminal 14 may also include data representative of prompts which are displayed on the screen 22 which instruct the user on how to properly insert the multifunction card.

Figure 89:
FIGS. 89-95 show screens displayed on the portable terminal and associated with the logic flow for assuring that a user is authorized to use the terminal.
Figure 90:
Figure 91:

For purposes of this example, the sign on process for a user preferably begins with the display screen 100 shown in FIG. 89. Screen 100 is a blank screen which indicates that the terminal is off. When the user presses the on/off button 30, a screen 102 as shown in FIG. 90 is displayed. Screen 102 preferably includes a prompt which instructs the user to enter their access code.

Figure 92:
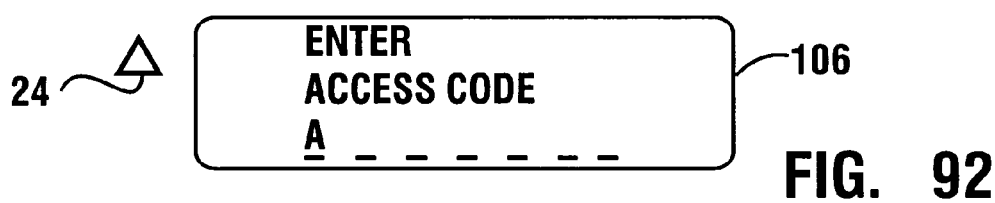
Figure 93:

The entry of the user's personal access code is demonstrated in FIGS. 91-94. In entering the access code of the embodiment shown, the user starts with a screen 104 shown in FIG. 91. Screen 104 includes seven spaces in which the user may input alphabetical or numerical characters which make up the access code. Pressing the up button 24 when screen 104 is displayed begins a scrolling process in the first space for input of the access code. This causes the screen to change the first space from a blank space to the letter "a." This is shown in FIG. 92 and is represented by a screen 106. Pressing the up button 24 again (or continuing to hold it) changes the first character to the letter "b" as indicated by a screen 108 in FIG. 93. The user may move to subsequent letters by holding or repeatedly pushing the up button, thus scrolling through the alphabet and/or numerical values until the desired first character of the access code is displayed in the first space. Of course the user may scroll backwards by pushing the down button. In this example the letter "b" is the first character of the user's access code and the user indicates that fact by pressing the enter button 28 as schematically indicated in FIG. 93.

After the first character is entered, the user selects the second character of the access code in a similar manner. This is again done by selectively pressing the up and down buttons 24 and 26 until the desired alphabetical or numerical character is displayed in the second space. Once the desired character is displayed in the second space the user presses the enter button 28 to move to the next character. This is represented by screen 110 in FIG. 94. In the embodiment shown the user may enter up to seven characters as the access code. However in the exemplary embodiment the user may not require seven characters and may simply choose to leave certain characters as blanks. In the embodiment shown the user's access code is the five letter word "broom" and the two final characters are simply left blank. After the user indicates this by pressing the enter button 28 to leave blanks for the last two characters, a screen 112 shown in FIG. 95 is displayed.

In screen 112 the user is given the option of either changing their access code or proceeding to a main menu. The user may select the option of changing their access code by pressing the up button 24. This will lead the user through a series of prompt screens to enter a new access code. This series of prompt screens may lead the user through appropriate steps in accordance with the instructions stored in the memory on the card or in the terminal so as to enter a new code. In alternative embodiments, a biometric identifier may be used as an access code. In such a system the user would be prompted through the display 40 to input identifying biometric data to the biometric reader 47. For example, if the biometric reader is a fingerprint reader, the user may be prompted to bring a finger that they have preselected adjacent to the reader. The reader 47 would read the fingerprint and produce suitable signals to compare the input data to the data stored on the card. If the input data corresponds to an authorized user, the user is authorized to further operate the terminal. The user may be given the option to change the biometric data, such as to add data for another authorized user, or to change the finger used for providing fingerprint data in the accessing process or to use a sequence of fingerprints to obtain access.

Alternative embodiments may use other processes and criteria to access the card data. Once the user has properly gained access they may be given the option of changing the access code or other sign on procedures. For purposes of this example however the user chooses the option of displaying a main menu which is selected by pressing the down button 26 as indicated schematically in FIG. 95.

The prompt messages in FIGS. 5-13 represent a main menu showing the various transactions that can be conducted with the apparatus. FIG. 5 shows a screen 64 which includes a prompt which queries a user as to whether they wish to add a new card to the memory on the multifunction card. In the embodiment shown the fact that additional options are available by scrolling up or scrolling down are indicated by a dual pointed arrow adjacent to the text displayed. By pressing the down button 26 as indicated schematically, the user may move to screen 66 shown in FIG. 6. This screen indicates the availability of the selection of the transaction to delete a card from memory. Pressing the down button again causes the display of the terminal to provide the screen 68 shown in FIG. 7. This screen provides a prompt corresponding to the transaction in which data stored in the programmable memory of the multifunction card is written to a magnetic stripe.

Scrolling with the down button 26 from screen 68 causes screen 70 in FIG. 8 to be displayed. Screen 70 includes a prompt corresponding to a transaction in which bar code is added to the programmable memory of the multifunction card. FIG. 9 discloses a screen 72 which may be displayed by scrolling with the down button from screen 70. Screen 72 corresponds to deleting a bar code from the memory on the multifunction card. Screen 74 shown in FIG. 10 includes a prompt to the user which enables selection of a transaction in which bar codes stored in the memory may be displayed.

Figures 12, 13, 14:
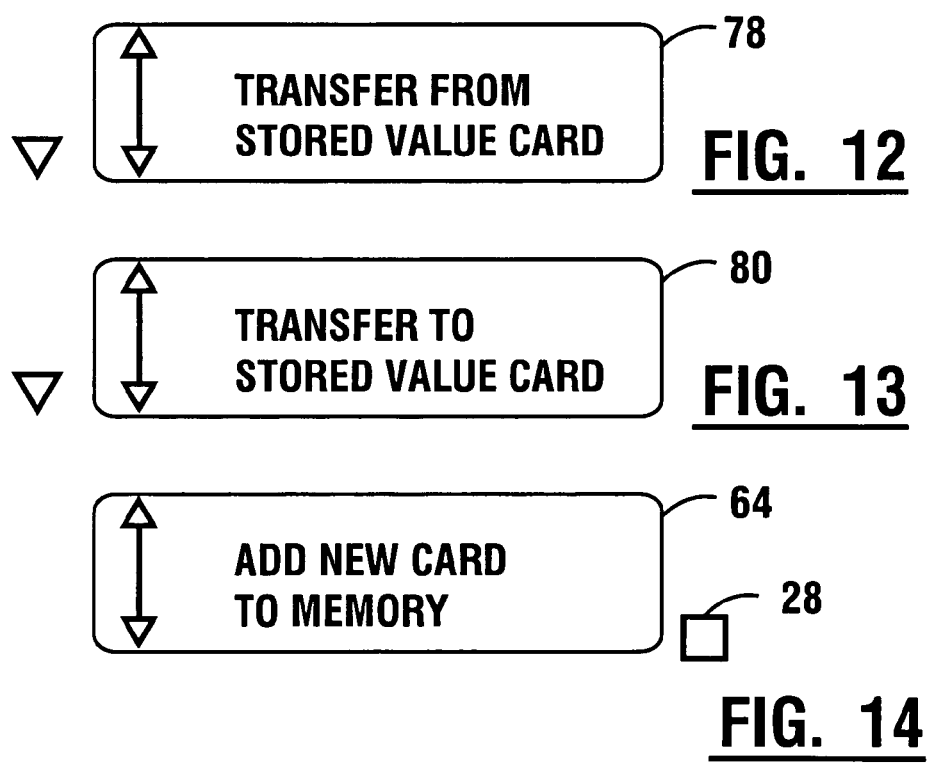

FIG. 11 shows a screen 76 which includes a prompt which corresponds to a transaction in which a user may check the cash value represented by data stored on the programmable memory of the card. Such data corresponds to a cash value which enables the multifunction card to be used in a manner identical to cash. From FIG. 11 a user may scroll to a screen 78 shown in FIG. 12 which prompts the user to select an available transaction in which value may be transferred from the stored value on the multifunction card. FIG. 13 shows a screen 80 with a prompt which enables the user to select a transaction in which value will be transferred onto the memory of the multifunction card.

In the exemplary arrangement the prompts in the screens of the main menu enable scrolling back to prior screens either by pushing the up or down buttons. As shown in FIG. 13 by pressing the down button from screen 80 the user causes the first screen 64 to again be displayed. Of course the user can move up and down by pressing buttons 26 and 24 which enables them to select any of the transactions available in the main menu. For purposes of a first example if a user wishes to add a new card to memory they can manually depress the enter button 28 of the input device as represented schematically in FIG. 14. Pressing the enter button 28 from screen 64 causes the processor 36 to begin executing the instructions stored in the programmable memory of the card and/or memory 38 of the terminal to add a new card into the memory.

Figure 15:
FIGS. 15-24 show examples of screens displayed on the portable terminal and associated with the logic flow for adding a new card type to the programmable memory on the multifunction card.
Figure 16:
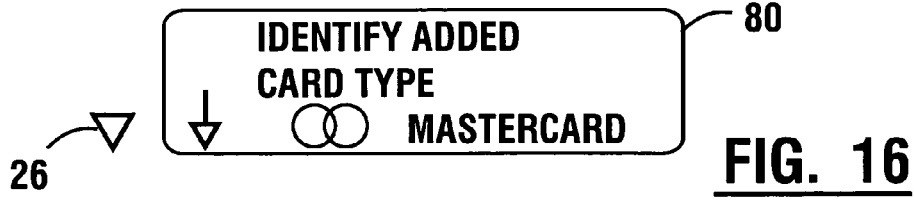

This routine begins as schematically indicated in FIG. 15 with screen 64. FIG. 15 is identical to FIG. 14, the screen being repeated herein for the sake of clarity. In response to a user pressing the enter button 28 a screen 80 of the type shown in FIG. 16 is presented. This screen includes a screen prompt which prompts the user to identify the type of card to be added. The memory on the multifunction card or the terminal preferably includes data representative of icons of major card types. These may include for example the icons representative of the logos for MasterCard®, VISA®, American Express®, Novus®, Discovery® and/or other common card types which a user is likely to want to enter. In screen 80 a MasterCard® logo is displayed by way of example, with an arrow indicating that other selections are available by pressing the down button 26.

Figure 17:

By pressing the down button from screen 80, screen 82 shown in FIG. 17 is displayed. This prompt screen includes the VISA® designator and logo, and allows the user to indicate that the card they are about to add is a VISA® card. The arrows adjacent to the VISA® logo displayed on the screen pointing both up and down indicates that the user may press the up or down buttons to display other card types. For purposes of this example it will be assumed that the card that the user wishes to add to the memory is a VISA® card. To indicate this, the user presses the enter button 28 as indicated in FIG. 17.

Figure 18:
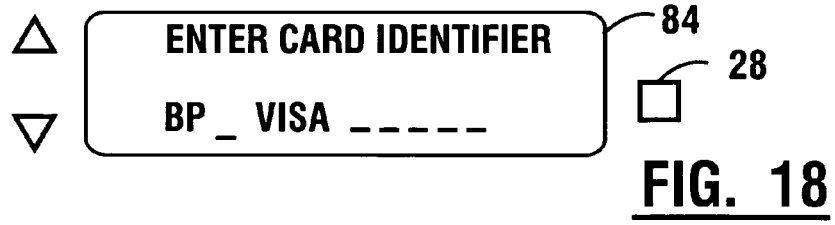

In the operation of the described embodiment the user is now requested to input a card identifier to distinguish the particular type of VISA® card which they are about to add to memory. This is done through a screen 84 which prompts a user to input a plurality of alphabetical or numerical characters which serve as a designator to identify the particular card. As shown in FIG. 18 the interface described enables a user to select letters of the alphabet to identify this particular type of card. For example by pressing and holding the up and down buttons the user is enabled to scroll through letters of the alphabet until they find the first letter of the designator they wish to input. When the letter is displayed, they can enter that as the first letter of the designator by pressing the enter button 28. They can then move on to the next letter of the designator selecting it with the up and down buttons. When a space is desired to be entered the user can leave the blank space which is preferably included as the initial option. In the case of screen 84 the designator is BP_VISA which may be a designator for a VISA® card provided by British Petroleum. Once the user has entered their desired designator any leftover spaces may be simply left blank by repeatedly pushing the enter button 28. After all the spaces are filled the input of the designator is complete.

Figure 19:
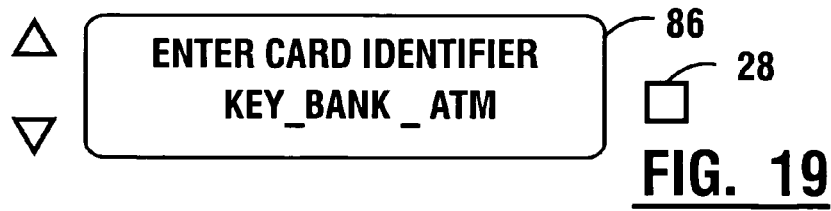

Screen 86 shown in FIG. 19 indicates the input of an alternative designator. In this screen the designator input is "KEY_BANK_ATM." This may indicate for example that the card which is being input is the debit card which corresponds to the user's account at Key Bank. It should be understood that the particular designator used is purely in the discretion of the user and the user is free to use highly descriptive terminology or a secret code which is known only to them to identify their various cards. In an exemplary arrangement sufficient security is provided for accessing the memory on the multifunction card that the user is enabled to use descriptive terminology as a designator if they wish to do so.

Figure 20:
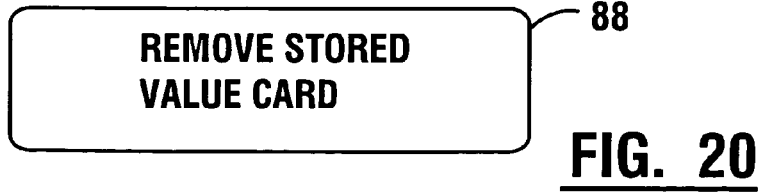
Figure 21:
Figure 22:

Once the designator has been input, the instructions read from the memory on the card or in the terminal causes a screen 88 shown in FIG. 20 to be displayed on the display 22. Screen 88 includes a prompt message to remove the stored value card from engagement with the portable terminal 14. Once the terminal senses that the stored value card has been removed by the disengagement of the contacts thereon with the portable terminal, a screen 90 as shown in FIG. 21 is displayed. Screen 90 includes a prompt for the user to pass their original BP_VISA card through the portable terminal. As shown in the exemplary arrangement, the display further visually instructs the user on how to pass the original card through the terminal so that it is properly read by the magnetic stripe reading device. In response to the screen 90 a user preferably passes their original card through the slot 32 in the portable terminal. On sensing the proper reading of the magnetic stripe on the card, screen 92 shown in FIG. 22 is displayed. Screen 92 indicates to the user that the stripe has been properly read and that they should now reinsert the multifunction card face up.

It should be understood that the stored instructions may include provisions for a time out routine. In the event that the user fails to proceed to the next step at any point in the transaction, the time out returns the terminal to the main menu or to an off condition. Such a time out routine or failure routine may be accompanied by appropriate user prompts to advise the user why the terminal has proceeded to shut itself off or return to the main menu.

Figure 23:
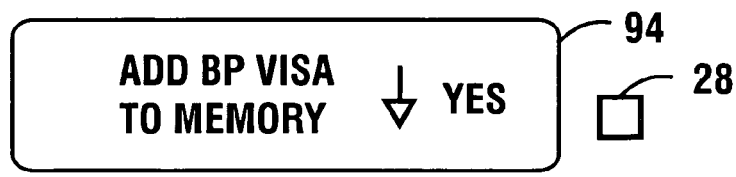
Figure 24:
Figure 94:
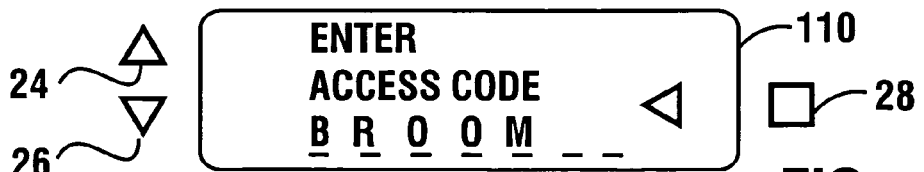

If from screen 92 the user reinserts the multifunction card into the slot 32, the logic flow next moves to display a screen 94 shown in FIG. 23. Screen 94 prompts the user as to whether they wish to add the BP_VISA card to the memory of the multifunction card. As shown in FIG. 94 the screen includes the default response which is "yes" with an arrow adjacent thereto which indicates to the user that they may change to other than the default response by pressing the down button 26. In this example the user wishes to add the card to the memory of the multifunction card, in which case the enter button 28 is pressed while screen 94 is displayed. This results in screen 96 shown in FIG. 24 being displayed, which indicates that the function has been carried out successfully. The user may press button 30 once to turn the terminal off or twice to return to the main menu.

Figure 25:
FIGS. 25-31 show a series of screens displayed on the programmable terminal and associated with the logic flow for deleting a card from the programmable memory on the multifunction card.

The logic associated with deleting information concerning a card from the memory of the multifunction card is now demonstrated with reference to FIGS. 25-31. This process begins with a screen 98. Screen 98 corresponds to screen 66 shown in FIG. 6 of the main menu. To choose this operation the user presses the enter button 28 as schematically indicated in FIG. 25. This causes the screen 114 shown in FIG. 26 to be displayed.

Figure 26:
Figure 27:
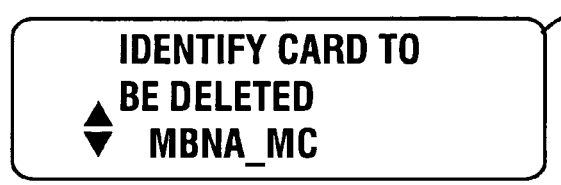

Screen 114 prompts a user to select which of the cards that are stored in the programmable memory on the card is to be deleted. The cards are referenced through displayed the designators which have been previously input by the user. Screen 114 displays the first one of these cards which has the designator "KEY_BANK_ATM." The arrows next to the designator indicate that the user may select other cards by pressing the up or down button. As shown in FIG. 26 the user presses the down button 26 which causes the display to move to a screen 116 shown in FIG. 27. Screen 116 displays the next card designator which is "MBNA_MC" which the user has previously input to designate an MBNA MasterCard. Assuming that the user wishes to select this card as the card to be deleted, they press the enter button 28 as schematically indicated in FIG. 27. Pressing the enter button from screen 116 causes a confirmation screen 118 shown in FIG. 28 to be displayed. This screen prompts the user to confirm that they want to delete that card. An arrow displayed next to the default option which is "yes" advises a user that they can change to another option by pressing the down button.

Figure 28:
Figure 29:

In screen 118 shown in FIG. 28 if the user presses the enter button 28 as schematically indicated therein the terminal next displays screen 120 shown in FIG. 29 in which the terminal outputs an indication that the card has been deleted.

Figure 30:
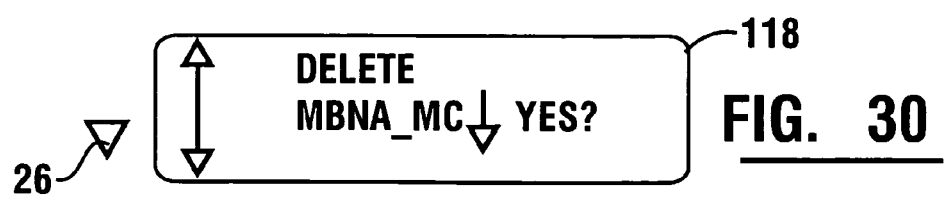
Figure 31:
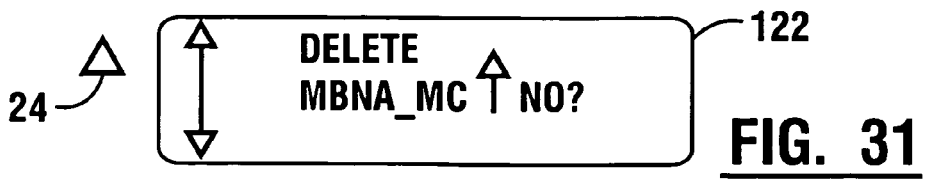

Alternatively if from screen 118 shown in FIG. 28 the user presses the down button 26 as schematically indicated in FIG. 30, a screen 122 shown in FIG. 21 as displayed. Screen 122 shows that the selected card will not be deleted and pressing the enter button 28 from this screen will return the terminal to the main menu. Alternatively, pressing the up button 24 in the screen 122 returns to the screen 118. It can be appreciated that the stored programmed instructions enable a user to correct errors that are made in the course of operating the input devices on the terminal.

The execution of the steps which enable the exemplary apparatus to configure the multifunction card so it may be used as a substitute for any one of a plurality of original magnetic stripe credit or debit cards, is now explained with reference to FIGS. 32-42. The logic executed to carry out this function begins with a screen 124. Screen 124 is identical to screen 68 of the main menu. As shown schematically with reference to FIG. 32, pressing the enter button 28 from screen 124 causes a screen 126 shown in FIG. 33 to be displayed. Screen 126 includes a prompt requesting that the user identify the card in the memory whose identifying indicia is to be transferred to the magnetic stripe of the multifunction card. The user is enabled to scroll through the designators for the cards stored in memory by pushing the buttons 24 and 26.

As indicated by a screen 128 in FIG. 34, the user selects the card data stored in correlated relation with the designator "BP_VISA" in the memory of the multifunction card by scrolling with the buttons until this designator is displayed and then pressing the enter button 28.

In response to the selection of the particular card in memory the indicia corresponding to the magnetic indicia on the "BP_VISA" card which has been stored in the memory of the multifunction card is transferred to the memory 38 of the terminal. Similarly the instructions which the processor will need to execute to complete the steps of writing the magnetic indicia onto the multifunction card are transferred temporarily into the memory of the terminal so that the steps may be completed with the memory of the multifunction card disengaged from the terminal.

Once the necessary information has been loaded into the memory of the terminal a screen 130 shown in FIG. 35 is displayed. Screen 130 includes a prompt instructing the user to remove the multifunction card from engagement with the portable terminal. Upon sensing the disengagement of the multifunction card the screen 132 shown in FIG. 36 is presented by the portable terminal. Screen 132 includes a prompt for the user to pass the stored value card through slot 32 in the terminal. The prompt preferably includes instructions on the orientation of the card and the magnetic stripe. This is done so that any indicia that has been previously recorded on the magnetic stripe of the multifunction card is erased.

In response to screen 132 the user preferably passes the multifunction card through the portable terminal such that the magnetic stripe passes through an area of the slot in connection with an erase head which clears the magnetic stripe. Upon sensing that the card has been passed through the terminal, a screen 134 shown in FIG. 37 is displayed by the portable terminal. The sensing can be done with the spring loaded finger in the slot or with another suitable stripe or card sensing device in the slot.

The portable terminal then further operates under control of the processor and the instructions stored in its memory 38 to display the screen 136 shown in FIG. 38. Screen 136 includes a prompt which includes an instruction for the user to now pass the multifunction card through the slot 32 in a different orientation so that the magnetic indicia corresponding to the selected BP_VISA card may be written to the magnetic stripe of the multifunction card. It should be noted that in the embodiment shown, the orientation of the card for erasing the stripe and for writing indicia to the stripe are different. This is done because a different head is used for erasing as opposed to reading and writing. In alternative embodiments a single head may perform both the erasing and writing functions or alternatively multiple heads may be aligned in the slot so that the card is passed in the same manner to carry out both the erasing, reading and writing functions.

Figure 39:
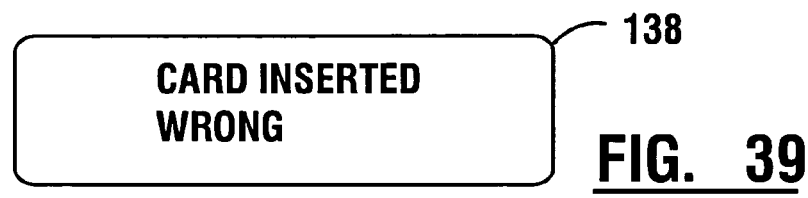

The exemplary arrangement includes appropriate sensors and instructions so that if the multifunction card is inserted wrong, the screen such as screen 138 shown in FIG. 39 is displayed. This may be done based on the sensing finger sensing the card but the magnetic head not sensing the stripe which indicates an improper card orientation, or in other ways. This screen is displayed so that if the user begins to insert the card improperly they are prompted to make a correction. Removal of the card may return the terminal to the screen 136 or may abort the instruction sequence such as by displaying the screen 140 shown in FIG. 42.

Figure 40:
Figure 41:

If however the card has been passed through the portable terminal properly a screen 142 shown in FIG. 40 is presented. This screen indicates that the indicia corresponding to the magnetic indicia on the original BP_VISA card has been written to the magnetic stripe on the multifunction card. From screen 142 the terminal then moves to display a screen 144 shown in FIG. 41 indicating that the transaction is complete and the user may turn off the portable terminal by pressing the on/off button 30.

Figure 42:
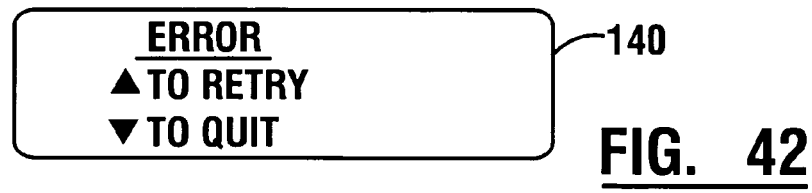

If for any reason an error has been sensed in carrying out the transaction, a screen 140 shown in FIG. 42 preferably appears. The user may then select either the option to retry the transaction to write the material to the card by pressing the up arrow, or may quit by pressing the down arrow which will return the terminal to the main menu. Alternatively in an exemplary embodiment, pressing the on/off button 30 from screen 140 is also a suitable way to end the transaction.

Assuming that the selected card data has been written to the magnetic stripe on the multifunction card 12, the user may now take the multifunction card and present it to any standard transaction terminal which accepts that type of magnetic stripe card. For example if a user wishes to charge goods or services to their BP_VISA account, they may present that card to a merchant who passes the stripe through a point of sale terminal, electronic cash register or other appropriate terminal. This will result in the user's BP_VISA account being charged for those goods or services. Similarly if a user wishes to get cash out of an ATM and charge it to their BP_VISA account they may present the multifunction card to an ATM. The ATM may be operated in the usual manner as one would operate it using the original BP_VISA card.

The multifunction card may be configured to include the user's signature in a space on a face of the card. This would enable a merchant accepting the card to compare a user's signature on a transaction receipt to the signature on the card. Alternatively, or in addition, a reproduction of the user's signature may be stored in the memory on the card. The user could display a reproduction of their signature on the screen of the terminal so that a merchant could verify the signature. Alternatively, user identifying electronic signature data may be transmitted through a communications device such as a modem or infrared transmitter, or otherwise read from the terminal into the merchant's system, so that the merchant may store the electronic signature data from the terminal with the transaction data.

In alternative methods of operation the merchant may use an electronic signature capture system for transaction receipts. In such a system the merchant's computer system may include software to compare the signals generated by the user's actual signature on an electronic signature pad to the signature data stored on the card. Such comparisons would provide an indication where the signature data does not correspond to a sufficient degree, which may suggest that the user of the card is not the authorized user.

After completing a transaction the user may choose to leave the magnetic stripe data for the selected card on the stripe. Alternatively the user may choose to change the magnetic stripe to a different card. For example if the multifunction card has embossed data on the front corresponding to one particular card, the user may choose to return the magnetic stripe indicia to correspond with the indicia embossed on the front of the card. Alternatively the user may choose to completely erase the magnetic stripe data as may be done by returning the multifunction card to the terminal and repeating the steps associated with writing card data to the magnetic stripe up through the point in the steps where the magnetic indicia is erased from the magnetic stripe. The user may then exit the routine by pressing the on/off button leaving the card with a blank stripe. In embodiments where no information is embossed on the front of the multifunction card users may find this advantageous as the multifunction card is of absolutely no value as a credit or debit card unless the access code has been appropriately entered.

The exemplary arrangement forms may also be used to selectively record and display visible indicia such as a bar code. These functions are graphically represented and the logic flow associated therewith explained with reference to FIGS. 43-61.

Figure 43:
FIGS. 43-52 show screens displayed on the portable terminal and associated with the logic flow for adding a bar code to the programmable memory on the multifunction card.
Figure 44:
Figure 45:
Figure 46:

FIG. 43 shows a screen 146. Screen 146 is identical to screen 70 shown in FIG. 8 of the main menu. To select this function a user presses the enter button 28 from the main menu as schematically indicated in FIG. 43. From screen 146 a screen 148 is presented as shown in FIG. 44. Screen 148 prompts a user to enter a bar code ID or designator corresponding to a bar code that is to be read from an object. This is done in a manner similar to the entry of designators for credit or debit cards or entry of the access code. The user scrolls through alphabetical and numerical characters by pressing the up and down buttons 24 and 26 as represented by screens 150 and 152 shown in FIGS. 45 and 46 respectively, until a desired character is displayed in a desired position. When the desired character is reached, the enter button 28 is pressed at which point the user moves on to the next character.

Figure 47:
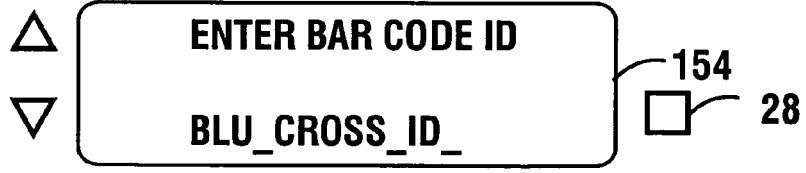

For purposes of this example it will be assumed that the user is going to scan a bar code from a medical benefits identification card which the user has chosen to designate "BLU_CROSS ID." This is represented in FIG. 47 by a screen 154. The user indicates that they have completed the designator by pressing the enter button 28 a sufficient number of times to null any remaining spaces in the available spaces entry for characters.

Figure 48:
Figure 49:

Once the terminal is advised that the entire ID has been entered, the logic flow operates to display the prompt shown in screen 156 and FIG. 48. This prompt instructs a user to scan the bar code off the object such as their Blue Cross® identification card. The process also operates to initiate operation of the scanner component 50. The user then brings their identification card in proximity to the scanning device 34 on the housing of the portable terminal and the processor operates in response to the stored instructions to capture the bar code data on the card. When the bar code data has been captured, the screen 158 shown in FIG. 49 is displayed. As previously discussed, if the bar code cannot be read or is not read in a sufficient time, the instructions may include provisions for returning the terminal to screen 146 or providing a screen such as screen 160 shown in FIG. 52 in which the user is given the option to either quit or retry scanning the bar code.

Figure 50:
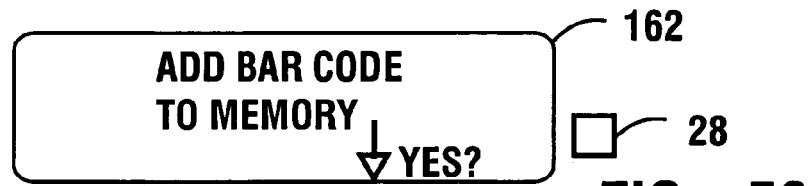
Figure 51:
Figure 52:
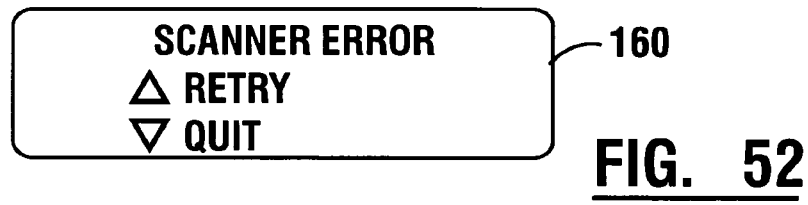

Assuming that the bar code is properly read as indicated by screen 158, the terminal then displays screen 162 shown in FIG. 50 which prompts a user as to whether they wish to add this bar code to the memory on the multifunction card. As is the case with prior prompts the default value is "yes," but the user is enabled to change the default to a "no" by pressing button 26. For purposes of this example it will be assumed that the user wishes to add the bar code for their medical identification card to the memory which they do by pressing button 28 in response to screen 162. In response to the user pressing the enter button the screen 164 shown in FIG. 51 is displayed. The user can now turn the terminal off by pressing button 30.

It should be understood that while the type of visual indicia added to the memory on the multifunction card in the foregoing example is bar code associated with a medical plan, other types of bar code may be added. For example the multifunction card may be used to store data representative of bar code associated with a driver's license, student identification card, employee access card, library card or any other type of bar code. In addition the system may be configured to read and store other types of visual indicia which are capable of being read, stored and reproduced.

Figure 53:
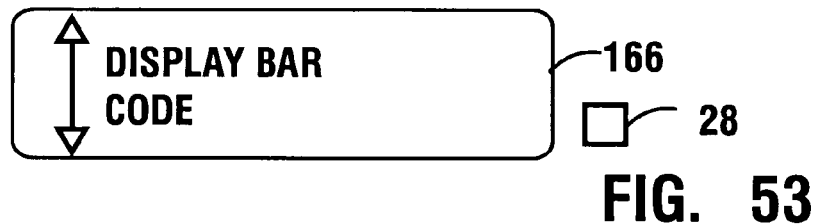
FIGS. 53-56 show screens displayed by the programmable terminal and associated with the logic flow for displaying a bar code corresponding to information stored on the programmable memory of the multifunction card.

When a user desires to use the terminal to display one of the bar codes or other indicia stored in memory, they may do so from a screen 166 shown in FIG. 53. Screen 166 is identical to screen 74 in the main menu. To proceed with the display of a selected bar code the user presses the enter button 28 as schematically indicated.

Figure 54:

In response to the user selecting the display bar code routine from the main menu, the terminal proceeds to display a screen 168 shown in FIG. 54. Screen 168 asks the user to identify the bar code that they wish to display. The user is enabled to select designators for the various bar codes stored in the memory of the multifunction card. This is done using the up and down buttons on the terminal device.

Figure 55:
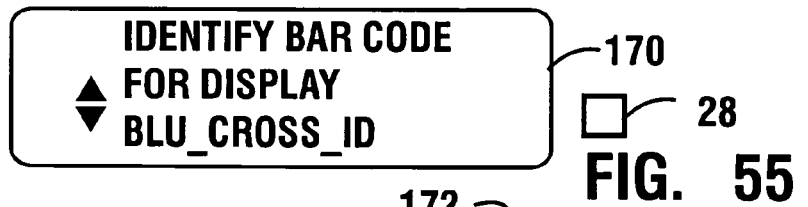
Figure 56:
Figure 57:
FIGS. 57-61 show screens displayed on the portable terminal and associated with the logic flow for deleting a bar code from the programmable memory on the multifunction card.
Figure 58:

Assuming for purposes of this example that the user wishes to display their medical plan ID, the designators for the various stored bar code indicia are scrolled through by pressing the buttons until the medical plan ID designator is displayed, which is represented by a screen 170 in FIG. 55. In response to pressing the enter button 28 the processor is operative to retrieve the data corresponding to the bar code in the memory and to display a reproduction of the bar code on the terminal. This is represented by a screen 172 in FIG. 56. The displayed reproduction of the bar code may be scanned from the display 22 of the portable terminal using the scanner or similar bar code reading device which is schematically represented by a scanner 174 in FIG. 56. Thus the user may identify themselves to a medical provider as a participant in their medical plan and the user may input their identifying information in the conventional manner using the same scanner that is used for scanning a regular identification card. When the scanning process is finished, the user can discontinue the display of the bar code by pressing on/off button 30.

The bar codes which have previously been stored in the memory associated with the multifunction card may also be selectively erased therefrom. This may be done for example when a user's regular card is replaced such that a new bar code or other visual indicia is associated therewith. Alternatively a user may simply wish to discontinue the use of a particular card. This may happen for example with regard to a library card which a user had been using in a city where they previously resided. Once the user moves they no longer use that library. Likewise a user may delete their driver's license data when they move to another state and obtain a new license.

Figure 59:
Figure 60:
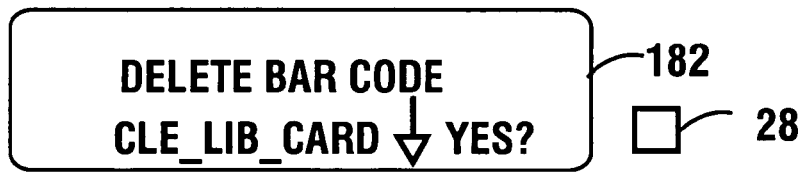
Figure 61:

The deletion of a bar code from the memory is represented by the logic flow associated with FIGS. 57-61. The screen 176 corresponds with the screen 72 in the main menu, and includes a prompt which enables a user to select the logic which operates to delete a bar code from the memory. The user selects this transaction by pressing the enter button 28. A screen 178 is then displayed which asks a user to identify the bar code they wish to delete from the memory. The user selects the bar code by pressing the up and down buttons 24 and 26. As shown in FIG. 59 the user selects a card which has the associated designator "CLE_LIB_CARD" stored in association therewith in the memory of the multifunction card. This is represented by a screen 180. Pressing the enter button 30 with the bar code designator displayed causes a screen 182 shown in FIG. 60 to be displayed. Screen 182 queries the user as to whether they in fact wish to delete that particular bar code. The user is enabled to change from the default setting by pressing the down button. As schematically represented in FIG. 60, assuming the user wishes to delete that particular bar code from memory they press the enter button 28. This causes a screen 184 shown in FIG. 61 to be displayed on the portable terminal. This screen includes the prompt message to indicate that the bar code has been deleted. The user may then exit the routine by pressing the on/off button 30.

It should be understood that while the described embodiment operates to store and to reproduce visible indicia corresponding to bar code, other embodiments may produce other forms of indicia. This may include visual indicia that is intended to be read by machines for identification purposes as well as indicia intended to be read by the human eye. Any form of indicia which can be read, stored in the memory of the multifunction card and/or displayed on the portable terminal is intended to be encompassed by the present invention. As previously discussed, a user's signature is a further example of visual indicia that may be stored and selectively reproduced. Such indicia may also be transmitted by the terminal to a remote system and used to verify the authenticity of a transaction or for other purposes.

The exemplary arrangement also operates as a stored value card system and transaction apparatus which operates to store value equivalent to a cash value in the memory of the multifunction card, as well as to transfer value between the card and various accounts. The programmable memory 18 on the multifunction card 12 may include therein any one of a number of different public or proprietary schemes for storing information representative of cash value. This value storage method may be compatible with other terminals which may read the memory and transfer data representative of value to or from the memory, while also operating to transfer funds between accounts of the user and providers of goods, services or cash.

It should be understood that the multifunction card of exemplary embodiments may store value in one or several forms of proprietary schemes. For example the card may have cash value stored and associated with a Mondex® scheme. It may have a different cash value stored and associated with a VISA® CASH scheme. The card may also store data representative of cash values in any one of several other schemes. Although an exemplary arrangement will be described with respect to a card in which value representative of cash is stored thereon with respect to a single scheme, it should be understood that multiple schemes may be used. Further in the following description in which amounts may be transferred between accounts of the user, it is within the scope of the invention to transfer amounts between one stored value proprietary scheme stored in the programmable memory of the card to another proprietary scheme stored within the card. Such transfers may be made in a manner similar to transfers between accounts which are carried out by the terminal as described hereafter, although it should be understood that in such situations additional steps are carried out by the processor in the portable terminal so as to decrement and increment the various stored value amounts stored in the memory of the card.

To facilitate accounting for such transactions it will also be desirable for the portable terminal to connect to various remote locations which provide gateways to electronic transaction systems and networks which assure that funds are properly accounted for. For example communication will be carried out with various remote systems to assure that indications are provided that a user has transferred cash value on their card from one stored value card scheme to another.

One of the common functions that a user will execute in connection with the exemplary apparatus is to check the stored value representative of cash that is stored on the programmable memory of the multifunction card. This is represented by the logic flow described with reference to FIGS. 62 and 63. FIG. 62 shows a screen 186. Screen 186 corresponds to screen 76 of the main menu. Screen 186 prompts a user as to whether they wish to check the stored value balance on their multifunction card. To do so the user presses the enter button 28. In response to the user selecting this item from the main menu the memory of the card is read and processor 36 causes a screen 188 shown in FIG. 63 to be displayed on the portable terminal. This screen indicates to the user the current cash value stored on the card. If the multifunction card includes stored value schemes for several different programs, intermediate screens may be provided to prompt the user to select one of the several stored value schemes which are employed on the card. As shown in FIG. 63 when a user has finished displaying the stored value amount they may exit by pressing the on/off button 30.

The transfer of funds to the memory of the stored value card is represented by FIGS. 64-74. FIG. 64 shows a screen 190. Screen 190 corresponds to screen 80 in FIG. 13 of the main menu. A user selects the transaction which includes a transfer of value to their stored value card (which is the multifunction card) by pressing the enter button 28 when screen 190 is displayed.

To transfer value representative of cash value onto the memory of the multifunction card, a source of the money to be transferred is identified. This is done by the processor operating in response to the instructions stored on the card to display a screen 192 shown in FIG. 65. Screen 192 prompts a user to identify the source of the money to be added into the memory of the card. The user is enabled to select the source by pressing the up and down buttons which causes the various sources of available funds to be selected. Such sources may include money stored in stored value schemes on the memory of the card itself. In the case of screen 192 if the user indicates that they want the source of funds to be their BP_VISA card, this is indicated by pressing the enter button 28 when this card designator is displayed.

After the source of the funds is designated, a screen 194 shown in FIG. 66 is displayed. This screen prompts the user to enter the amount of money to be added to the card. This is done by the user entering a numerical amount in a manner similar to the way that access codes and designators have been previously entered. However, in the exemplary arrangement, only numerals may be entered in this step. The user enters the numerical values by scrolling to the particular numerical value desired and then hitting the enter button 28. This causes the program logic to move to the next value. After all the value characters have been entered as represented by screen 196 in FIG. 67 the user is prompted through a screen 198 shown in FIG. 68 as to whether they want to add the amount input to their stored value card. As shown in screen 198 the default value is "yes" however the user may change this to "no" by pressing the down button. For purposes of this example it will be assumed that the user wishes to add that amount and so indicates by pressing the enter button 28.

In response to the user indicating that they wish to add this amount to the data representative of value in the memory of the multifunction card, the processor operates in response to instructions stored on the card memory to contact the remote location appropriate to obtain funds from the user's BP_VISA account, and to indicate that the amount has been transferred onto the user's stored value card. In one arrangement this is accomplished by the processor causing the communications component 52 to dial up the remote location. This is done using the address appropriate for making the connection which is preferably stored in memory on the card. In this case the address may be a telephone number. In alternative arrangement forms, the address which the communications component uses to contact the appropriate location may be a node or TCP/IP address in a computer system such as a private intranet or public system such as the internet. The particular approach depends on the nature of the system in which the portable terminal 14 is intended to operate.

Figure 69:
Figure 70:

The portable terminal exchanges messages with the remote location and the computer system therein, which operates to charge the user's account for the funds which are to be transferred as cash value onto the stored value card. Alternatively the terminal may communicate to a number of locations to indicate both the charge to the user's account as well as to track accounting entries, so that it is recorded that the user now has such funds available in their particular stored value scheme. Various transaction messages are transferred between one or more remote locations and the portable terminal so as to accomplish the transfer of funds. These messages may be in an ISO 8583 format or appropriate variants thereof, or other proprietary message formats of suitable types, so as to accomplish the transfer of funds and a record thereof. In one exemplary embodiment, while the remote terminal is connecting to the address a screen 200 shown in FIG. 69 is presented on the display of the remote terminal. As the remote terminal exchanges messages with the remote locations to transfer the funds after the connection has been made, the display of the remote terminal may present the screen 202 shown in FIG. 70 to indicate that the transaction is going forward.

Figure 71:
Figure 72:

If the transaction is successfully completed the remote terminal displays a screen 204 shown in FIG. 71 to indicate a transaction has been approved. The logic next moves to cause a screen 206 to be displayed. Screen 206 which is shown in FIG. 72 is operative to show the user the new stored value balance stored on the multifunction card.

Figure 73:
Figure 74:
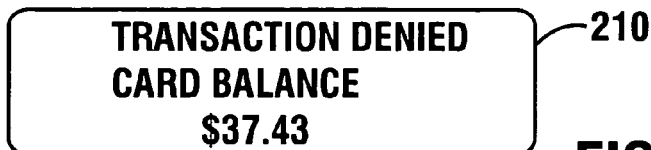

If for some reason the terminal is unable to make connections to the remote location, either because it is unable to make a connection or because of some other malfunction, a screen 208 shown in FIG. 73 may be displayed. This screen prompts a user to select whether to retry the transaction or to quit. Similarly the user may decide to turn the terminal off by pressing the on/off button 30. Alternatively the user's request to transfer the funds may be denied by the remote location, such as because it would put the user over their credit limit. In such circumstances the instructions stored in the multifunction card are received from the remote location and causes screen 210 shown in FIG. 74 to be presented on the terminal. This screen shows the user that the transaction was denied and that their card balance remains at the prior amount. Of course the user is free to again attempt the transaction using a different source of funds, or alternatively to transfer funds from a different stored value scheme stored on the memory of the card.

An exemplary arrangement also enables transferring the value from the stored value card to one of the user's accounts. This may include for example a checking or savings account which the user maintains with a financial institution. Alternatively this may include transferring value from one stored value scheme stored on the card to another stored value scheme stored on the card.

Figure 75:

The transfer of value from the stored value card is commenced in an exemplary embodiment from a screen 212 shown in FIG. 75. Screen 212 corresponds to screen 78 in the main menu. Pressing the enter button from this screen causes the processor to execute various instructions on the multifunction card associated with this transaction.

Figure 76:

In executing the transfer from the card the user is next prompted through a screen 214 shown in FIG. 76 to identify a destination of the funds. This is done by user using the up and down buttons to select one of the available destinations. In this case the user has selected the account associated with the designator "KEY_BANK_ATM." The selection is made by pressing the enter button 28.

Figure 77:
Figure 78:

As shown in FIG. 77 the user must next enter an amount to be transferred from the memory of the stored value card into the designated account. The user must enter an amount which is prompted through a screen 216. The entry of an amount is accomplished in the manner previously described by using the up and down buttons and the enter button. In the case of this example the user enters an amount to transfer of $200 as indicated by screen 218 in FIG. 78.

Figure 79:
Figure 80:
Figure 81:

In response to the user entering the transfer amount the terminal next operates to display a screen 220 shown in FIG. 79 in which the user is asked to confirm that they wish to make the transfer to the particular account. In the situations where the user is obtaining funds from financial institutions or other sources where they may have multiple accounts, the user may be prompted through additional screens to select particular accounts that may be held at the institutions which are sources of funds. This is demonstrated in FIGS. 80 and 81. For example in screen 222 the user is first prompted to state whether they wish to transfer funds to savings. By pressing the down button the user may cause screen 224 to be displayed which then asks them if they prefer to transfer the funds into checking. For purposes of this example it will be assumed that the user wishes to transfer the funds to checking, which they select by pressing button 28 as shown in FIG. 81.

When the user is transferring funds to or from a debit card account, the PIN (personal identification number) uniquely associated with the user's account is required to be input to gain access. The nature of the account which the user has identified as the destination or source of funds, is generally indicative that a PIN number is required for access thereto. The instructions stored in memory on the card or the memory of the terminal may cause screens associated with the entry of a PIN number and/or the selection of various accounts to be displayed when particular accounts are selected.

In the present example because a bank account which requires the entry of a PIN number is being used as the destination of the funds, the stored instructions cause a screen 226 shown in FIG. 82 to be displayed. Screen 226 prompts the user to input a PIN number. The user inputs their PIN number either by alphabetic or numerical characters in the manner previously described for entry of designators and numerical values into the remote terminal. Once the user has completed the input of their PIN number as indicated by a screen 228 in FIG. 83, they are presented with a prompt that asks them to confirm the PIN number input. Confirming the input in response to this prompt is done by pressing the enter button 28. In embodiments where the biometrics reader is used, biometric data may be used in addition to or in lieu of a PIN to identify the user to a remote system. Alternatively, a user's PIN number may be stored on the card. If the user has first identified themselves with an access code or biometric data to operate the terminal with the card, the level of security may be considered already sufficient that the PIN may be recalled from memory and forwarded by the terminal. Alternatively, the user may be required to input biometric data and in response to the proper biometric input the PIN is recovered from the card memory and output by the terminal.

After the data required to conduct a transaction has been input, the user is questioned concerning whether they wish for the transaction to proceed. As shown in FIG. 84 a screen 230 is presented which prompts the user to confirm that they wish the transaction to go forward. Confirmation is presented by pressing the enter button. In response thereto the remote terminal contacts the appropriate computer address to transfer the funds to the account designated. While this is being done, the screens 232 and 235 shown in FIGS. 85 and 86 are displayed. As previously discussed contact may be via a phone system or by computer network to the appropriate address.

If the transaction is successfully completed the instructions cause the screen 236 shown in FIG. 87 to be displayed. In the exemplary arrangement the instructions then cause the display of the screen 237 which shows the user the amount of value remaining on the card.

While various methods of communicating between the remote terminal and the remote locations may be used, in one exemplary embodiment it is desirable for the communications device to include a wireless modem. The wireless modem enables communication over a cellular telephone network. Appropriate encryption is provided to enhance security. This enables a user to transfer funds between the multifunction card and their various accounts from any convenient location where the user happens to be. This may be particularly advantageous when a user finds that they are in need of cash and do not have an automated teller machine or a telephone line readily available. The user is enabled to load cash value onto the multifunction card so they can complete their transactions.

In addition, while the exemplary arrangement has been described as being used to make transactions from value stored on the card to various accounts of the user, other arrangements may also be used to transfer funds from the stored value card of one user to the stored value card of another user. This enables users to carry out the equivalent of cash transactions using stored value cards. In such circumstances the terminal would contact the appropriate remote locations for recording the transfers of funds for accounting purposes, if necessary. Alternatively if sufficient security is provided, the electronic information corresponding to cash value may be deemed sufficiently self-authenticating so that no independent accounting of the cash value need be kept in an external system.

Alternative embodiments can permit cards to be used in various ways. For example, an authorized user can create duplicate credit or debit cards. These additional cards can be provided to trusted friends or family members on a temporary basis. This will enable such individuals to access funds of the user when needed. This may be appropriate, for example, when family members are traveling and are separated from the primary card user.

Also, as previously discussed, a user is able to continue to use a large number of credit cards, debit cards, and other various forms of cards and objects bearing indicia, without having to physically carry those cards on their person. As a result, the user is enabled to keep such cards at home or another secure location where they are less likely to be lost or stolen.

Furthermore, an exemplary arrangement is highly flexible in configuration and can accommodate a number of different types of transactions depending on the instructions stored in the memory of the multifunction card and/or the portable terminal. As a result, the apparatus and method of an exemplary arrangement is highly and readily adaptable to the carrying out of different or additional transaction types, whether financial or otherwise.

Furthermore, a financial transaction may require plural types of information from a customer. Such required transaction data may include the customer's financial account information and the customer's signature. As previously discussed, a user's signature can be stored in a programmable memory for later use in transactions. The stored signature can be used as a legally binding electronic signature. The stored electronic signature can comprise data representative of a handwritten signature. For example, the electronic signature can be a reproduction of a signature, such as a scanned handwritten signature. Alternatively, the signature may be data which a user has agreed will have the legal effect as a written signature, or data which identifies the user. In an exemplary arrangement, user account data can also be stored along with the signature data. That is, account data and signature data (and other data) can be stored in the programmable memory of a user's portable hand-held device (e.g., multifunction card, terminal, phone). Hand-held devices have been previously discussed.

The stored account data can comprise checking account data. In an exemplary arrangement, a merchant transaction system is operative to receive account data stored in a customer's portable hand-held device. Data representative of the user's signature and/or the user's financial account information can be transmitted from the user's (customer's) portable hand-held device to the merchant's transaction system. Wireless communication can be used to transmit/receive data between the user's hand-held device (or the user's terminal) and the transaction system. For example, data may be transmitted/received via a communications device (e.g., modem, infrared transmitter, RFID, blue tooth device, or similar technology). In an exemplary embodiment the range of communication between the user's hand-held device and the transaction system can be limited to a specific distance, such as a few inches to a few feet. The use of a limited wireless communication range can avoid interference and permit communication only with the other device. The communication may also be encrypted to ensure confidentiality of data. The merchant system can store the received financial account data and signature data.

The account data stored in the hand-held device can be used in generating an electronic check. A merchant transaction system includes an electronic check template in storage in a computer (which may be a local computer or a network host computer in operative connection with the local computer). Alternatively, the merchant system can be operative to communicate with a third party which has the electronic check template and can generate electronic checks (and/or carry out the transaction) for the merchant. The check template includes software operative to receive customer account data to create an electronic check. The customer account data can include the necessary information required by a merchant to accept a check as payment for a purchase. For example, the account data may include checking account number (and/or bank routing number), check number, name, address, phone number, bank name, or combinations thereof.

The electronic check-generating template can also have the check made payable to the merchant. The template can be programmed to set the payee as the merchant by default but have the ability to allow the merchant to change the payee. The template can also receive purchase data from the merchant computer. This enables the template to automatically insert the amount of a purchase into the electronically generated check. That is, the purchase amount data can be used as the check amount. The check template can also insert the current date (and other information, e.g., time, store identification number, etc.) into the generated check.

FIG. 96 shows an electronic check-generating arrangement. A customer owns or has access to a portable hand-held device, e.g., a card 250, terminal 252, or phone 254. The hand-held devices include a programmable memory 256. A hand-held device may also include other features, such as a display screen 258, 260, function buttons or keys 262, and/or a camera 264. The phone 254 may comprise a video cell phone. The customer's account data and/or signature 266 can be remotely wirelessly transmitted or read from the hand-held device (e.g., phone 254) to a merchant's terminal 270, e.g., a checkout terminal or computer. As previously discussed, the merchant terminal 270 may be connected to a network. The merchant terminal 270 is in operative connection with an electronic check generating template 274.

As shown in FIG. 97, the base electronic check template 274 can include a starting check format 276 having the sections or fields 278 empty. The template software is able to fill these check fields 278 with the data necessary to generate a legal financial check. The check fields to be filled may include the check value, the customer bank account number, payee, date, and the signature.

As previously discussed, a reproduction of the user's signature may be stored in the memory of a user's portable hand-held device (e.g., card or phone). The user can display a reproduction of their signature on a display screen of the user's hand-held device (or terminal) so that the merchant can verify the signature. Verification may include visually comparing the electronic signature to a handwritten signature already on a user card or to a sample of the user's signature freshly handwritten in view of the merchant.

Alternatively, with the merchant system having the customer's signature data, the merchant can display a reproduction of the signature on the merchant's own display screen for use in signature verification. Of course, if the signatures lack acceptable correspondence in the verification process, then the merchant can end the transaction. In other arrangements, signature comparison software may be used to determine the validity of the customer's signature. Alternatively, in other embodiments other approaches to signature verification, such as ways of validating electronic signatures, may be used.

After the merchant system obtains the account data and signature from the user, then the electronic check (with user account data and signature) can be completed. The merchant system can store the received financial account data and signature data along with the transaction data (e.g., purchase amount). The check-generating template software in the merchant's system is able use the obtained electronic signature as the signature in generating the electronic check. That is, the electronic check template can insert the user's electronic signature or other corresponding data into the electronic check. The merchant system can display an image of the completed check on a display screen for viewing by the customer and the merchant for final approval.

The electronic check template can also insert a check number into the generated check. The check number can be received from the customer. The programmable memory of the customer's hand-held device can increment check numbers. For example, the last check number can be stored in the memory. The value of one can be added to the stored check number prior to transmission of the check number to the merchant system. Alternatively, the last check number can be incremented to create the next check number prior to storage of the check number in the programmable memory. This next check number can then be stored with the other checking account data. The next check number (along with the other account data) can then be received by the merchant system. Thus use of check numbering enables a customer to more efficiently maintain a record of the checks drawn from their checking account.

Figure 98:
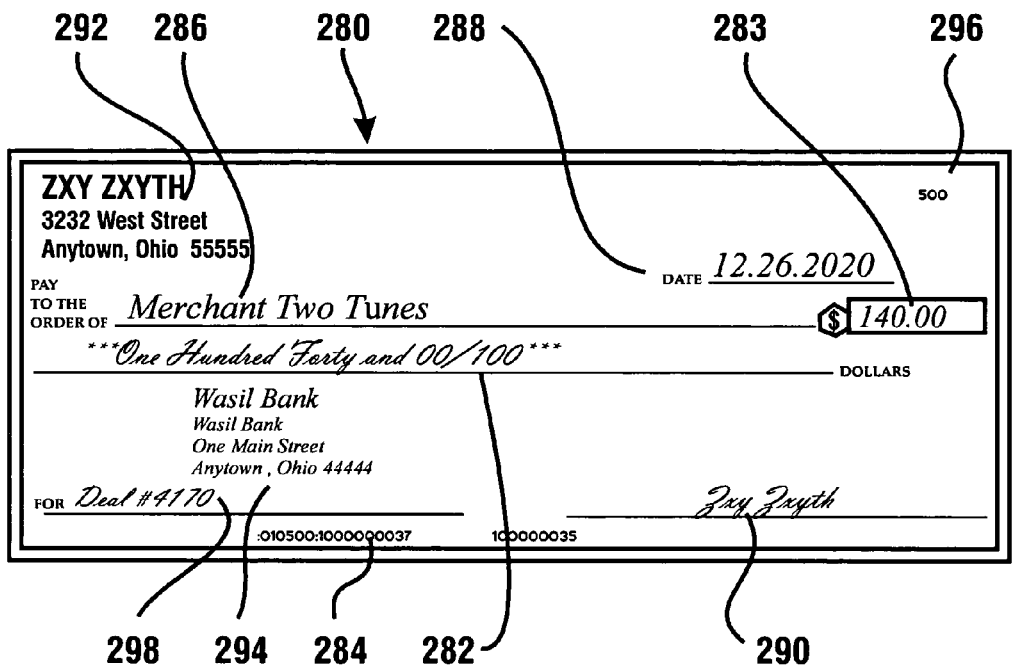
FIG. 98 shows an example of a completed electronic check.

FIG. 98 shows a completed electronic check 280 generated by the merchant system. The check 280 has entries in the check fields. Respective entries include the written check value 282, the numeric check value 283, the customer checking account/routing number 284, the merchant as payee 286, the date 288, and the customer's signature 290. The check generating software is also operative to insert other entries, such as customer address 292, bank name and address 294, check number 296, and merchant transaction number 298. The completed check is acceptable by the merchant as payment for a transaction.

The merchant system can transmit the completed electronic check to a bank or electronic clearing house for account settlement. The electronic check can be transmitted in electronic format. In an exemplary arrangement, the check is transmitted by the merchant terminal, the check is processed by the check clearing house, and the canceled (i.e., cleared) check is returned to the merchant terminal, all in a short time period. A canceled electronic check can contain a (unique) marking indicative of its cancellation. Of course this approach is exemplary and in other embodiments other approaches may be used.

The merchant system can have a printer device capable of printing a copy of the check (which may be canceled) for the customer. Merchants can also add their own indicia to a printed check, with the indicia (e.g., a stamped marking) acknowledging receipt of customer payment.

Alternatively, the customer can receive (from the merchant terminal) and store an image of the check in the hand-held device (e.g., phone) and view or print it later. There are many processes in which the hand-held device may receive the check image data. The check image may be received into the hand-held device via the user's terminal or via other known transmission methods. Wireless data transmission can be carried out. For example, blue tooth technology can be implemented.

The check image can also be received into a user's hand-held device via a camera built into the hand-held device (e.g., phone or videophone). That is, an image of the check can be captured by the camera. The check image can be stored in memory of the hand-held device. The storage of a canceled check in the hand-held device can serve as receipt of payment.

A user's portable hand-held device can also be used in a self-service checkout transaction. The portable hand-held device enables self-service checkout in retail establishments not normally associated therewith. A retail store can have purchasable items (e.g., clothing) with an identification (e.g., bar code, RFID tag) and an anti-theft tag associated therewith. The anti-theft device needs to be neutralized before the item can properly leave the store, otherwise an alarm will be tripped (via sensors adjacent store exits). The anti-theft tag may be of the type that can be sensed and neutralized at a distance (e.g., using magnetic sensed tag, RF backscatter tag, RFID tag, or other tag types that can be "neutralized" on contact or from a short distance). The bar code (or similar identification indicia) may be attached to the item. Alternatively, a single bar code may correspond to a plurality of like items. For example, the bar code may be located on a common support device (e.g., shelf) for a plurality of the items.

Figure 99:
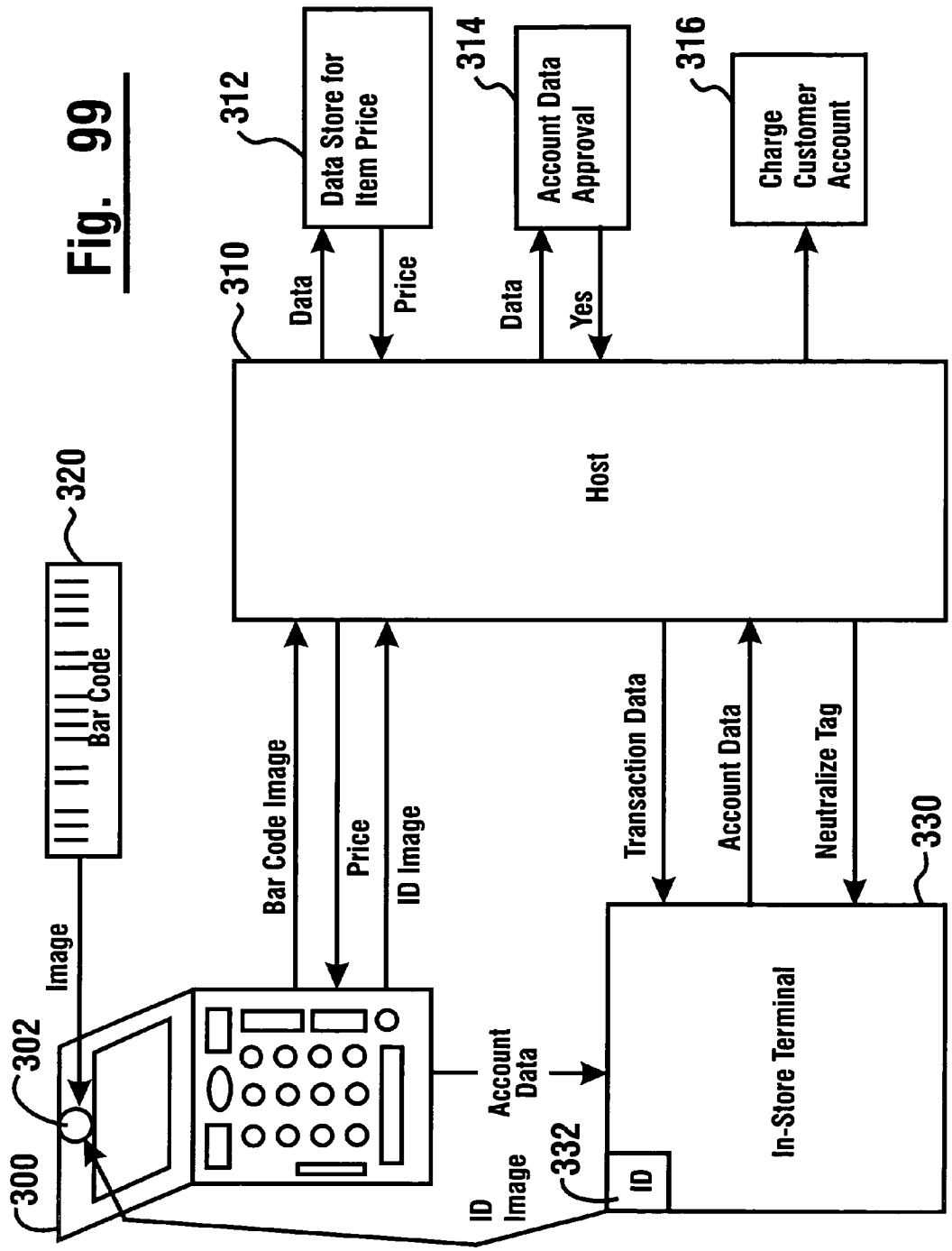
FIG. 99 shows an exemplary form of a transaction payment arrangement for an item purchase.
Figure 100:
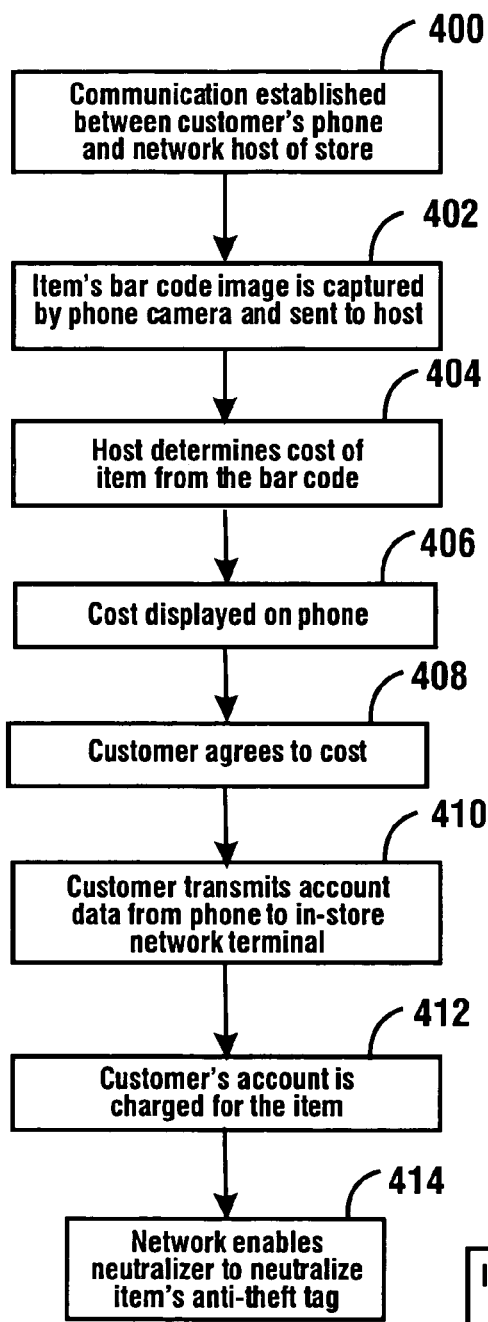
FIG. 100 shows steps included in an exemplary self-service checkout during an item purchase.

As shown together in FIG. 99 and FIG. 100, an exemplary embodiment a self-service checkout for an item purchase can be accomplished using the customer's portable hand-held device 300 (e.g., phone). The user operates the phone to dial a phone number to establish communication (step 400) with a transaction payment system associated with a particular retail store (or the particular retail item). The phone number can be the phone number assigned to that particular store which has the item that the customer desires to purchase. The store's phone number and instructions can be readily displayed throughout the store for the customer's benefit. The transaction payment system may be located in the store and/or on a network linked with a plurality of other stores so they can share a common network host. That is, at least part of the transaction system (which can include a host with one or more computers) may be remotely located from the store. The transaction system can match the phone number that the customer called to the particular retail facility assigned to that phone number. Therefore, the transaction system is able to know the exact merchandise establishment at which the customer is attempting to purchase an item. The transaction system is able to accept purchase payment and cause the item's anti-theft tag to be neutralized or disabled or inactive. The transaction system can also handle billing for the purchase.

The customer has a camera 302 which can communicate with the phone 300, e.g., the camera may be part of the phone (e.g., videophone). After the customer's phone has established communication (step 400) with the store's network host 310, the purchaser points the phone camera at the bar code 320 corresponding to the item. An image of the bar code 320 (or data representative of the image) is captured and sent (step 402) to the transaction system (e.g., host) 310. The transaction system can resolve the bar code data and process the data to determine the price of the item corresponding to the bar code (step 404). For example, the transaction system may convert the digital image of the bar code to numerical data, and then make a comparison of this numerical data to price data to determine the item's price. Data in a data store 312 can be utilized to make the corresponding data comparison. This price information can be transmitted back for display (or by audible quote) on the purchaser's phone (step 406). The customer can verify and agree (step 408) to the price as being correct to continue the transaction. Alternatively, the price information may be displayed on a purchaser-viewable display screen in the store. If the purchaser disagrees with the determined price (or decides not to continue the purchase) then the customer has the capability of terminating the transaction.

In other embodiments, if a customer ends a transaction process the transaction system can call back the customer via the phone and offer a lower or discounted price for the item. The lower price may be calculated by using statistical analysis based on a variety of customer factors, such as demographics, types of accounts, account balances, purchase history, credit history, etc. The discounted price may also be linked to other factors, such as the customer being required to open a new line of credit. Information about the customer may be obtainable via the customer's phone number, or the customer may be requested to provide more information to determine if a discounted price applies to that customer. In other embodiments, a loyal (repeat) customer may also be presented price discounts.

Continuing with the purchase, the transaction payment system requests the buyer to transmit their account billing data. As previously discussed, a customer account may be associated with MasterCard®, VISA®, American Express®, Novus®, Discovery®, or other common accounts, such as checking, savings, mutual fund, and money market accounts. The account data is stored in memory in the user's hand-held device. The stored account data (and electronic signature if necessary) may be transmitted in a manner previously discussed, e.g., the user's phone (or other hand-held device) transmits the user's account data.

The account data may be transmitted (step 410) wirelessly from the customer's hand-held device to an in-store merchant terminal 330. The transaction system can include the merchant's terminal. The transaction may be handled locally via the merchant's in-store terminal, which can comprise a computer, communication devices, and communicate with the host. Alternatively, the merchant's terminal can pass the received account data (and signature if necessary) to another (network host) computer located remotely from the store. The merchant's terminal can have access to the identification of the store in which the terminal is located, and access to identification(s) of the store's neutralizer(s). The identification data may be stored locally in terminal memory. The merchant's network terminal can transmit the stored (store and neutralizer) ID data to the network host. This ID data may be sent along with the customer's account data from the merchant's terminal to the host.

In other embodiments the account data may be transmitted from the phone directly (e.g., via a phone network) to the remote host computer, without use of the merchant's terminal. For example, the account data (and a PIN if necessary) may be transmitted by entering data via the phone keys. Thus, a transaction system can be located only locally (e.g., as the in-store terminal), or partially located both locally and remotely (e.g., as a combination of the in-store terminal and remote host), or completely located remotely.

The transaction system can communicate with other finance systems 314 to determine whether the user-provided account data is acceptable in paying for an item. It should be understood that it is within the scope of the invention for other data or information (e.g., store location/ID, more customer identification, yes/no prompts) to be communicated between the customer's phone and the transaction system in order to carry out the purchase transaction. Upon the customer's account data being approved for the transaction, the customer's account 316 can be charged the cost of the item (step 412).

After payment for the purchase has been approved by the transaction payment system, the security tag can be neutralized (step 414). The user places the purchased item adjacent to an in-store tag neutralizer device (if not already adjacent thereto). The neutralizer device may be on an item shelf, or at a self-service checkout area of the store, or part of an in-store merchant transaction system. The transaction system can communicate with the tag neutralizing device. The transaction system can cause the neutralizing device to neutralize the security tag corresponding to the particular purchased item.

In other embodiments the transaction system may communicate with the tag neutralizer via the customer's phone. For example, the transaction system can send a code to the customer's phone. The code may comprise a unique audible frequency tone that is recognizable by the tag neutralizer as an instruction to cause neutralization of a particular item's tag. The code may be stored in the phone and later played when the customer is ready to exit the store, or the customer may be instructed to place the phone adjacent the neutralizer prior to sending the tone.

In the exemplary embodiment the anti-theft tag cannot be neutralized until after the user's account has been charged for the item. However, the tag may be neutralized simultaneously with the user's account getting billed for the item. Once the item has been neutralized, the user can carry the purchased item out of the store without the item tripping the alarm. The arrangement enables a person to check out items at a store shelf, at a self-service check out area, or anyplace a device for neutralizing the anti-theft tag can be located.

As previously discussed, the transaction system can communicate with the tag neutralizing device. In other arrangements there can be feedback between the neutralizer device and the transaction system. The transaction system can use the feedback to verify usage of the neutralizer device (and authenticity of the transaction). The transaction system can also use the feedback to ensure that the customer is using the correct neutralizing device.

In an exemplary feedback arrangement, the neutralizer has an identifier (e.g., number, symbol, marking, etc.) which the customer's phone camera can capture and send to the transaction payment system. The neutralizer may have a permanently assigned number as an identifier. Alternatively, the neutralizer may have a changeable identifier. For example, the neutralizer can have an output device that can display the latest identifier sent from the transaction system (e.g., host). The displayed identifier may comprise a transaction symbol or number (e.g., random number, date, time, or any combination thereof).

The transaction system has the neutralizer's identifier stored in memory. If the image of the identifier received from the phone camera does not match or correspond to an identifier currently stored in the transaction system's memory for that particular neutralizer, then the transaction system does not recognize the neutralizer (or the transaction) as valid. Hence, the transaction system does not attempt to neutralize the tag. The purchase transaction is terminated and nullified. The feedback arrangement reduces the risk of the system being tricked, and ensures that the customer is at the proper neutralizer.

In other arrangements the transaction process can be carried out with the item's identifier being read with a device other than a phone camera. For example, the customer's hand-held device (e.g., phone) may include a bar code reader. Thus, a bar code may be read with the bar code reader, instead of via a camera. The bar code can be read as a number, and the number transmitted as data (instead of an image) to the transaction system. Alternatively, the phone may have a processor and software that can convert an image to data. Thus, the phone can transform a captured bar code image into data (e.g., a number) prior to transmitting the data (e.g., number) to the transaction system. Likewise, if an item's identifier comprises an RFID tag, then the customer's hand-held device (e.g., phone) may include an RFID tag reader. Again, the customer's hand-held device (e.g., phone) can transmit an item's identifier as a number instead of as an image. It should be understood that other communication arrangements between the hand-held device and the transaction payment system are within the scope of the invention. For example, one-way or two-way Internet communication between the hand-held device and the transaction system may be used. The hand-held device may transmit an item's identifier information to the transaction payment system via the Internet. The hand-held device can have wireless link with the Internet. Thus, the hand-held device can transmit data (image and/or numerical data) to the Internet address of the transaction system.

In another exemplary embodiment the item to be purchased includes at least one RFID tag as an anti-theft tag. The neutralizer can be operated to change the programming of the item's RFID tag. For example, the RFID tag can be changed to a unique number (e.g., transaction number) for that shopping visit. The unique number can be recognized as acceptable by the security system. If any other RFID value other than the unique number is sensed as the item goes by the store's exit sensor, then the alarm sounds.

In other embodiments the anti-theft tag neutralizing (or reprogramming of an RFID tag) can be accomplished through the user's portable hand-held device (e.g., phone). The phone is placed adjacent to the item having the tag. The transaction system sends a specific signal or code through the phone which is receivable by the anti-theft tag to cause neutralization (or reprogramming) thereof.

As previously discussed, the transaction system can send the charge transaction. In other arrangements an in-store computer can be used to send the charge transaction, and the store computer can also be used to confirm that the store received payment for the item. If the phone is dialed into the store computer for providing pictures and account data, then the store computer can route the transaction to the bank. Alternatively, a store computer can accrue what is being bought and total the payment owed. When the user is ready to leave the store they disconnect their call with the store computer. The store computer has the bank computer call back the user's phone. The bank, such as through a person or through an automated system such as an interactive voice response system, advises the user that they will owe so much to the store. The user can authorize the purchase agreement with the bank via inputs to the phone, such as spoken inputs and/or the pressing of phone keys. Once the store is notified that authorization for payment has occurred, then the store can let the item (or items) out of the store without the alarm sounding. For example, the store can let an item having an (RFID)

number corresponding to the bar code pass through the security system without requiring tag neutralization or modification.

A further exemplary operation of purchasing a merchant item via a self-service checkout using a customer's phone 300 can also be described with regard to FIG. 99. The customer uses their phone to call the store's (toll free) phone number. As previously discussed, the phone number may be displayed throughout the store. The phone number may be assigned to that particular store or it may be a phone number shared by several stores. Nevertheless, the call is answered by the transaction system host 310, and communication is established between customer's phone and the host. The customer is instructed to transmit an image of the item's identifier (e.g., bar code 320). The identifier image is captured by the phone's camera 302 and transmitted via the phone to network host. The host 310 obtains a price corresponding to the received identifier. As previously discussed, the price assigned to the item's identifier may be determined by the host computer or it may be provided from a secondary data source 312. Nevertheless, a price is matched with the item via the item's identifier (e.g., bar code). The price of the item transmitted from the host (or secondary source) back to the customer's phone and displayed thereon. The customer then must agree to the displayed price to continue the purchase, else the transaction is terminated by the host. A termination may include notifying the customer of such act. It should also be understood that the customer may also terminate the transaction at any time prior to payment. Agreement can be acknowledged via the pressing of a particular phone button(s), providing voice input(s), or both depending on the particular system.

Following agreement, the customer is requested by the host to transmit an image of an identification (ID) 332 of the in-store terminal/neutralizer 330 at which the customer wants to make the payment. The ID image is captured by the phone camera and transmitted to host. The host must recognize the ID as valid to continue the checkout, or else the purchase transaction is terminated by the host. After ID validation, the host places transaction data (e.g., description of item, price of item, etc.) that corresponds to the customer's purchase in the payment queue of the particular terminal/neutralizer corresponding to the ID. The customer is notified (e.g., by the host and/or the terminal/neutralizer) that the terminal/neutralizer is ready to accept payment for their purchase. The terminal/neutralizer is able to display the transactions in the payment queue. The payment queue contains the order in which the transactions are to be paid. The payment queue may be a first-in first-out type of queue. For example, the transaction in the queue may be ordered based on time. Only one transaction can be paid for at a time. That is, the terminal/neutralizer views only one transaction as being "active" for payment. Any account data received by the terminal/neutralizer will be applied toward the currently active transaction. The payment queue can be adjusted by the customer (if necessary) to ensure that their transaction is displayed as the active transaction.

The customer then transmits account data from their phone 300 to the terminal/neutralizer 330. The terminal/neutralizer 330 transmits this received account data to the host 310. The host seeks approval of the account data as being acceptable for the transaction payment. The process of approval may include other financial sources 314, as is well known. If the transaction is denied payment approval, then the host terminates the transaction.

If the customer's account data is approved for payment, then the customer's account 316 is correlated with payment for the item(s) in the purchase. After the host is notified of payment, then the host instructs the particular terminal/neutralizer 330 to function to neutralize the item's anti-theft tag. This act may range from simply turning on the neutralizer to having the neutralizer only neutralize a specific tag. The operation of security tag neutralizers is well known and need not be discussed further. The customer can next place (e.g., locate, wave, scan) the item adjacent to the terminal/neutralizer (if not already placed) and the item's tag is neutralized. The customer can then exit the store with the purchased item, without the item tripping any security alarms.

The portable hand-held device (e.g., phone) also enables a user thereof to obtain cash in a manner similar to making an item purchase. A user of the portable hand-held device can obtain cash from an ATM located in a retail establishment (e.g., merchant store, restaurant, sporting facility). For example, an in-store ATM can be on the store's computer network. The ATM can be a recycler type of ATM that can both receive currency and dispense received currency. A recycler ATM enables the retail establishment to efficiently make use of excess cash.

Figure 101:
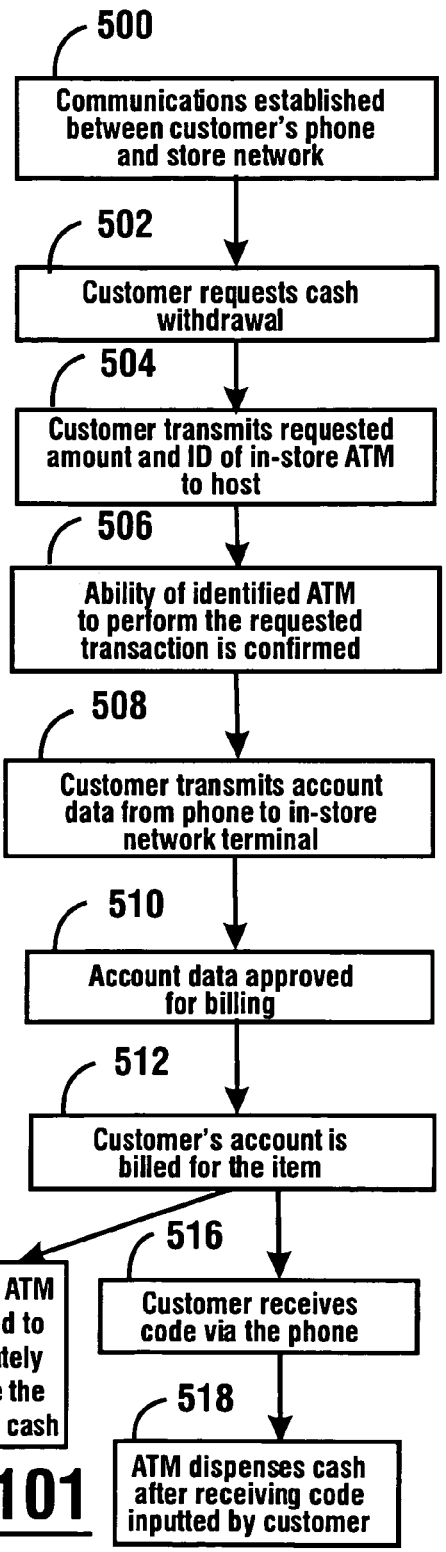
FIG. 101 shows steps included in an exemplary cash withdrawal transaction.
Figure 102:
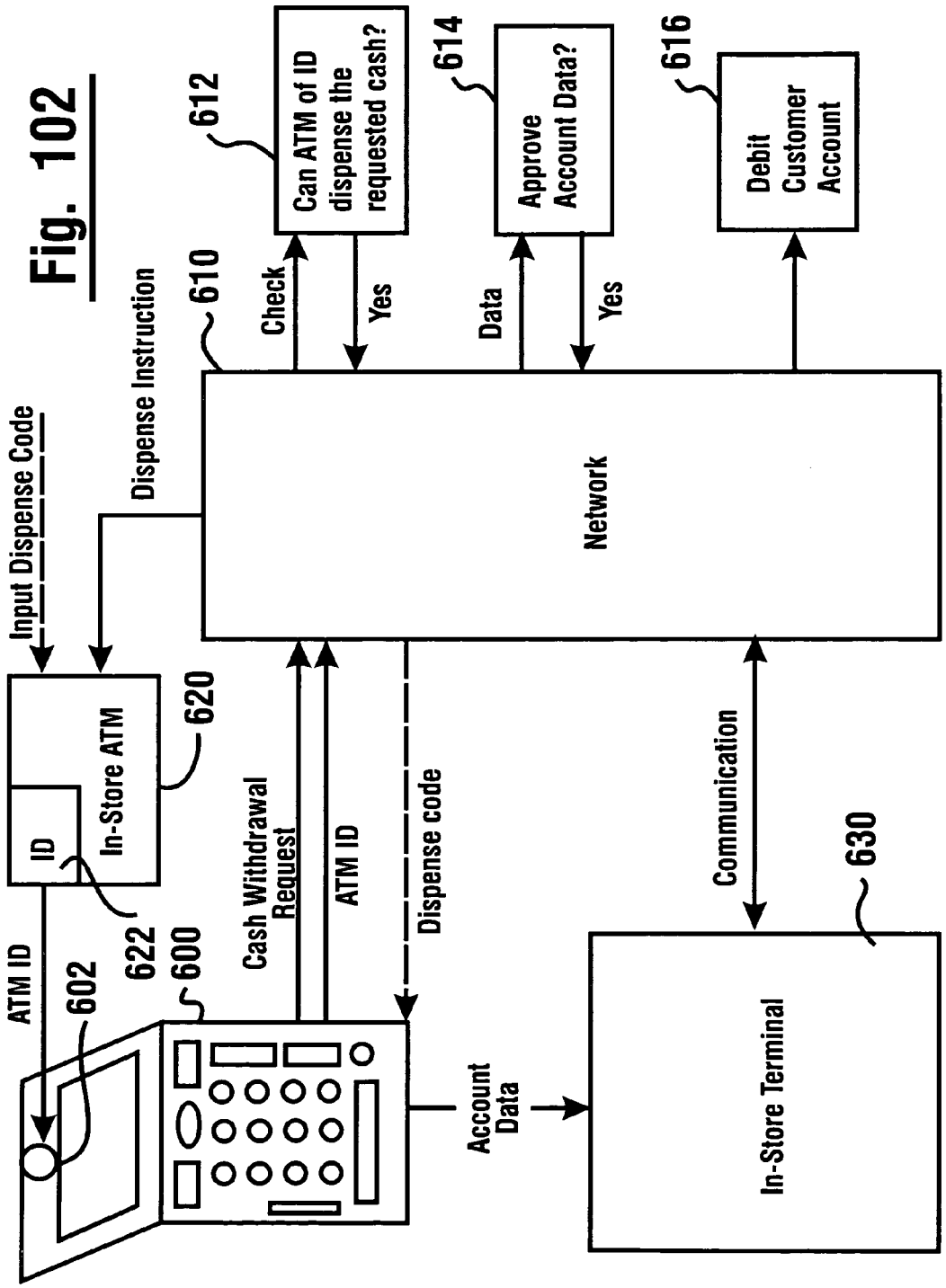
FIG. 102 shows an exemplary form of an arrangement for a cash withdrawal transaction.

An exemplary operation of purchasing cash with a handheld device will now be described with respect to FIG. 101 and FIG. 102. Communication is established between the customer's phone 600 and the store network 610 (step 500). The customer requests a cash withdrawal (step 502). The amount of cash requested may be included in the initial request, or the amount may be transmitted later. The customer has to transmit the necessary information in order to have the cash request granted. The required information may include customer account data, customer signature, account PIN, identity of the ATM, and/or amount of requested cash.

An ATM 620 has an identifier 622, such as a machine ID number or a bar code ID, visibly located thereon. Likewise, the ATM's display screen may have an identifier (e.g., random number, symbols) displayed thereon. The user can point their phone camera 602 at the ATM to obtain an image of the ATM's identifier 622, else the user can enter the identifier (if it is a number) via the phone keys. Hence, the customer can transmit their requested amount of cash along with the ID of an in-store ATM to the host (step 504). The requested amount of cash can likewise be entered via the phone keys. Of course, other known ways of entering data may be used, such as voice to data conversion.

Continuing with the cash purchase, the customer can transmit (step 508) any necessary transaction data (e.g., customer account data, signature, PIN) not already provided via wireless communication from the phone 600 to a transaction system computer 630, such as in a manner previously discussed. The transaction computer can be a local in-store self-checkout terminal 630 which is in communication with the store network 610. The transaction data may or may not be stored in the phone memory prior to its transfer to the store network.

Alternatively, the customer may initially transmit transaction data from the phone to the in-store terminal 630. This data may correspond to just the customer account, signature, and/or PIN. In such a scenario, at this point in the cash purchase process the customer may be requested to provide (via their phone to the network) how much cash they want and the identity of the particular ATM. As previously discussed, the customer can use their phone to transmit the ATM identifier and the desired amount of cash to the store network. The transmitting may involve a phone line network or the Internet. The phone can be used to transmit the ATM identifier and the cash amount to a network device (or location) remote from the store.

The store network (which may include a secondary financial network) checks the received transaction data to determine 614 whether the requested cash withdrawal should be permitted. With network approval (step 510) of the requested cash withdrawal, the requested cash may then be dispensed via a cash dispenser in the ATM. Responsive to the approval, the store network 610 correlates (e.g., charges, debits, bills, etc.) the customer's account 616 with the cash purchase (step 512), similar to a merchandise purchase. The store network instructs the in-store ATM 620 (i.e., the ATM corresponding to the customer-provided ATM identifier 622) to dispense the requested cash amount. The instruction to the ATM may cause the ATM to immediately dispense the requested cash (step 514). The store may receive a service fee for providing the cash.

Furthermore, instead of instructing the ATM to immediately dispense the cash, the store network can provide (via the phone or a receipt) a code to the customer (step 516). This code (e.g., a number or a combination of numbers/letters) can later be inputted by the customer into the in-store ATM to receive the requested cash. The store network authorizes the ATM to dispense the requested cash amount upon receiving the inputted code (step 518). The ATM may also have a walk-up code input device that does not require conventional user verification input to operate, or other suitable input device. That is, the user does not have to insert an ATM card into the ATM prior to obtaining their cash. For example, the customer can approach the ATM, the customer inputs only the code, the ATM dispenses the cash corresponding to the code, and the customer takes their purchased cash. The ATM input device can have keys that are operative to accept manual input of the code. The ATM input device can also be operative to accept wirelessly communicated input via the phone. Furthermore, the code provided to the customer may be a network code. The network code may be used by the customer at any ATM in any store on the network. Alternatively, other identifiers, such as a biometric feature associated with the user or another type of associated identifier, may be used.

An alternative exemplary operation of purchasing cash will now be described also with respect to FIG. 101 and FIG. 102. This operation includes the additional step (step 506) of the host determining whether the selected ATM is able to perform the requested cash dispensing.

Communication is established (step 500) between the customer's portable hand-held device 600 (e.g., phone) and the store network 610. The customer requests a cash withdrawal (step 502). The customer is instructed to transmit request data (e.g., amount of cash withdrawal and/or ATM identifier). Instructions to the customer may be received via the customer's phone.

Continuing with the cash purchase, the customer transmits (step 504) the cash request data (e.g., amount of cash and/or ATM identifier). The customer may transmit data to the network (or an in-store terminal thereof) via the customer's phone. As previously discussed, the phone camera 602 may be used to transmit an image of an ATM identifier 622.

In certain arrangements the store may be assigned a default ATM. This is particularly useful when the store has a single ATM. The network uses the store's only ATM as the default ATM. Therefore, when the customer calls the store's phone number, the network matches the phone number to the store and determines the identity of the store's ATM from a data file. Hence, when a customer initially calls in an in-store cash withdrawal request, the phone number called informs the network which ATM to use. This arrangement can alleviate a customer from having to identify the ATM.

The network 610 may be programmed to check 612 the status and/or ability of the identified ATM to dispense the requested cash amount (step 506). The network confirms the ATM status as valid. Otherwise, the transaction is terminated. In other arrangements, the customer may be given additional options instead of terminating the transaction. For example, the customer may be provided the option of requesting a specifically different (e.g., nearby) ATM on the network, or the option of receiving a network code which enables the customer to receive their cash at any ATM on the network.

After the network confirms the ATM(s) involved in the cash dispense, then the customer is instructed to transmit (step 508) their account data that is to be used for payment. Again, the customer can transmit the account data (e.g., customer account data, signature, PIN) via wireless communication from the phone 600 to an in-store terminal 630 on the network. The network determines 614 (or has another system verify) whether the received account data is valid for payment of the requested cash purchase. The account data is deemed acceptable for payment (step 510), else the transaction is terminated. In other arrangements, the customer may be given another chance to continue the transaction. For example, the customer may be provided the opportunity to transmit different account data (e.g., a different customer account) for payment. If so, the network would again check the validity of the account for purposes of payment.

After the customer's account data is deemed acceptable for payment (step 510), then the store network (or another system with which the network can communicate) correlates (e.g., charges, debits, bills, etc.) the customer's account 616 with the cash purchase (step 512). The store network enables (e.g., authorizes) the indicated ATM to dispense the requested cash. This enablement may include instructing the indicated in-store ATM to immediately dispense the requested cash (step 514). Alternatively, the customer may be provided a code (step 516). The code may be received by the customer via the customer's phone or in some other manner, such as by a paper receipt. Hence, the enablement may include instructing or authorizing the indicated ATM to dispense the requested cash only in response to receiving the inputted code (step 518). Also, if the code is a network code (instead of a code only useable at a specific ATM) then the enablement may include instructing all the ATMs on the store network to dispense the requested cash upon receiving the inputted code. As previously discussed, the ATMs may also have a walk-up code input device or other suitable input device.

It should also be understood that the store network can communicate with an independent ATM network. The ATM network can have and control the plurality of ATMs thereon. The store can act on behalf of the customer to obtain cash from a particular ATM, such as an in-store ATM. That is, the store can act as an intermediary between the customer and the ATM network. After the store receives customer payment for the requested cash, then the store can request the host of the ATM network to dispense the cash on its behalf. The ATM network charges or bills the store for the cash. The ATM network host can then instruct the particular ATM to dispense the requested cash. The store may charge a service fee from the customer for providing its service.

It should be understood that it is within the scope of the invention to likewise purchase merchandise or cash from a store using stored value in a user's portable hand-held device (e.g., phone). That is, a purchase can also be made using a phone's stored cash value instead of (or in combination with) the phone's customer account data (and signature and PIN). The phone's stored value can be directly reduced, or the phone can hold the transaction data for later use in providing a charge against the user's account.

Likewise a purchase (of merchandise or cash) can be made with an electronic check, as previously discussed. The store can accrue the total cost of purchase. The user's portable hand-held device (e.g., phone) can send checking account and signature data (e.g., via IF or IR link) to the store computer's check-generating template. As previously discussed, the store computer can have the bank computer seek authorization from the user to carry out the transaction. After confirmation that an electronic check payment has occurred, then the store can complete the purchase, such as by letting the merchandise out of the store without tripping the alarm, or causing the ATM to dispense the requested cash withdrawal.

As previously discussed, a multifunction card can store data corresponding to plurality of accounts in its memory. The memory can be programmable memory, such as the programmable memory 18 in the multifunction card 12 shown in FIG. 1. As previously discussed with reference to FIGS. 32-41, data corresponding to a stored account can be selected and placed on the magnetic stripe 16 (or other memory device) of the card 12. That is, magnetic stripe data can be changed to reflect the account selected from a plurality of accounts. As previously discussed, a (portable) terminal 14 can be used in changing the magnetic stripe data to reflect a different account. The user identifies the account in the card memory whose identifying indicia is to be transferred to the magnetic stripe (or strip) of the multifunction card. In response to the selection of a particular account in card memory, its indicia and other information is transferred to the terminal memory. The user passes the card through the terminal so that the magnetic indicia corresponding to the selected account is written to the magnetic stripe of the multifunction card. The user can then take the multifunction card and present it to any standard transaction terminal which accepts that type of magnetic stripe card.

In a further exemplary arrangement the exterior appearance of the multifunction (or multi-account) card can also be (visually) changed to directly correspond to the account selected for the magnetic stripe. The programmable memory of the card can be used to store both data and images for each account. That is, the card memory can store correlated account data and image data for each respective account. Both the account data and image data for a selected account can be transferred to a terminal in the manner previously discussed. The image data can be used by the terminal to electronically activate the card to change its appearance.

Alternatively, the portable terminal itself can store the correlating image data in a data store. The card can store an associated image code for each account. The card can provide the code to the terminal during the changing of the magnetic stripe data. The terminal can use the code to retrieve the appropriate card image data from the terminal memory. As discussed in more detail later, the terminal can change the external appearance of one of both faces of the card.

In another arrangement the terminal receives the account data from the card. Terminal memory (or a remote data source in operative communication with the terminal) includes account data correlated with image data. The terminal then attempts to correlate the received account data to image data stored in terminal memory (or a remote data source). With a successful match, the terminal also changes both the magnetic stripe data and the card image. Without a successful match, the terminal changes only the magnetic stripe data.

The card can have a respective particular image for each respective selected account. For example, a first image (VISA® logo) on the card can correspond to a VISA® account. Likewise, a second different image (MasterCard® logo) on the same card can correspond to a MasterCard® account. Upon user selection of a particular account from the card's programmable memory (or another data source), the card's magnetic stripe is loaded with that particular account's data and the card changes into the appearance of an issued card associated with that particular account. Thus, user selection of the VISA® account from the card's programmable memory causes both the card's magnetic stripe to be loaded with the necessary VISA® account data and the appearance of the multifunction card to be changed to reflect the appearance of an issued VISA® card. A new selection of the MasterCard® account from the card's programmable memory causes both the card's magnetic stripe to be loaded with the MasterCard® account data and the appearance of the multifunction card to match that of an issued MasterCard® card. The exemplary multifunction card is not limited to only being used as different account cards with different magnetic stripe data, but can also take on the appearance of these account cards.

Figure 103:
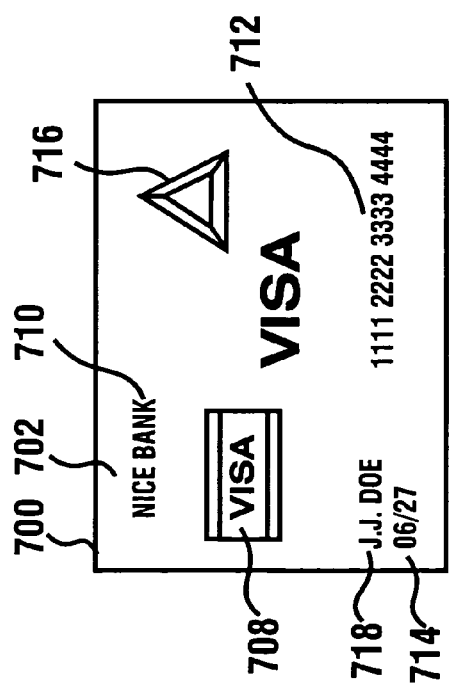
FIG. 103 shows an image on a front face of a multifunction card.
Figure 104:
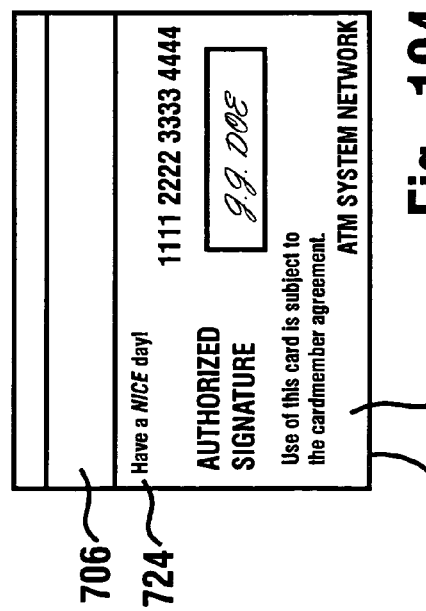
FIG. 104 shows an image on the rear face of the multifunction card of FIG. 103.

FIG. 103 shows the front face 702 of a multifunction card 700 having the appearance of a VISA® card issued from Nice Bank. FIG. 104 shows the rear face 704 of the multifunction card 700, which corresponds with the data on the front face 702. The account data on the magnetic stripe 706 corresponds to account data (i.e., VISA® account 1111 2222 3333 4444) shown on both faces of the card 700.

Figure 105:
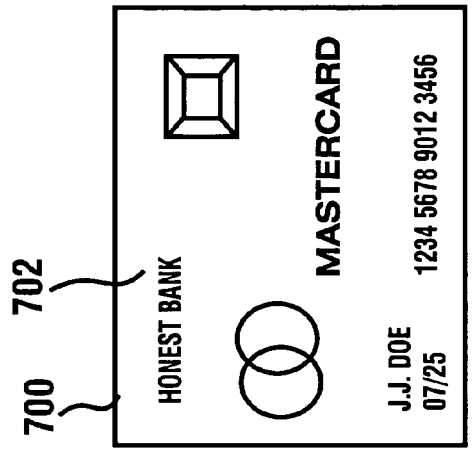
FIG. 105 shows another image on the front face of the multifunction card of FIG. 103.
Figure 106:
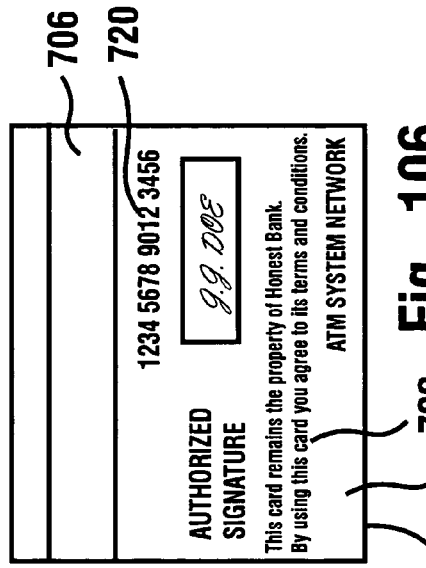
FIG. 106 shows another image on the rear face of the multifunction card of FIG. 103.

FIG. 105 shows the front face 702 of the multifunction card 700 having the appearance of a MasterCard® card issued from Honest Bank. FIG. 106 shows the rear face 704 of the multifunction card 700, which corresponds with the front face 702. The account data on the magnetic stripe 706 corresponds to account data (i.e., MasterCard® account 1234 5678 9012 3456) shown on both faces of the card 700.

In FIGS. 103 and 105 the image appearing on the front face 702 of the multifunction card 700 has changed with respect to card logo 708, bank name 710, account number 712, expiration date 714, symbol or hologram 716, and card holder name size 718. In FIGS. 104 and 106 the image appearing on the rear face 704 of the multifunction card 700 has changed with respect to account number 720, agreement 722, and greeting 724. It should be understood that items that may appear the same on each displayed rear face image may actually be from different images. For example, "AUTHORIZED SIGNATURE" may be from in two separate different images, yet it happens to be displayed at the same location in both versions of the card. As discussed in more detail hereinafter, the appearance on a face of a card can be the result of plural displayed (small) images instead of only a single displayed (large) image.

As shown in FIGS. 103-106, the same multifunction card 700 can be used to display different card images. Furthermore, a displayed card image can correspond to the particular account in the magnetic stripe 706 of the card 700. Hence, one multifunction card can take the place (in magnetic stripe data and card appearance) of a plurality of other different cards.

An exemplary arrangement uses electronic ink to display a card image corresponding to an account stored in card memory. For reasons of brevity and to avoid confusion, reference to "electronic ink" herein will be used to include all known versions and descriptions relating to electronic ink, such as (but not limited to) "electronic ink," "E Ink," "e-ink," "electrophoretic ink," "electronic paper," "Epaper," "epaper," "Gyricon," "SmartPaper™," and "radio paper."

Although the physical structure of electronic inks may vary, the electronic inks have common components or characteristics that give them the ability to rearrange upon command. The imaging capability can be controlled, e.g., electronically controlled. The electronic ink technologies associated with companies such as E Ink Corporation and Gyricon Media Inc. may be used in a reusable multifunction card in an exemplary embodiment.

A multifunction card of the exemplary embodiment can have both a magnetic stripe and a visual image corresponding to a selected account stored in card memory. Likewise, the card's visual image and active memory (e.g., magnetic stripe and/or smart chip) can correspond to each other. Thus, a sole card can function as many cards with the user's ability to selectively change the appearance and memory of the card.

The exemplary embodiment can extend the use of the programmable memory of the card. The card can have a high resolution, active-matrix graphical color display using electronic ink. An electronic ink card can also have a miniature power connector to receive power (e.g., electric power) from a terminal (or other energy source or driver) to set/change the card image.

When a user is enabled to operate the terminal and selects one of the accounts stored in memory, besides writing the account data corresponding to the selected account on the magnetic stripe of the card, the terminal can use the image data corresponding to the selected account to cause the card to change to an appearance like the card issued by the corresponding institution. For example, a selected VISA® account from Nice Bank will cause the electronic ink to display an image on the card of their (VISA® and Nice Bank) logos, a VISA® hologram, and other data on a first face (front side) of the card. An image of the user's signature and other data (with the magnetic stripe) can be displayed in a space on the other face (back side) of the multifunction card. As previously discussed, a reproduction of the user's signature can be stored in the memory of the card. The user's signature can be stored as a part of each card image or the user's signature can be separately stored. A separately stored signature image can be retrieved and then placed on every card format (as a separate or distinct image on the card). Of course the signature image may be displayed on different electronic ink cards at different locations.

The magnetic stripe can remain in a fixed location on the multifunction card. Such location can be the standard position on magnetic stripe cards to enable the reading thereof by magnetic stripe readers. In alternative embodiments discussed in more detail later, the electronic ink itself can be arranged to create a readable field (e.g., magnetic field). The electronic ink can include a material that can be magnetized or otherwise exhibit magnetic properties. Such an arrangement enables a magnetic stripe to be created and changed via the electronic ink. Thus, use of a permanent magnetic stripe at a fixed location on a card can be eliminated.

A multifunction card is not limited to displaying only financial account cards. A multifunction card can also act as a chameleon for other types of cards. For example, if an card/account corresponding to a driver's license is selected, then the electronic ink can be changed to display a photograph of the driver, the driver's signature, and a bar code on one side of the card, and the other side of the card can display text data.

A multifunction memory (e.g., magnetic stripe and/or smart chip) card can be created with the looks and characteristics of a stand alone single issued card. The multifunction card can repeatedly have its appearance changed to correspond to any change in magnetic stripe data. The card's image (e.g., a VISA® card) can always match the account (e.g., VISA® account) currently stored in the card's magnetic stripe. As previously discussed, the same multifunction card can be used in a plurality of card situations, including those situations involving card readers, bar code readers, visual inspections for signature, etc.

In the exemplary embodiment, the multifunction card includes electronic ink that uses the principal of electrophoresis, the movement imparted by an electric field to charged particles that are suspended in a liquid. The electronic ink comprises a liquid substance that responds to electrical impulses to enable changeable text and image displays on a flexible surface. The electronic ink can include millions of tiny "switchable" microcapsules or cavities. The microcapsules can be of transparent polymer. The microcapsules can be suspended in a liquid carrier medium that allows them to be printed. The microcapsules can be about 100 microns wide. Each microcapsule can be filled with an ink or oily substance (dark dye), along with hundreds of pigmented chips (or balls or particles) which have a positive or negative charge and which can move or float inside the microcapsules. For example, the chips may be white and the ink blue.

A microcapsule may be positioned adjacent a single electrode or positioned between two electrodes to receive an electric charge. When an electrical charge is applied to a microcapsule, the chips therein move either to the top or the bottom of the microcapsule (depending on the applied polarity of the charge and the charge of the chips). When pulled/pushed to the top, white chips make the microcapsule look white. This makes the surface of a card appear white to a viewer at that spot. When white chips are pulled/pushed to the bottom, then only the dark ink is viewed (at the top of the microcapsule). This makes the surface of a card appear dark to a viewer at that spot. A pattern of charges applied in concert enables a card to have a display of images and text. Patterns of white and dark can be created on a large scale (such as the size of a card) to form on a card black words and sentences on a white background (or vice versa).

FIG. 107 shows an electronic ink microcapsule 740 with white chips 742 therein. It should be understood that the examples herein regarding electronic ink are not necessarily drawn to scale. The microcapsule 740 also includes dark liquid 744 therein (although not shown as dark for reasons of clarity). The chips 742 are positively charged. The microcapsule 740 is positioned between an upper negative electrode 746 and a lower positive electrode 748. The difference in polarity causes the chips 742 to be positioned adjacent the top of the microcapsule 740. In this shown example the microcapsule 740 would appear white when viewed from the top. Contrarily, when viewed from the bottom the microcapsule 740 would appear dark.

It should be understood that alternative arrangements of microcapsules may be used. For example, microcapsules can be used that contain chips of different colors. Dark chips can take the place of dark liquid in representing a dark surface. Microcapsules can have positively charged white pigment chips and negatively charged black pigment chips (or vice versa) suspended in a clear fluid. The white particles can be a solid sphere of white titanium dioxide. The microcapsules can be positioned (printed) between thin, flexible electrodes, e.g., a top transparent electrode and a bottom electrode. When a (top) negative electric field is applied or generated, the white particles (e.g., chips) move to the top of the microcapsule where they become visible to the card user. An opposite (bottom, positive) electric field can pull the black particles to the bottom of the microcapsule where they are hidden from view. The capsules become visible to a user as white. When charge is reversed, the particles are moved to make the capsules look darker. Suspended in a liquid such as water, the microcapsules can be printed on a surface or an electrode-bearing material just like regular ink.

It should be understood that different particle/chip and electrode arrangements may also be used. For example, an arrangement may include positively charged black chips and negatively charged white chips.

FIG. 108 shows a microcapsule 750 with white chips 752 and dark (black) chips 754 therein. The microcapsule also includes a clear liquid 756 therein. The white chips 752 are negatively charged. The dark chips 754 are positively charged. The microcapsule 750 is positioned between an upper negative electrode 758 and a lower positive electrode 760. The charged electrodes 758, 760 cause the dark chips 754 to relocate to a first microcapsule end 762 (i.e., the top end), whereas the white chips 752 gather at the opposite microcapsule end 764 (i.e., the bottom end). In this example the microcapsule 750 would appear dark when viewed from the top.

FIG. 109 also shows a microcapsule 770 with white chips 772 and dark chips 774 therein. The microcapsule 770 also includes a clear liquid 776 therein. The white chips 772 are negatively charged. The dark chips 774 are positively charged. The microcapsule 770 is positioned in a gap between pairs of upper and lower electrodes. The pairs of electrodes include both positive and negative electrodes. One electrode pair has an upper negative charge 778 and a lower positive charge 780. The other electrode pair has an upper positive charge 782 and a lower negative charge 784. The mixed charges acting on the microcapsule 770 cause the chips in the left and right halves of the microcapsule 770 to act differently. The dark chips 774 in the left half are moved to the top of that half. The white chips 772 in the left half are moved to the bottom of that half. The white chips 772 in the right half are moved to the top of that half. The dark chips 774 in the right half are moved to the bottom of that half. In this example the microcapsule 770 would appear as a combination of white and dark when viewed from the top. Such an color arrangement could be used as a border between dark text on a white surface. Of course placing the microcapsules of FIGS. 107 and 108 adjacent each other can also result in the creation of a dark/light boundary.

In other embodiments, higher voltages can be implemented to cause movement of colored (red, blue, green) chips, which may also be of a different weight.

Alternatively, Gyricon display technology may be used. A Gyricon sheet (of electronic reusable paper) can be a thin layer (e.g., about 12-15 mils) of transparent plastic or silicon rubber in which millions of microscopic beads or balls are randomly dispersed. The beads can be of plastic with a diameter of about 0.03-0.1 millimeters. Smaller sized beads can be used for higher resolution. Each bead can be contained in an oil-filled cavity or pocket (which may be a microcapsule). The cavities can be formed by a rubber (or plastic) sheet absorbing oil to produce oil-filled pockets around each bead. Each bead is free to rotate within its cavity. The solid beads can be black on one side (first half) and white on the other side (second half). That is, the beads can be bichromal or two-tone, with hemispheres of two contrasting colors (e.g., black/white, red/white, green/black, blue/red, first color/second color, etc.). The bichromal beads/balls can be charged so that they exhibit an electrical dipole. Each bead can be given an electric charge that is greater on one side than the other. For example, one side may be positively charged and the other side negatively charged. The rotational orientation of a bead can be manipulated via electric impulse. When voltage is applied to the surface of the sheet, the beads rotate (and/or twist) to present one colored side (or a portion of a side) to the viewer or viewing plane. The beads can be rotated fully (180 degrees) or partially (>0 to <180 degrees) to produce colored patterns on the sheet surface. Patterns of voltages can be applied to the surface to create particular images, including text and pictures. Together the beads can act as pixels to display the images. The images can be updated much the same way as with a display monitor. The image will persist until a new voltage pattern is applied. The cavities can be positioned adjacent a single electrode, or they can be positioned between a top transparent electrode and a bottom electrode.

FIG. 110 shows a bichromal bead 790 rotatable in a fluid cavity 792. The bead 790 has a white portion (or half) 794 and a black portion (or half) 796. The desired position of the bead 790 in the cavity 792 can be achieved by application of a predetermined voltage (such as via one or more electrodes) adjacent the cavity. The shown bead 790 has been electronically oriented so that the white half 794 is the top half and the black half 796 is the bottom half.

FIG. 111 shows the same bead 790 reoriented such that the white half 794 has become the left half and the black half 796 has become the right half.

FIG. 112 shows the same bead 790 reoriented so that the black portion 796 has become the top half and the white portion 794 has become the bottom half It should be understood that the bead's rotational location in FIG. 111 can also be an intermediate transitory position (e.g., a snapshot) during its movement between the locations shown in FIGS. 110 and 112. It should further be understood that terms such as top, bottom, left, right, are used to facilitate an understanding of the wide range of various arrangements, and that the invention is not to be limited to such arrangements.

FIG. 113 shows a transparent plastic sheet 800 in which bichromal beads 802 can be located along with a clear fluid. The sheet top portion 804 is shown pulled away from the sheet remaining portion 806 so that the beads 802 can be better viewed. Each bead 802 in the sheet 800 is shown having a positional orientation like that of FIG. 110. In this example, the closed sheet 800 would appear white when viewed from the top.

Still other arrangements of electronic ink can use chips/balls/beads (and ink) of even more colors (besides only white and black) to enable the generation of multicolor (red, blue, green) displays. Filters can also be used to produce color. A fine colored filter can be laid across the top of a monochrome display. The filter can make each pixel appear as red, green, or blue when the pixel below it is white. When the pixel below it is black, then the filter reflects very little light so no color (except black) is seen. Color filter arrays, such as those by Toppan Printing Company, can be used with an electronic ink display. In other arrangements, microcapsules can be made to act as colored filters. Additionally, subtractive color can be used for a full range of colors. The use of subtractive color can involve transparent beads with thin disks of color filter material of cyan, magenta, and yellow, each addressable by different voltage levels.

In an alternative exemplary multifunction card embodiment, organic light-emitting diodes can be used in combination with (or instead of) an electronic ink display. Carbon-based compounds similar to the plastics and flexible displays discussed herein can produce light-emitting semiconductors that are also pliable and energy efficient.

Electronic ink can be applied to the same card materials (e.g., plastic) that regular ink can be printed on. To form an electronic ink display, the ink can be printed onto a sheet of plastic film that is laminated to a layer of active matrix drive circuitry. The circuitry forms a pattern of pixels (which may include microcapsules/beads) that can then be controlled by a display driver or changer. Microcapsules/beads can be suspended in a liquid carrier medium that allows them to be printed using existing screen printing processes onto virtually any surface, including plastic. In an exemplary arrangement, about 5-95% (including any range therebetween) of one or both sides of a multifunction card are covered with at least one electronic ink display.

Electronic ink can be combined with thin, plastic, flexible transistors to create smart pixels. A sheet surface (e.g., a side face of a card) can be divided into cells or grids, with each cell wired with microelectronics embedded in the plastic sheet or film. Tiny computer circuits or transistors can be printed onto the surface using silicon "rubber stamps" or other known printing processes. Microcontact printing (μCP) can be used for producing the transistors on a flexible substrate. A microfabricated "rubber stamp" can be made of polydimethylsiloxane (PDMS), which can transfer a patterned monolayer of organic molecules onto a substrate. For example, a substrate can be a gold layer, 20 mm thick, which serves as the source/drain level of the transistors. An organic semiconductor material (e.g., pentacen) can be used in the transistors. The material (e.g., pentacen) can be mechanically flexible and can be deposited on plastic substrates at low temperatures. Thus, along with the ink printed on a surface (i.e., a digital page) can be tiny microprocessors and circuits that perform various functions. These microelectronics can be used to apply the adequate positive or negative charge needed to move/flip the chips/balls/beads/particles from one position to another in order to create the desired images or text. For example, as previously discussed, a MasterCard® logo image on a card can be changed to a VISA® logo image, and vice versa. Electronic ink enables a card to have a thin flexible plastic display with the repeatable abilities of instant erasure, redrawing of a new image, and reuse millions of times without wearing out. The exemplary multifunction card with an electronically driven electronic ink display can instantaneously overwrite a currently displayed image with a different image.

FIG. 114 shows an electronic ink display arrangement 810 for a card. Electronic ink 812 is printed onto a sheet of transparent plastic film 814. The film 814 can contain (or be laminated to) one or more layers of active matrix drive circuitry 816. For clarity the circuitry 816 and the electronic ink 812 are shown separately. The microelectronics 818 in the circuitry 816 enables different charges to be applied to different portions of the electronic ink 812 to produce a predetermined image pattern. One or more processors in (or associated with) the card can be used to control the microelectronics 818. The card can rely on an internal or external power source (e.g., display driver). As shown in FIG. 114, the electronic ink 812 can be electronically manipulated to produce a VISA® image 820. It should be understood that for reasons of clarity not all of the microelectronics needed to produce the complete VISA® image 820 are necessarily shown.

A card can be viewed as having an ink display cell. The ink display cell including a frontplane laminate section and a custom backplane section. The frontplane includes the electronic ink and shows the display. The backplane includes the microelectronics. The ink display cell combined with an electronic driver can constitute an ink display module. The electronic driver (drive electronics) can supply the power needed to change the display.

A display can be electronically written with electronic ink on a card as a bi-stable or image-stable color display. That is, the display remains fixed until another charge is applied to change it. In an exemplary embodiment, an electronic ink display is an ultra-low power, reflective, active-matrix color electronic ink display, with the capability of displaying 4,096 colors with a resolution of 320×RGB×234. Other displays can have a panel of 800 by 600 pixels, an output resolution at 80-170 pixels per inch, or about 300 monochrome dots per inch (dpi). It should be understood that these display capabilities are exemplary and that other display capabilities/parameters are within the scope of the invention.

In an exemplary embodiment the electronic ink only needs power when changing its display. As previously discussed, a card may have its own power source. Alternatively, a card display may be changed by receiving electric power from an external power source, such as the portable terminal. The card can have a miniature power connector to connect to the power source (e.g., portable card terminal) to receive the electric power. The power source enables voltages to be applied to the card's electronic ink to create images, including text and pictures. The image will persist until a new voltage pattern is applied.

The card can be fed into a terminal to have its image changed. The terminal can be compact to permit it to be carried in a purse, wallet, or briefcase. The terminal can act like a printer-like device that can erase old card images and create new card images. In a different arrangement, the terminal has the power source along with the electrode structure needed to cause an image pattern to be changed on the card. The card can be placed adjacent to the terminal's electrode structure. The power source can supply the terminal's electrode structure to rearrange the chips/balls in the card's electronic ink to display another image.

As previously discussed, the card can be packaged with its own electrode structure (or a portion of the electrode structure). This permits the card to function more like a traditional display. A card may comprise a collection of separate electronic ink displays to permit different images on a side of the card. Likewise, separate electronic ink displays can be used on both sides of a card. A processor can be used to link the separate displays. In other arrangements, two separate electronic ink display modules can be fastened together back-to-back. Each display module can have its own processor. Again, a common processor can be used to link the modules so that the front and rear displays correspond. With the appropriate electronics stored in both side of a card, the two card sides (front and rear) can be updated simultaneously to display different content on each side, with the differing content corresponding to the same account. With the multifunction card having the ability to change the appearance of both of its sides, it can replicate several different looking financial cards (e.g., credit card, debit card, smart card) or other types of cards, e.g., bank card, ATM card, merchant card, health card, library card, identification card, access card, driver's license card, professional license card, and other types of cards).

A card may carry its own power source along with its electrode structure. For example, an ultra thin battery, such as from the company Power Paper, can be stored in the card. The battery can be 0.5 millimeters thick (or less) and generate 1.5 volts (or more) of electricity. The anode and cathode can be fabricated from inks. The battery can be printed onto a substrate surface. This enables a battery to be integrated into the production and assembly processes using electronic ink. That is, an ultra thin battery can be embedded in electronic ink.

With a card having its own power source (and electrode structure or microelectronics), the card holder can manually change the card appearance. For example, the card may have an input device, such as one or more keys or buttons, that enables the user to change the card display. A card button can enable a user to flip through programmed displays. The card button can be pushed to flip to the next image in the storage loop until the desired image is displayed (as confirmed by the user viewing the appearance of the card). For example, with three (A, B, and C) images sequentially stored in the card memory, and with the card currently displaying image A, then pushing the button twice would switch the card display to that of image C. A further single input to the input button would cause the card to display the next image (i.e., image A) in the image storage loop. Electrically erasable programmable memory sticks can be used in setting the image/text.

As previously discussed, a multifunction card can use electronic ink to display particular graphics and images, including text and pictures. However, the instantaneous erasable/rewritable character of electronic ink further permits the display of video. Thus, it should also be understood that an exemplary multifunction card (such as one having its own power source) can replicate stored video. Other exemplary multifunction card arrangements can combine image/video with sound. Thus, a multifunction card can be used to display messages or advertisements. For example, prior to allowing the user to select or fix the VISA® image for the card, the card programming first requires the card to display a video advertisement related to a special offer from VISA®.

The exemplary card can have a processor that can communicate with other devices. The communication can be in a wireless manner. The card (or terminal) can receive a wireless download from the terminal, a computer database, or the Internet. For example, card advertisements can be updated automatically via wireless communication with the card and a host, or during card connection with an updated terminal. The card (or terminal) can have a memory device, such as a programmable memory. A wireless download can include another image pattern or voltage pattern to be stored in the card's (or terminal's) memory. The received image may be an updated image of an existing card image corresponding to an account already stored in the card. For example, the updated card image may be the same except for the display of a new expiration date.

A card may also receive a wireless communication instructing the card (or terminal) to change the card display. For example, the card may be instructed to upload a specific image pattern from its memory and (if necessary) cause the pattern to be activated (or charged) to switch from the current card display to a different specific card display. In certain arrangements the card can transmit back to the instruction provider a confirmation message that the display was changed. In other arrangements the card can be instructed to display an advertisement or message. The card can be programmed to return to the original display (prior to the advertisement) upon acknowledge of the advertisement by the user (such as by pressing a cancel button).

A multifunction card can also have security measures to prevent unauthorized access to the accounts associated with the card. For example, a card user may be required to provide at least one identifying input prior to being permitted to change accounts. This may include the card user providing a biometric input, such as a fingerprint, to the card. Alternatively, the card can be programmed to covertly capture a fingerprint. The card (or terminal) can have a miniature device/processor capable of comparing the provided fingerprint to an authorized fingerprint. Alternatively, the card can wirelessly transmit captured fingerprint data to a remote host for external comparison and authorization.

The image displayed on a multifunction card can also be changed by manually providing the power source or image-changing tool. This allows a card holder to electronically sign the card. For example, a card image can be electronically changed by the card holder using an electronic pen or pencil. The electronic pen can be used to overwrite a portion of the image(s) currently displayed on the card. A charged pen causes charged chips/balls in the electronic ink to move. An electronic pen can be placed adjacent the electronic ink to cause the creation of a black (or dark) pattern.

An electronic pen may have a switchable polarity. With a first pen polarity a portion of the card can be whited-out. That is, the card signing area is changed to represent all white. With the opposite pen polarity the pen is moved along the card in the card signing area so that the chips/balls closest to the center of the pen are rearranged to represent black instead of white. Thus, a black line is bordered by a white area to create the user's signature. The card holder's signature can be displayed as part of the overall card image.

In alternative arrangements, a white signature block creating device (e.g., an electronic stamp) can be used by the card holder instead of a pen. The signature block can have the signature already stored therein.

Alternatively, a whitened signature area may already be stored as part of a card image. Thus, when the image appears, the card is already for signing with an electric pen.

In a further alternative arrangement, a stored card image may already include a white signature block with the card holder's black signature therein. The filled signature block is displayed as a part of the card image. In such a card arrangement no additional signing is needed.

In still other alternative arrangements, the card memory can include a filled signature block stored therein, as previously discussed. However, the location of the signature block on different cards may vary. The signature block can be stored as a separate image. The card (or terminal) processor, in accordance with the selected account, can determine where the signature block is to be displayed on the card. The card (or terminal) can be programmed to automatically place the signature block on the card at the correct location. This location can correspond with the blank signature block (if available) positioned on the card as part of the card image.

It should be understood that an image-changing multifunction card of the exemplary embodiment can still retain a magnetic stripe. The magnetic stripe can be positioned at a reserved area on the card. For example, the stripe may be located outside of or border an image display area. The magnetic stripe can also be located between two or more display areas. As previously discussed, data corresponding to an account selected from a plurality of accounts stored in the programmable memory of a card can be placed on the magnetic stripe of the card. That is, the card can have magnetic stripe data corresponding to account data stored in card memory. As previously discussed, a terminal can be used to change the data of the magnetic stripe. Likewise, the programmable memory of the card can include image data. That is, the card can also have image data corresponding to the user-selected account. Hence, the magnetic stripe and the images displayed on the front and back of a card can all correspond to the same selected account. These card variables (e.g., magnetic stripe data, front display image, rear display image) can be repeatedly changed to accurately represent any one of several different cards/accounts with only one multifunction card.

In another alternative exemplary embodiment, charged electronic ink chips/balls/beads/particles can be used to provide magnetic flux reversals. An electronic ink microball/bead can include a material, such as a ferrous material or other material, that can be magnetized or otherwise exhibit magnetic properties. The entire ball or only a portion thereof (e.g., a half portion) can include such a material. Charged electronic ink balls can be electronically positioned to impart magnetic effects. For example, a bichromal ball can be one half black and the other half white, with only the black portion including a material that can exhibit magnetic properties. The charged ball can be electronically rotated so that its black half is positioned as the upper half of the ball. The black portion can be magnetized via a magnetic field to impart a magnetic flux (e.g., a positive or negative flux). Thus, an article (e.g., card, check, etc.) containing the electronic/magnetic ink can be read magnetically. In other arrangements using different colored balls/chips, either the light-colored balls/chips or the dark-colored balls/chips (such as those in a microcapsule) can be used to impart a magnetic flux.

A magnetic field can be applied to an arrangement of electronic ink balls to reverse (or initialize) their magnetic flux (e.g., from positive to negative) in the same manner in which a magnetic stripe can be encoded. In some embodiments a ball can be rotated or otherwise moved to change its detectable magnetic properties. Therefore, some balls can be positioned to impart a relatively stronger (positive or negative) magnetic flux for detection (magnetic reading) while other balls are positioned so that their magnetic properties are relatively weaker to a detector scanning a particular surface. The electronic ink can be used to create a readable magnetic pattern.

The use of magnetic materials enables electronic ink to electronically display a magnetic stripe on a card. Thus, the entire side surfaces of a card can be displayed. Not only can the stripe be displayed as an electronic image, but the displayed stripe can also have actual magnetic properties. The card's electronic ink stripe both looks (via its electronic display) and acts (via magnetic flux properties) as a magnetic stripe. Hence, the stripe can actually be used as a magnetic stripe enabling magnetic reading thereof. The magnetic stripe can be changed or reconfigured electronically. The stripe can be electronically encoded to provide magnetic flux reversals. The previously discussed ability to impart magnetic properties to electronic ink also permits the placement of micr code magnetic characters on a card, check, or other article.

The use of electronic ink having magnetic properties provides for a reusable item, such as a financial check. Financial checks have been previously discussed. An electronic/magnetic check can be written or filled out using a "printer" device attached to a computer. The "printer" device can be controlled by the computer to electronically change the appearance and/or magnetic properties of a reusable electronic ink check. Two items can even have the same visible appearance but different magnetic properties.

The computer can have access to a stored electronic template of a paper check. The computer may create the electronic check template by having a paper check scanned and stored into the computer. As previously discussed (e.g., FIG. 97) an electronic check template can include the data and layout that commonly appear on every blank check of a particular check holder, such as the bank name, payer name, payer address, and checking account number. The user can instruct the computer as to which features of a scanned check belong in the electronic template. An electronic check template can also include electronic ink positioning data which can be used to position electronic ink balls having magnetic property so as to represent an account number, bank routing number, etc. in a magnetically readable format. The electronic check template can be used by a computer to reconfigure electronic ink on a reusable electronic ink check. A computer program can be used to reconfigure electronic ink to represent the data in a check template. The computer can also keep a record of the check number, date, and other check information. This enables electronic ink checks to be printed/created with sequential check numbers, current date, and signature. The computer may also receive input from a check writer to fill in the empty information fields in the electronic check template before the electronic ink check (image) is "printed." The inputted information can include the check amount, the payee, etc. The user-supplied information enables an electronic ink check to be completed for use in a transaction. The computer can be a hand-held device.

Alternatively, a tool or device (e.g., an electronic pen) can be used to input (fill in) the needed information (e.g., check amount, payee, etc.) after the computer has already caused the "printing" of the electronic ink check (image). For example, an electronic pen can be used by the payer after an electronic ink reusable check has been "printed" or reconfigured by a "printer" in operative connection with the computer. The "printer" (which may include a computer, electrodes, microelectronics, etc.) can be used to electronically alter the appearance and magnetic properties on a reusable check or item. A reusable check can also have microelectronics similar to those previously discussed with regard to an electronic ink card (e.g., FIG. 114). Likewise, the appearance of a reusable electronic ink check can be changed in a manner similar to the previously discussed process of changing the appearance of an electronic ink card (e.g., FIGS. 103-106).

A reusable electronic ink check can be used in the same manner and for the same purposes as a paper check. That is, a reusable check can be used in a transaction, e.g., payment, deposit, exchange, etc. The transaction may be used in conjunction with an imaging device. The imaging device can be of the type which enables reading and generating an electronic image of a document, such as shown in U.S. Pat. No. 5,534,682 or U.S. Pat. No. 5,923,413, the disclosures of each being incorporated herein by reference as if fully rewritten herein. An imaging device enables the images of both sides of an electronic ink check to be electronically captured. Thus, a complete imaging of a check can be substituted for use in processing of the actual check. For example, a reusable electronic ink check may be deposited into an ATM that can recognize and verify an electronic ink check as acceptable for deposit. The ATM can include at least one imaging device that is operative to digitally capture images of the reusable electronic ink check. The captured digital images can be stored and/or transmitted electronically to a check clearinghouse or processing center. The captured digital images can also be transmitted electronically (e.g., via e-mail) to the depositor. The images transmitted to the depositor may include or be associated with a message, such as "canceled" or "deposited," confirming that the check was accepted for deposit. In other arrangements the micr code information on the check can be magnetically read by a micr reader. An ATM can use the micr code in verifying an electronic ink check as acceptable for deposit. The micr code can be stored and/or transmitted along with the check image to the processing center.

Once the images of an electronic ink check have been captured, then the check can be erased and returned to the payer for reuse. An erased check can be electronically (and magnetically) altered (e.g., while in an ATM) so that it's electronic ink is no longer in the position of a valid (or readable) check. The erasure may be a part of the image capturing process. A completely erased electronic ink check can be returned completely blank, e.g., all white. An erased electronic ink check may be physically returned to the user with an electronic marking or message thereon, such as "canceled." An erased electronic ink check may also be returned in its blank check or base template format, i.e., devoid of necessary information. This template return arrangement enables the check owner to quickly reuse the check by again inputting (such as via an electronic pen) the information (payee, amount, etc.) necessary to complete the check. The electronic ink image of the base template can act as read only memory and be unchangeable to any device other than the user's computer program. In other arrangements, the check can include an RFID tag reader that can recognize a unique RFID tag in the owner's electronic pen. Upon recognition of the rightful owner, the check permits its completion (or alteration). Alternatively, the template image can be electronically burned into the electronic ink check so that it remains permanently fixed. In still further arrangements, a reusable check can have a permanent paper template portion in combination with a changeable electronic ink portion. The electronic ink portion of the reusable check can be changed to display the transaction specific information (payee, amount, etc.) necessary to complete the check. Again, the electronic ink portion of the reusable check can be erased. Thus, an electronic/magnetic electronic ink reusable check can be received for a transaction, imaged for check processing, erased, and returned to its user (or owner). Alternatively, instead of returning an erased check to the current check holder, an ATM may destroy the check or reuse it in another ATM transaction involving a different check holder.

In alternative electronic ink check arrangements, an ATM can create a reusable electronic ink check. A fee may be charged for the service of producing a reusable electronic ink check. The ATM can receive from an ATM user the information necessary to create a completed electronic ink reusable check. The information may be inputted (via an ATM keyboard, touch screen, phone, wireless device, etc.) to the ATM by the check requestor. A user need not have a checking account to have a check created. Information may also be obtained upon reading an inputted user card. For example, the ATM can use account data ascertained from an inputted user card to garner data necessary in creating an electronic ink check. Alternatively, the ATM can be used to create a reusable electronic ink check template (i.e., reusable blank check) for a check requestor. An ATM can have a supply of never used reusable checks waiting to be formatted and completed for a check requestor. A reusable check generated by an ATM can also comprise a reusable check that was previously erased following its deposit into the ATM by a previous check holder.

In alternative embodiments, different electronic/magnetic arrangements can be used. For example, a separate entity (e.g., a ferrous material) that can exhibit magnetic properties can be mixed or combined with electronic ink material. The combination would result in a mixture of distinct materials, one of magnetic properties and one of electric properties. The materials can be manipulated to cause an electronic display that has magnetic flux properties.

An exemplary arrangement includes an automated banking machine (e.g., ATM) that uses electronic ink to display instructions or other information to a user of the machine. A plurality of electronic ink displays can be strategically situated at various locations on the automated banking machine. The displays can be of a form and dimension so as to replace tangible instructional labels or indicia currently used on automated banking machines.

The displays can be used to provide ease of automated banking machine operation. The electronic ink displays are operatively connected to one or more processors, which may include an automated banking machine computer. The electronic ink displays can operate in a manner similar to the previously discussed electronic ink displays.

The electronic ink displays, like the tangible labels, can indicate the functions of various components of the machine. The displays, like the labels, may show instructional icons and text. An electronic ink display label may be electronically changed by a machine computer. For example, the language (e.g., English, Spanish, French) displayed in an electronic label may be changed to fit a given machine location. Electronic ink displays or labels may also be changed by a remote host computer in connection (e.g., via a proprietary line, the Internet, etc.) with the automated banking machine.

The electronic ink displays can be positioned to indicate to a user where and how to provide an input and/or where and how to receive an output. The information can be displayed to assist a user in carrying out a transaction with an automated banking machine. The displays can be operated to display features, such as text messages/icons in various colors. The display presented in an electronic ink label can remain fixed until power is applied to change it, as previously discussed.

In some situations an electronic label message may remain unchanged while the machine is at a given location. For example, a label located adjacent to an ATM cash dispenser outlet may display the image of a plurality of currency notes. The electronic image can represent the area on the ATM where currency notes are dispensed.

In other situations an electronic label may function as a conventional automated banking machine main display. That is, the display or message shown by the label may be changed several times during a transaction. For example, an ATM label may be used to provide the messages "Please insert card," "Please enter PIN," "Please enter amount," "Please remove cash," "Please remove card," and "Please remove receipt."

An automated banking machine label may be used to instructionally walk a machine user through a transaction. For example, a flashing color, a pointing arrow, an animated help assistant, etc. can be presented via a label to instruct or notify the user of an action needed to be performed. Lead through indicators in plural colors (e.g., three colors) may be used to indicate the specific component to which the user's attention is needed in a transaction. Instead of only a (large) single main display screen, a plurality of (smaller) display labels can be located on the machine. Furthermore, the electronic ink display labels can be strategically positioned on the machine to enable a user to easily operate the machine to perform the transaction.

The electronic ink displays are particular useful when different automated banking machines, such as ATMs, have different user interfaces. For example, a user may be unfamiliar with the locations of input and output devices on a particular ATM. The unfamiliarity may be the result of the user's first operation of the particular ATM. The use of plural electronic ink displays enable users to become more efficient users. ATM efficiency can be enhanced because interactive electronic ink instructions enable a new user to spend less time at an unfamiliar ATM.

In an exemplary display arrangement, electronic ink displays can be situated adjacent to input devices and output devices of a user interface of an ATM. For example, displays can be located on an ATM next to a cash dispenser opening, a keyboard, function keys, and a card input slot. Other electronic ink displays can be located adjacent to other machine input and output devices.

An electronic ink display next to a card input slot can indicate to a user where the slot is located. For example, a flashing arrow can direct the user's attention to the card input slot. Thus, the display can notify the user of the location of the card input slot. The display can also show a user how to insert a card into the machine. The display can present a showing of how a card is to be oriented for proper insertion into the machine. The showing may be a pictogram.

If a card is inserted into the card input slot in a wrong orientation then the card can be returned to the user and a display presented notifying the user why (e.g., wrong orientation) the card was not accepted. Sensors can be positioned to sense the insertion of the card into the card input slot. An ATM computer can receive signals from the sensors that a card was inserted. The ATM computer can also receive signals from the card reader (which can read a card inserted into the card input slot). The ATM computer can determine, based on the inability to read a sensed card, that the card was inserted incorrectly. The ATM computer can then control the display (or another display) to inform the user that the card was not properly oriented, and to please review the orientation in the presentation provided for inserting a card. For example, an electronic ink display may be caused to generate a message stating "Please position card as shown, then insert." The same display (located next to the card input slot) can later (after transaction completion) be used to remind the user to take their card. That is, the same display can be used to present different messages at different stages in carrying out an ATM transaction (e.g., a cash withdrawal).

Figure 115:
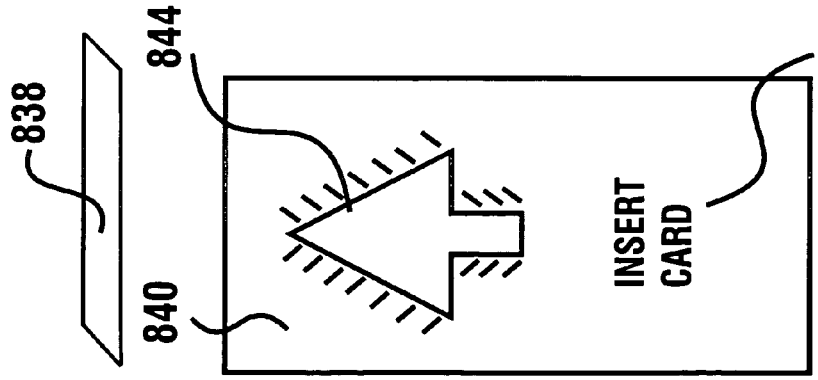
FIG. 115 shows an electronic ink display positioned next to a card input slot and presenting an instruction.

FIG. 115 shows an electronic ink display 840 positioned next to a card input slot 838 of an ATM. The display module 840 may be aligned with the slot 838. FIG. 115 shows the electronic ink display 840 presenting the message "INSERT CARD" 842 in correspondence with an arrow 844 that points to the card input slot 838. The display 840 (or at least a portion thereof) can be quickly repeated to cause the arrow to be viewed as a flashing or blinking arrow. The arrow's color can be different from the message's color and the background color. The display shown in FIG. 115 informs a user where to insert a card into the ATM.

Figure 118:
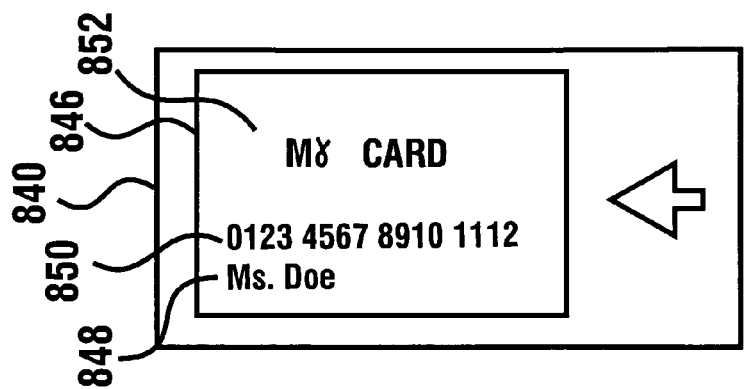
FIG. 118 shows a further stage in a simulated movement of a card in an insertion direction.
Figure 117:
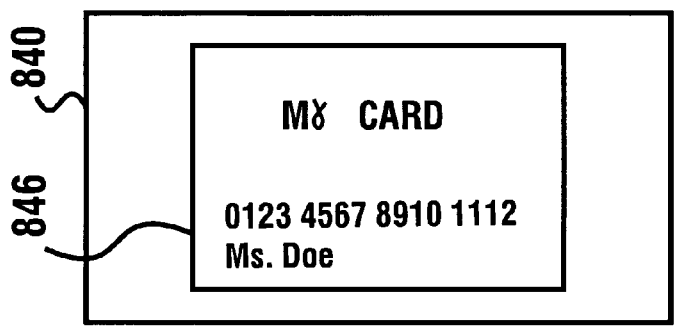
FIG. 117 shows another stage in a simulated movement of a card in an insertion direction.
Figure 116:
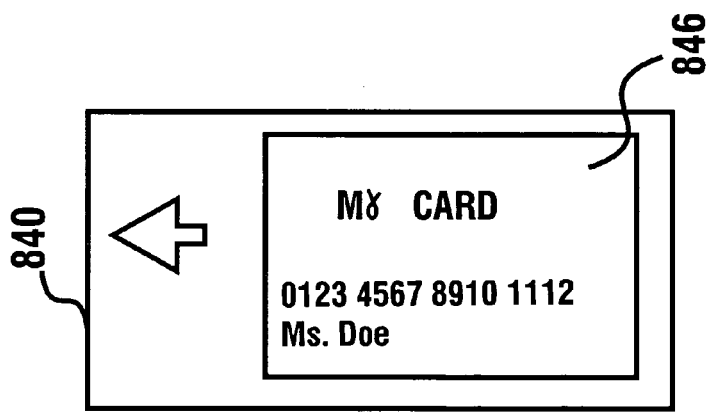
FIG. 116 shows a stage in a simulated movement of a card in an insertion direction.

Simulated movement and orientation of how to properly insert a card can be shown using a single presentation or several sequential presentations on the same display. Several different presentations can be rapidly changed to give the representation (and appearance) of a moving card. MPEG format may be used. FIGS. 116, 117, and 118 show the display 840 presenting simulated card insertion movement. An electronic ink card 846 can mimic the appearance of a conventional physical card that may be used in carrying out an ATM transaction. The displayed card 846 may contain information thereon corresponding to a card holder name 848 (e.g., Ms. Doe), an account number 850 (e.g., 0123 4567 8910 1112), and a card logo 852 (e.g., My Card). Other information may be displayed as being on the electronic ink card, such as the name of institution that issued the card, expiration date, etc.

FIG. 116 shows the proper orientation of the imaged card 846 for insertion into the ATM. FIG. 117 shows another electronic image of the same card 846. The electronically imaged card 846 is shown further moved in the insertion direction (relative to the position of FIG. 116). FIG. 118 shows the same card 846 positioned even further in the insertion direction (relative to the position of FIG. 117). FIGS. 116 and 118 also show the electronic ink display 840 presenting a small directional arrow. The combination of FIGS. 116-118 represent movement of a properly oriented card in a proper direction for card insertion. That is, FIGS. 116-118 present a card moving in the direction of insertion.

The sequence of FIGS. 116-118 can be quickly presented, followed by a timed pause, and then the display sequence of FIGS. 116-118 repeated again. The display sequence and timing process can be repeated until a user card is properly inserted. The pause can be used as a bearing point to provide a customer time to understand the order of the card insertion presentation. During the pause, the display of FIG. 115 may be presented.

Card images can also be displayed as overlapping. For example, the image of a card's next insertion position can be slowly focused in as the card's previous insertion position is slowly faded out to further affect card movement. The focusing and fading can be proportionally related to represent 100% of a card's intensity (or density) for display. For example, while 70% of the density of FIG. 116 remains, 30% of the density of FIG. 117 is shown. Likewise, as the card's (increasing) intensity being displayed in FIG. 117 reaches 90% of full (100%) display, only 10% of the card's (fading) intensity remains displayed in FIG. 116.

Although only a few card positions have been shown, it should be understood that numerous card positions may be displayed, especially if video-like quality is to be presented. Furthermore, displayed instructions on how to insert a card may be correspondingly combined (via a computer) with an ATM output device that can provide audio instructions. An audio instruction may state "please insert your card as shown." The audio and visual information can be presented in sync. Thus, an ATM can provide a combination of display/voice instructions.

It should also be understood that other displayed images and audio messages can be presented. For example, an ATM may inform a customer to "please remove your card" via both audio communication and electronic ink display communication.

In some arrangements the same familiar electronic help assistant can commonly appear in each of the differently located electronic ink displays on an ATM customer interface. This enables a customer to look for the same assistant for help in carry out a transaction. The ATM can have a default help assistant. In alternative arrangements the ATM may randomly choose an assistant for the transaction. A user-preferred assistant may be encoded on the user's ATM card. After the user has been authorized to operate the ATM, which may have included the user providing a proper PIN, then the ATM can switch to using the assistant read from the card. Thus, the user-preferred assistant can be used by the ATM in any remaining displays for that ATM session. In alternative arrangements, after the user has been granted authorization to operate the ATM, the user has the option of selecting a new assistant (for ATM session usage) from among several different help assistants offered by the ATM. The ATM can also be operated by a user to store the chosen assistant as the designated (preferred) help assistant on the user's ATM card.

Figure 119:
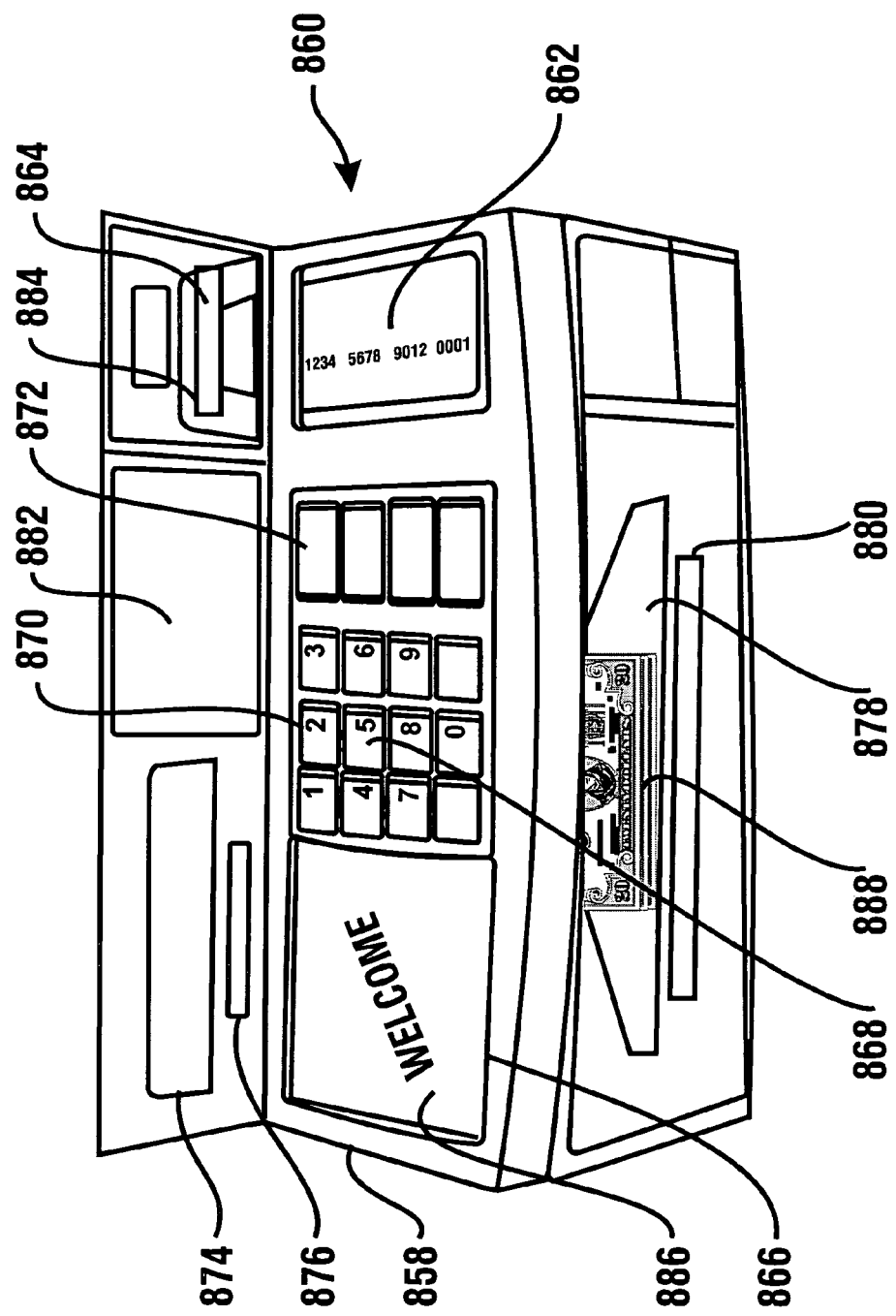
FIG. 119 shows an ATM with a plurality of electronic ink display labels.

FIG. 119 shows an ATM 858 having a user interface 860. The interface 860 includes plural electronic ink labels. Labels are situated close to appropriate interface openings in order to identify to the ATM user the function of the ATM module associated with the respective opening. FIG. 119 shows a card insertion/removal label 862 located next to a card input slot 864. A card reader LED 884 (light emitting diode) can selectively provide light to the slot 864. FIG. 119 also shows a keypad label 866 adjacent to a keypad 868 that includes numeric keys 870 and function keys 872 (or buttons). The keypad 868 may be oversized (relative to a conventional keypad) to enable accurate customer input. A receipt label 874 is located next to a receipt (and/or mini statement) outlet slot 876. Another label 878 is adjacent a dispense/deposit opening 880. As shown, the label 878 displays an electronic ink image 888 of currency notes. The electronic image 888 represents the area on the ATM where currency notes are dispensed. The electronic ink labels can be dimensioned in various sizes and shapes. The arrangement shown in FIG. 119 enables a transaction to be carried out with or without a conventional ATM display screen, e.g., a CRT display. Without a bulky conventional main display screen, less space is needed.

The function of the electronic ink labels will now be explained with regard to a successful cash withdrawal transaction. The ATM can initially be at low power, standby mode. Upon sensing a nearby potential customer, the ATM awakes to a higher power. An ATM processor instructs the card insertion/removal label 862 to display where and how to insert a user card. For example, FIGS. 115-118 may be displayed, as previously discussed.

Following successful insertion of the customer's card, the ATM reads the inserted card and instructs the keypad label 866 to display "Please insert your PIN". The display (or displays) shown on the keypad label 866 can also have one or more arrows pointing to the keypad. The customer can use the keypad 868 to input their PIN in obtaining approval to use the ATM for the cash withdrawal transaction.

A label may be programmed to display the entire message or only a single word at a time. For example, the phrase "Please insert your PIN" may be presented as a series of single words (e.g., "Please," "insert," "your," and 'PIN") or plural words (e.g., "Please insert" and "your PIN"). Also, a single (large) message may be presented over adjacent electronic ink displays. That is, "Please insert" and "your PIN" may be displayed on separate labels resulting (in the view of the customer) as the complete message "Please insert your PIN."

The keypad label 866 can next display "Press the number corresponding to your selection." Alternatively another label, such as the auxiliary label 882 positioned above the keypad 868, can be used for presenting the display. A listing of options can then be presented on the display label 866 (or 882). Depending on the length of the list, the options may all be shown simultaneously on the display, or the display may function to scroll the list. The list can contain transactions normally associated with an ATM. For example, the list may include "1. Check Balance," "2. Cash Withdrawal", and "3. Make Deposit". In carrying out our cash withdrawal transaction the customer would press the keypad key corresponding to the number "2". Next, the label 866 (or 882) can output a request to "Please enter amount in dollars." In carrying out our cash withdrawal transaction the customer can use the keypad 868 to enter "60". Next, the label 866 (or 882) can output the message "$60 entered, if correct press 1, else press 3." In carrying out our cash withdrawal transaction the customer can use the keypad 868 to enter "1". The ATM can then dispense the requested cash at the dispense/deposit opening 880 for removal by the customer. The label 878 adjacent the dispense/deposit opening 880 can instruct the customer to "Please take your cash". The ATM can also cause a receipt to be presented at the receipt outlet slot 876. The corresponding receipt label 874 can instruct the customer to "Please take receipt". Likewise, the ATM can return the customer's card at the card slot 864 and instruct the card insertion/removal label 862 to read "Please take card". The messages that are to be presented in the labels 862, 874, 878 may be displayed as soon as that item (e.g., card, receipt, cash) is available for removal by the customer. More than one message can be simultaneously displayed. That is, the labels 862, 874, 878 may each display a different (or the same) message at the same time. After an item is removed, the message corresponding therewith can be erased or cleared. For example, the display corresponding therewith may change to a blank screen prior to returning to a low power, standby mode or inactive state. Alternatively, a label 862, 866, 874, 878, 882 may present a courtesy message such as "Thank you" or "Good bye".

After a predetermined time a farewell courtesy message can be changed to display a greeting message 886, such as "Welcome". As previously discussed, an electronic ink display can remain fixed until power is applied to change it. Thus, while an ATM awaits another customer, an ATM label can remain in an inactive state while still displaying a greeting message.

Electronic ink displays (or labels) can also be used to enhance security. For example, one or more displays can be in operative connection with an encryption pin pad ("EPP"). A display can be controlled to notify a user of when it is safe/not safe to enter their PIN based on the EPP (such as version EPP4) being in or out of encrypting mode. An electronic ink display can be correlated with the EPP status of PIN Entry mode (i.e., Clear Text mode) or Clear Data mode. Even at times an ATM's main LCD display input has been tampered with, the electronic ink arrangement will offer security. The use of a (secondary) electronic ink display can help prevent a customer from entering their PIN in the EPP at an unsecured time.

If someone tampers with a connection from the EPP to the electronic ink display, then the display can show a warning or danger screen to prevent the customer from entering a PIN on the EPP. For example, an electronic ink display may show "Warning—Do Not Enter Your PIN". The EPP keyboard or keypad can be disabled for any data entry until tampering is removed and secure connection is again authenticated. With a secure connection the electronic ink display can show "Please Enter Your PIN".

Similarly, an electronic ink display (or label) can show a warning or danger screen when another card reader has been placed in front of an ATM's card reader to unlawfully capture card data. For example, an unauthorized card reader may have been placed in the card path to receive the inputted card instead of the ATM's card reader. The unauthorized card reader attempts to steal card data without the user's knowledge. The danger screen can be displayed when the ATM card reader does not detect any card entry at the ATM's card reader after a predetermined time interval has passed after the ATM processor requested card insertion via the main ATM display (or an electronic ink display). That is, if the ATM does not detect a card within a set time period after asking for it, then the ATM processor makes a determination that tampering with the card path to the card reader has occurred. Upon suspicion of card path tampering, an electronic ink display can present a danger screen message such as "Warning—Do Not Enter Your Card". The electronic ink warning message can remain actively displayed (without power) even if the ATM shuts down. Alternatively, other electronic ink messages, such as "ATM Out Of Order" or "ATM Undergoing Servicing—Do Not Use", may be displayed. The display presented may be based on the nature of suspected tampering detected.

An exemplary embodiment provides that when an EPP (such as version EPP4) is used for both clear data entry mode and pin entry mode, then the EPP does not get enabled for clear data entry mode when the display says "Please Enter Your PIN". This enables an EPP to be a tamper evident and tamper responsive module. The EPP (e.g., EPP4) knows when its keys are enabled for clear data entry mode and when its keys are enabled for PIN entry mode. That is, the EPP knows its status. In the exemplary embodiment the EPP can visually translate its status information to the machine user via an electronic ink display. Thus, a user can be warned against entering PIN data while the EPP is not in the encryption mode.

FIG. 120 shows an exemplary arrangement 900 of automated banking machine components and their interface connections. The components can be those of an ATM. The arrangement includes a processor 902, a main (conventional) display unit 904, an EPP 906, a card reader 908, and an electronic ink display 910. The processor 902 can be connected to the main display 904 via a video interface 912. The processor 902 can be in communication with the EPP 906 via a RS-232 or USB interface 914. The processor 902 can be in communication with the card reader 908 via a RS-232 or USB interface 916. The processor 902 can be in communication with the electronic ink display 910 via a video interface or a parallel, serial, or USB interface 918. The EPP 906 can be in communication with the electronic ink display 910 via a controlling interface 920, such as I/O, serial, or parallel interface. The card reader 908 can be in communication with the electronic ink display 910 via a controlling interface 922, such as an I/O, serial, or parallel interface.

A warning label can comprise a paper thin electronic ink display module. The exemplary EPP can operate in clear data entry mode and PIN data entry mode. In clear data entry mode the does not encrypt the inputted data. In PIN data entry mode the inputted data is encrypted.

When the EPP keyboard is enabled for clear data entry mode, it provides a signal to the display module that it is in clear data entry mode. The electronic ink display module upon receiving the signal disables external display updates (if necessary) and displays a simple text warning message like "Wait—Do Not Enter Your PIN". As previously discussed, a displayed message may be presented in a manner that attracts the user's attention. For example, the warning message could be of a conspicuous color and continually flashed or blinked.

It should be understood that in other steps in a transaction (such as after the PIN has already been properly received and the user is authorized to conduct a transaction) the EPP keyboard can be in clear data entry mode to receive dollar entry data or other information entry data.

When the EPP keyboard is enabled for PIN data entry mode (or another data entry mode such as DES key), it provides a unique signal to the electronic ink display module that it is in PIN data entry mode. The unique signal is different than the signal sent in the clear data entry mode. The electronic ink display module upon receiving the signal disables or removes external display updates (if necessary) and displays a simple text message like "Please Enter Your PIN".

Following successful PIN entry the EPP encryption mode can be changed to non encryption mode for receiving inputted numeric data, such as a cash withdrawal dollar amount. When the encryption feature of the EPP becomes disabled (e.g., not in encryption mode) it sends a signal to the electronic ink display module indicating that its keyboard is now disabled and that the display module can now be used for displaying external data messages other than those related to EPP encryption status.

The EPP and electronic ink display module can monitor the control interface to determine tampering (e.g., cutting) of the connection lines. Upon detection of suspected tampering of the control interface, the EPP can disable the keyboard until the control interface is restored and authenticated. Upon detection of suspected tampering of the control interface, the display module can disable all external display updates and present a screen such as "Danger—Tampering Detected—Do Not Use ATM". That is, the display module upon detecting suspected tampering can switch to a warning display. The warning display may be programmed into the display module as a default display. Thus, the arrangement enables a displayed message to be directly related to the status of the EPP.

Suspected tampering can also be monitored with respect to the card reader. For example, tampering may be suspected when the card reader does not sense or detect input of a card after a predetermined time interval following an ATM display that requested card insertion. As previously discussed, suspected tampering in such a situation may occur when an unauthorized card reader is illegally placed before an ATM's card reader. Upon a determination (or suspicion) of tampering by unauthorized card reading, an electronic ink display module can again present a danger screen such as "Danger—Tampering Detected—Do Not Use ATM". FIG. 121 shows an electronic ink display module 930 presenting a "danger" message. The display module can comprise one of the electronic ink display labels shown in FIG. 119, such as label 866 or 882.

As shown in FIG. 120, automated banking machine components can be arranged with an electronic ink display 910 to provide enhanced safety to a user of an automated banking machine. As previously discussed, an electronic ink display 910 can be in operative connection with both an encryption pin pad 906 and a card reader 908. The electronic ink display 910 can be linked to the EPP 906 to visually inform a machine user when and when not to enter their PIN. The electronic ink display 910 can also be in communication with the EPP 906 to warn a machine user of a potentially non secured system due to suspected tampering, as previously discussed. Likewise, the electronic ink display 910 can be linked to the card reader 908 to warn a machine user of suspected card path tampering, as previously discussed. The ability to directly communicate the display 910 with both the EPP 906 and the card reader 908 provides backup security. For example, if the interfaces 914, 916, 918 with the processor 902 become compromised, the arrangement still enables a machine user to be notified of suspected tampering.

Visual secrecy is of concern to users of ATMs and other self service terminals (SSTs). People are concerned with other people behind them (in line) having visual access to their personal data that is displayed on an electronic viewing device, such as a display device (e.g., display screen or display panel).

In an exemplary arrangement the display device is of a configuration to enhance the privacy of the machine user. Thus, the anti-fraud display device can enhance security. In an exemplary embodiment at least a portion of the viewable display area (e.g., display screen or display panel) is curved. The curved display screen may also be a curved touch screen. By mounting the display device with a concave curvature (with respect to the user), sensitive information (e.g., account numbers, balances, amounts requested, etc.) are less likely to be visible to another person (e.g., a "shoulder-surfer"). Thus, the information displayed can be more privately viewable to the legitimate user and sufficiently obscured to an illegitimate viewer.

The novel display device may require a legitimate viewer to turn their head in order to see the entire information displayed. However, an illegitimate viewer would be required to significantly alter their physical position in order to see the entire information displayed. For example, an unscrupulous shoulder-surfing viewer would have to physically move so they can peer over the legitimate viewer's opposite shoulders. The need for obvious movement will discourage illegitimate viewers from seeing the personal information. Regardless, the need for movement by the illegitimate viewer would alert the legitimate user of the illegitimate activity. Likewise, a person attempting to improperly view a screen through a telescope or similar device, or through a camera would generally encounter difficulty viewing all displays and user inputs.

A display device may be fabricated using liquid crystal display (LCD) materials, thin film transistors (TFTs), light emitting diodes (LEDs), organic light emitting diodes (OLEDs), a flexible organic light emitting device (FOLED), electroluminescent (EL) materials, organic electroluminescent (OEL) materials, up and down converting phosphor (U/DCP), electrophoretic (EP) materials, electronic paper (e-paper) (e.g., eINK, Smart Paper™, APD™, etc.), low-temperature polysilicon (LTPS), and/or light emitting polymers (LEPs). Directing the molecular action of crystalline materials that have the properties of both liquids and solids may also be used in fabricating displays. Cholesteric LCDs, nematic LCDs, and polymer-dispersion liquid-crystal (PDLC) technology can likewise be used in a display structure. Flexible paper may also be used. It should be understood that different combinations of materials and structures may be used to produce different display devices. The use of electronic ink display devices has previously been discussed.

In an exemplary embodiment the display panel comprises at least a substrate and a backplane. The backplane can form the electrical interconnection of the display. The backplane may comprise electrodes, capacitors, and transistors. A frontplane (e.g., reflective electronic ink) can also be used.

Display panels may be comprised of active matrix or passive matrix panels. Active matrix panels and passive matrix panels may be either transmissive or reflective. Transmissive displays may include polysilicon thin-film transistor (TFT) displays and high-resolution polysilicon displays. Reflective displays may comprise single crystal silicon integrated circuit substrates that have reflective pixels.

In a passive matrix display, all of the active electronics (e.g., transistors) can be arranged outside of the display screen. For example, LCDs may have a passive matrix backplane with two planes of strip electrodes which sandwich the liquid crystal material.

In an active matrix display, the active electronics can be built into each pixel within the screen. For instance, TFTs can be co-located with the LCD pixels in the backplane.

In an exemplary embodiment the novel curved display device is also flexible, e.g., the display comprises a flexible display screen or panel. It should also be understood that "flexible" displays also include foldable, bendable, malleable, and rollable displays. For example, in an exemplary embodiment, a flexible display can be bent to form a curve with a radius of curvature of about 20 centimeters. In another example, a flexible display is deformable. The deformable display can be bent at least once so that it can be put on or fitted to a curved surface. The flexible display structure may be arranged to permit the display to be repeatedly bent into different shapes to correspondingly fit different shaped surfaces. Alternatively, a flexible display structure may be arranged so that the display can only be bent (shaped) once, followed by maintained rigidity. A curved flexible display screen can be of the non touch type or of the touch screen type.

A flexible substrate can be made from plastic, fabric, metal, and/or some other suitable materials. For example, a flexible substrate can be made out of a flexible polymer material. A flexible backplane can be a TFT backplane residing on flexible plastic. Also, the flexible substrate may include the backplane. Plastic can be transparent, and metal can be a reflective metal foil.

A flexible display may comprise a full color LCD or OLED with a polymer and/or metal-foil substrate with a printable TFT backplane. The flexible plastic or polymer OLED may be of a transparent and/or stackable design. The TFT may include amorphous silicon or polysilicon. The TFT may be fabricated directly on plastic. Organic transistor materials may be used for TFTs. Plastic transistors can be printed on plastic surfaces.

Transparent moisture barriers or protective films may also be used, such as inorganic barrier coatings and/or alternating layers of polymer and ceramic thin films deposited on a plastic substrate or directly on a display.

It should be understood that different combinations of materials, structures and components may be used to produce different flexible displays. For example, a flexible display may comprise a flexible OLED formed on a TFT array. Another flexible display may comprise a flexible active matrix LTPS TFT LCD with a super video graphics array (SVGA).

Figure 122:
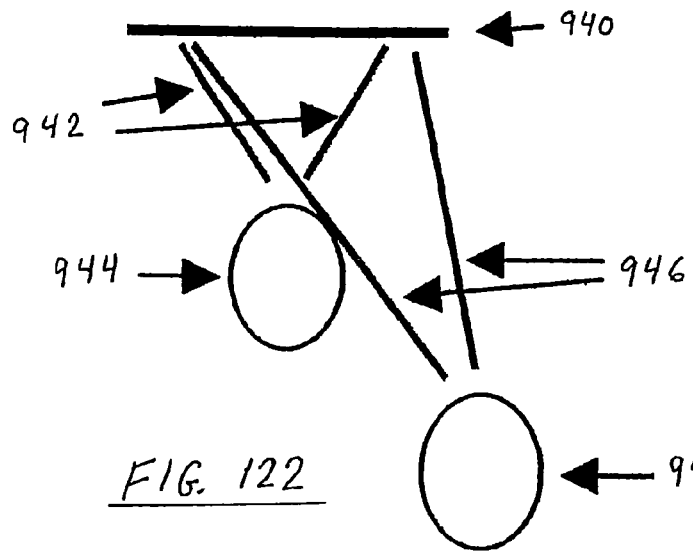
FIG. 122 shows a display arrangement having a flat display panel.

FIG. 122 shows a top view of a display arrangement for an ATM. The substantially flat display device 940 of FIG. 122 provides a full field of vision 942 to the ATM user 944. That is, the display 940 provides a legitimate field of vision 942 to the legitimate viewer 944. Unfortunately, the display 940 also provides an illegitimate full field of vision 946 to an illegitimate viewer 948, such as a shoulder-surfing person located in a line behind the ATM user 944. Because of the flat display panel (e.g., display screen) configuration, the field of vision is relatively independent of the (lateral) physical standing location of the viewer. That is, the illegitimate viewer 948 does not have to physically relocate to another standing location in order to view (read) the content displayed on the display panel 940. Of course an illegitimate viewer 948 may have to turn their head to read the entire display.

Figure 123:
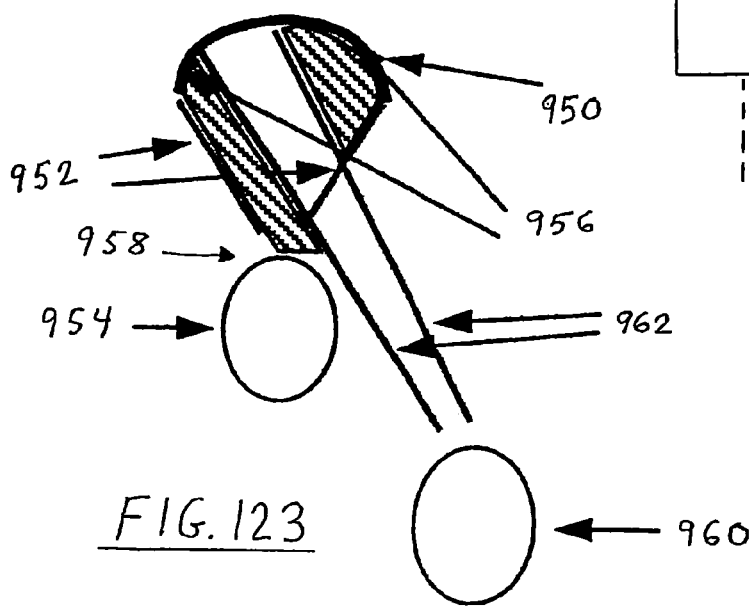
FIG. 123 shows a display arrangement having a curved display panel.

FIG. 123 shows a top view of a novel display arrangement for an ATM, e.g., ATM 858. The display arrangement can be part of a new ATM or an existing ATM can be retrofitted therewith. The display device 950 represents any of the previously discussed curved (or curvable) display device arrangements (including any combination of display device materials, elements, and/or components). In an exemplary embodiment the curved display device 950 is flexible. Because of the curved display panel configuration, the field of vision is relatively dependent on the (lateral) physical standing location of the viewer.

The curved display device 950 of FIG. 123 continues to provide a full field of vision 952 to the legitimate ATM user 954. In an exemplary embodiment the full field of vision 952 is only available at the viewing location 958 situated directly in front of the display 950 (i.e., the location of user 954). This location 958 being normally occupied by the user 954 operating the ATM. In an exemplary arrangement, the user at user location 958 can also provide input (e.g., insert card, press keys, etc.) to the ATM and receive other output (e.g., cash dispense) from the ATM. It should be understood that although a new standing location is not needed to view the entire display (and provide input and receive output), a legitimate viewer 954 may have to turn their head to read the entire display.

Because of the curvature of the display panel 950, a person 960 off-center from the display panel 950 will be unable to view the entire display. Thus, the curved display 950 prevents a full field of vision 952 to an illegitimate viewer 960. That is, the illegitimate viewer 960 can access only a limited or narrow field of vision 962 from their current standing location. At least a portion 956 of the display 950 would be hidden from the illegitimate viewer 960. The information displayed at panel surface 956 is obscured to the illegitimate viewer 960. The field of vision not available for reading to the illegitimate viewer 960 (i.e., the field of vision outside of the narrow field of vision 962) is shown in FIG. 123 as shaded. That is, the shaded area is available to the ATM user 954 for readable viewing, but unavailable to the illegitimate viewer 960. The unavailable field of vision corresponds to the hidden portion 956 of the display 950. The shaded area represents the legitimate viewer's full field of vision minus the illegitimate viewer's field of vision. The shaded area represents the additional display surface area that can be visibly accessed by the legitimate ATM user 954.

The curvature of the display device causes a person 960 located in line behind the ATM user 954 to be limited to viewing/reading only a portion of the total display. Because of the curvature of the display panel/screen 950, the illegitimate viewer 960 would have to physically relocate to at least one other standing location in order to view (read) the rest of the display. In the exemplary embodiment the illegitimate viewer 960 would have to physically relocate to the other side of the ATM user 954 in order to be able to read the other side of the display. That is, the illegitimate viewer 960, shown in FIG. 123 as located being behind and to the right of the ATM user 954, can only view information on the left side of the display panel 950. The illegitimate viewer 960 would need to relocate to the left side of the ATM user 954 in order to view information on the right side of the display panel 950. Still, such a single relocation would likely encounter some hidden field of vision. Furthermore, the information currently displayed could change before relocation. Thus, a shoulder surfer (even with relocation) would have difficulty reading all of the displayed information that is easily available at the ATM user's single viewing location.

The flexibility of the display panel 950 enables it to be automatically rearranged or reconfigured to suit the current ATM user 954. For example, ATM users who prefer the greatest security may prefer that the ATM display panel present the narrowest display (i.e., a relatively narrow radius of curvature). Alternatively, other users who like to stand further away from an ATM during operation thereof may prefer to have the display panel of a flatter curvature (i.e., a relatively small radius of curvature). With a narrow display in comparison to having a relatively flat display (e.g., no curvature or flexing), the display panel's vertical sides (or ends) would be closer to each other. That is, the vertically directed (right and left side) edges are moved in a horizontal direction. In an exemplary embodiment with side flexing, the spacing between the top and bottom horizontal edges of the display panel could remain substantially the same.

In alternative arrangements, the top/bottom edges of a display panel can also be flexed (in a downward/upward turning direction). That is, the horizontally directed (upper and lower) edges can be moved in a vertical direction. Therefore, two-way flexing (horizontal and vertical) can occur in a single flexible display panel. The curving of the flexible display in a vertical direction can prevent an illegitimate viewer from viewing all of the displayed information. For example, the illegitimate viewer may only be able to view a lower portion (or upper portion) of the screen. The amount (angle) of flexing a display in the vertical direction can be dependent on the height of the ATM user. The angle can be predetermined to enable the ATM user to view the full field of vision but prevent others from viewing the entire screen. As discussed in more detail hereinafter, data provided by an ATM user can be used by the machine to adjust (or flex) the display panel to that specific user's desired display panel configuration settings.

A display panel moving (or flexing) device can be used to change the orientation (e.g., field of view) of the display panel. The moving device is operative to change the radius or angle of curvature of the flexible display panel, such as between zero (flat) curvature and a greater curvature. The moving device is also operative to change (e.g., raise or lower) the vertical elevation of the entire display panel. The change in display elevation can be dependent on the height of the current machine user.

In an exemplary embodiment an ATM flexible display panel can be moved in several different directions. For example, the vertical elevation of the entire display can be adjusted (raised or lowered); the vertical sides of the display can be (horizontally) adjusted to change curvature; and the horizontal (upper and lower) edges of the display can be (vertically) adjusted to change curvature. The entire display can also be moved in a horizontal direction. The ability to move the entire display vertically and horizontally enables the display and its moving device to be used with different types of fascia arrangements and display openings, including retrofitted ATMs.

Figure 124:
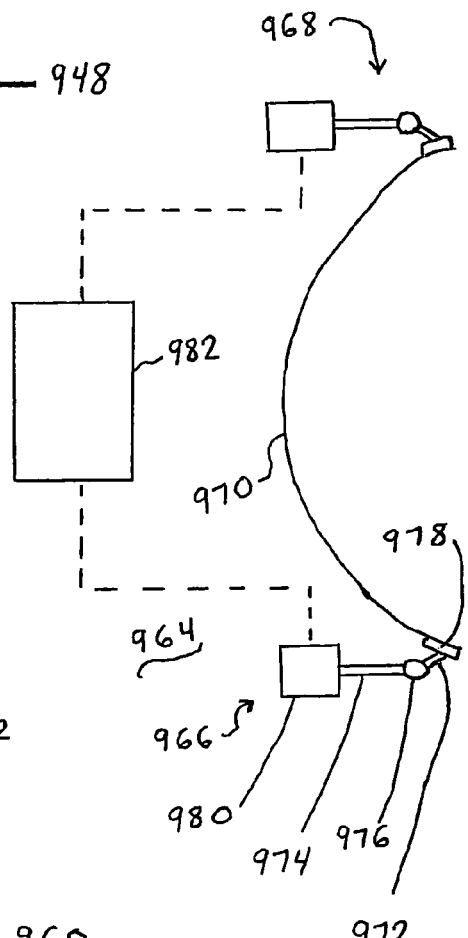
FIG. 124 shows a flexible display panel moving device arrangement.

FIG. 124 shows a top view of a moving device 964 adjacent a flexible display panel 970. The moving device 964 can comprise one or more drive segments 966, 968. The segments 966, 968 can be identical. Each segment can have one or more robotic control arms 974 and/or fingers 972. A finger 972 can be pivotally (or rotatably) coupled to an arm 974 via a pivotal (or rotatable) joint 976. An ATM computer 982 can instruct and control the moving device segments 966, 968

Each finger 972 can be engaged or connected to a curved flexible display panel 970 either directly or indirectly via separate and spaced connectors 978 (e.g., plate members). Alternatively, a plate member 978 may extend vertically along the entire (vertical) length of a display panel. Actuation movement of an arm 974 can cause the area of the display panel 970 connected to the finger 972 to move. The arms 974 can be driven (extended and retracted) in a housing 980 in a known manner (e.g., mechanically, pneumatically, electrically, etc.). An arm actuator (e.g., motor) can be in the housing. Plate members 978 located at the two outermost end portions of the curved panel 970 can be moved toward or away from each other. Thus, movement of a finger 972 operatively attached to a plate member 978 can cause the radius of curvature of the curved panel 970 to be changed. The movement of a finger can be physically controlled (via a computer) so that it can be pivoted at a specific predetermined angle relative to its arm (and/or to the display panel). Alternatively, in other arrangements a finger may be structurally connected to its arm in a manner (e.g., a ball joint) that enables the finger to freely pivot relative to its arm. Robotic movement of arms and fingers is well known and need not be discussed in further detail herein.

It should be understood that the moving device 964 is exemplary. Other moving device arrangements, connections, and operations can be used to cause flexing of a flexible display panel. For example, a moving device can comprise a non-mechanical panel-moving arrangement. Fluid (e.g., air and/or liquid) pressure can be used to cause flexing or bending of the display panel. A pressure force can act directly against the outermost end portion surfaces to cause the radius of curvature of a flexible panel to be changed.

Figure 127:
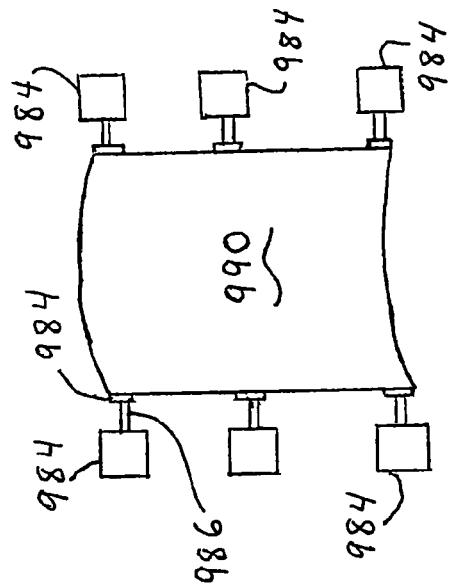
FIG. 127 shows a flexible display panel moving device with plural drive components.
Figure 126:
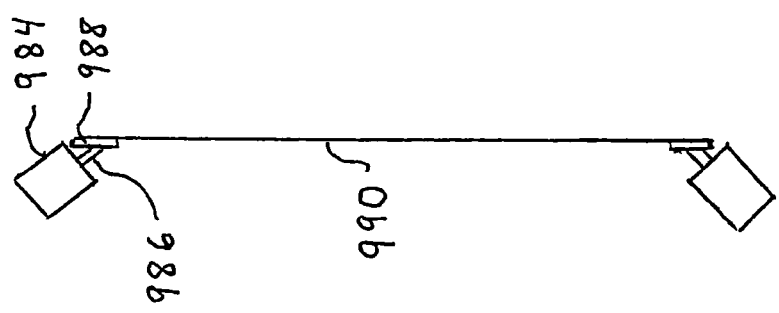
FIG. 126 shows a flexible display panel in a straight orientation.
Figure 125:
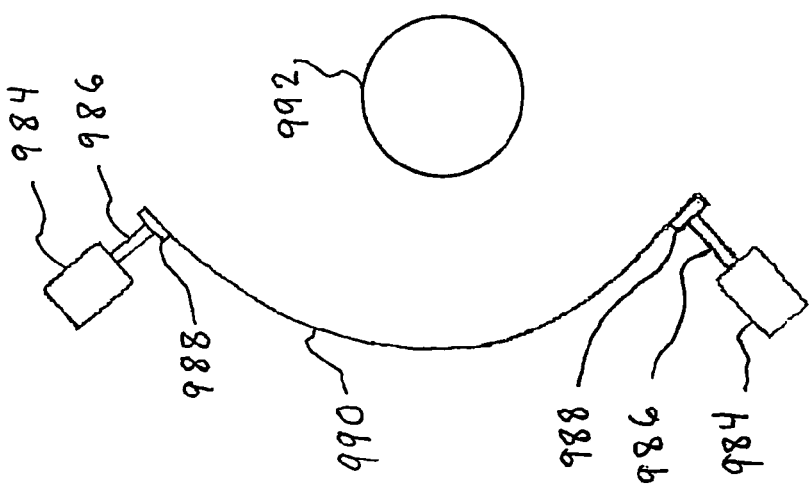
FIG. 125 shows a flexible display panel in a curved orientation.

FIGS. 125, 126, and 127 show an alternative display panel actuation arrangement. Drivers 984 are operative to drive arms 986 (e.g., pistons). The arms 986 are connected to a display panel 990 via joint connectors 988. The connectors can be removably fixed to the display panel. The connectors 988 can move (pivot or rotate) relative to the arms 986. The allowed movement (or play) between the arms and connectors enables the display panel to be arranged (configured) between a curved display (when the arms are extended) and a flat display (when the arms are fully retracted).

FIG. 125 shows a top view of the ATM display panel 990 when it is flexed (e.g., flexed mode). An ATM user 992 is also shown. FIG. 126 shows a top view of the display panel 990 when it is in a straight or flat display mode (e.g., isn't being flexed). FIG. 127 shows a front angled view of the display panel 990 while in the flexed mode of FIG. 125. FIG. 127 also shows a plurality of sets of drivers 984, arms 986, and connectors 988 arranged vertically along the panel sides. As previously discussed, a single connector (arranged with plural arms and actuators) can be located along the entire length of each side instead of several separated connectors. Likewise, a display panel can be arranged with only a single set (one driver, one arm, and one connector) for each side. The size of a display screen can be factor in determining how its panel driving components are to be arranged.

It should be understood that FIGS. 125 and 126 can also represent side views of a display panel that has vertical flexing ability. The upper and lower edges can be moved toward or away from each other in a vertical (up or down) direction. One or more sets of drivers, arms, and connections can be arranged along the upper and lower edges to cause the vertical flexing.

A moving device is operative to reconfigure a flexible display panel to a plurality of predetermined configurations. The configuration can be determined based on identifying information or other data provided by the current ATM user. For example, the user's ATM card can contain data corresponding to the user's desired display panel configuration settings. The preferred (or predetermined) settings may also be obtained via a user's PIN, card number, account number, or other manner of user identification. A card reader can read the user's card to enable a computer to obtain the preferred settings for that particular user. For example, the read PIN can be compared to a database of settings to obtain the setting assigned to that particular PIN. Thus, a display panel's configuration can be changed to correspond to (or be based on) the current ATM user's identity or other data. Other user inputs can also be used to determine the display screen settings for that user, e.g., one or more of a fingerprint, iris scan, voice pattern, facial recognition, RFID, telephone call/signal, PDA signal, code, etc.

An ATM computer can control the moving device segments 966, 968 to move their arms/fingers to the positions corresponding to the obtained configuration settings. The moving device flexes the display panel to achieve the configuration corresponding to the user's ATM card (and/or another user input). Thus, the selected configuration and position of the flexible display panel can be dependent on the ATM user. That is, modification of the display configuration can be responsive to input received from the ATM user.

In other display arrangements the full display panel or screen may not be used to present the actual true display. Simultaneous different displays could be shown at different portions of the display panel to confuse and discourage potential illegitimate viewers. The active display (the one that causes the machine to respond to user input) can contain predetermined user-chosen data (e.g., a name, number, color, symbol, code, etc.) that can be recognized by the user. The simultaneous displays can also be rearranged or reshuffled on the display panel based upon other factors (e.g., time, selective user input, hot key, etc.). The active display screen can also follow a display pattern chosen by the ATM user. The same display pattern or sequence can be carried out for the recognized user. In still other display arrangements only a small portion of the display screen may be used to present the single active display. That is, the remainder of the screen can remain empty. Again, the transaction display can be relocated to different areas on the screen based on factors such as time. The ability of displays involving a single ATM transaction to be moved from one side (left/right or upper/lower) of a display panel to the other side also hinders illicit viewing. The horizontal flexing movement (and/or vertical movement) of the side edges (and/or top/bottom edges) of a display panel can be used in conjunction with relocating the active display. An ATM computer can control the presentation and location of displays on the screen.

Figure 128:
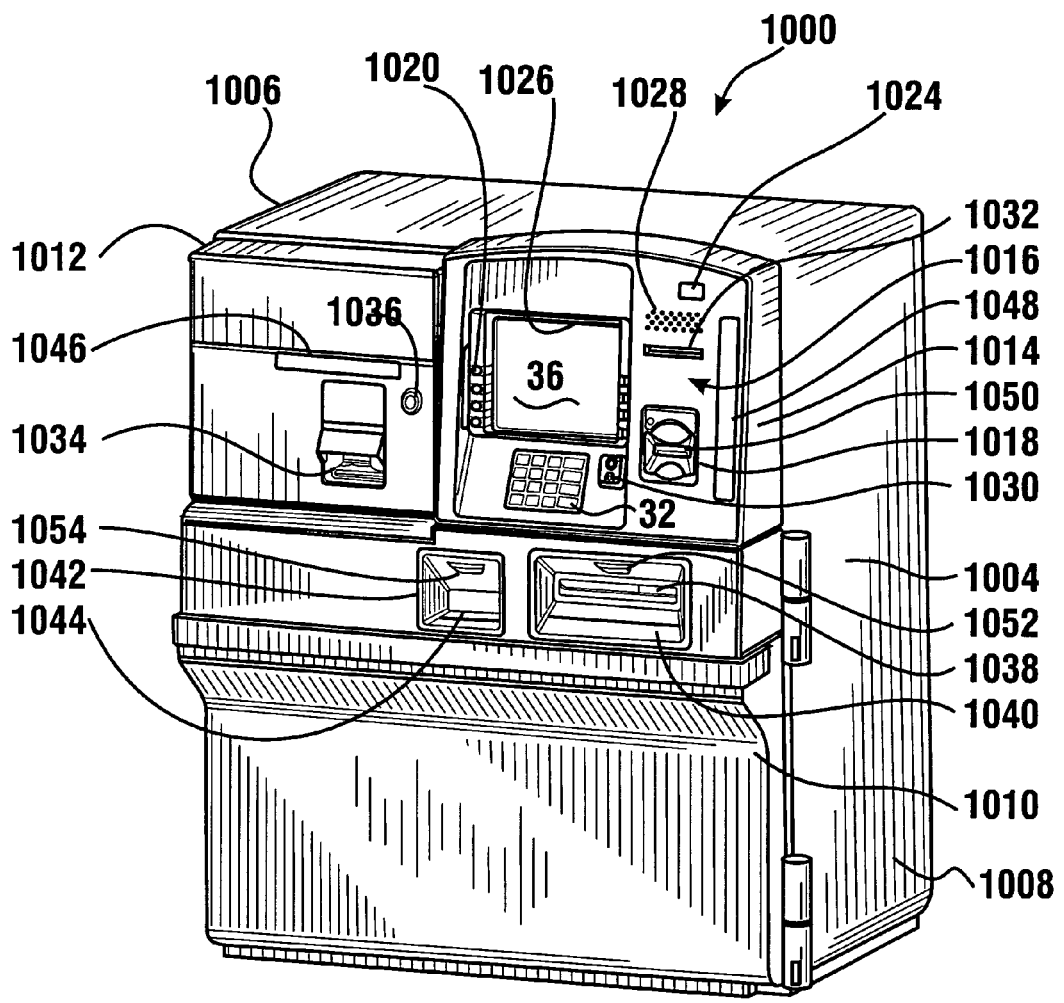
FIG. 128 shows an ATM including a flexible display panel.

FIG. 128 shows an angled front view of a cash dispensing automated banking machine (e.g., ATM) with a flexible display arrangement. The ATM 1000 includes a flexible display panel 1002. The flexible display panel 1002 can comprise both an output (e.g., as a display device) and an input (e.g., as a touch screen) transaction function device. The flexible panel 1002 can be similar to the display panel 970 shown in FIG. 124 and the display panel 990 shown in FIGS. 125, 126, and 127. The ATM 1000 is also shown in FIG. 128 as including a housing 1004, upper housing area 1006, lower chest area 1008, chest door 1010, fascia portions 1012, 1014, and a user interface 1016. The user interface 1016 can include the display panel 1002, card reader slot 1018, function keys 1020 (i.e., an input device), keypad 1022 (i.e., an input device), camera 1024, fascia opening 1026, speaker/microphone 1028, headphone jack 1030 (i.e., an output device), receipt delivery slot 1032, deposit envelope providing opening 1034, dispensed item (e.g., currency) delivery area 1038, recessed pocket 1040, deposit acceptance area 1042, recessed pocket 1044, illumination panels 1046, 1048, illuminated card slot 1050, and windows 1052, 1054. A fascia lock 1036 is also shown.

Figure 129:
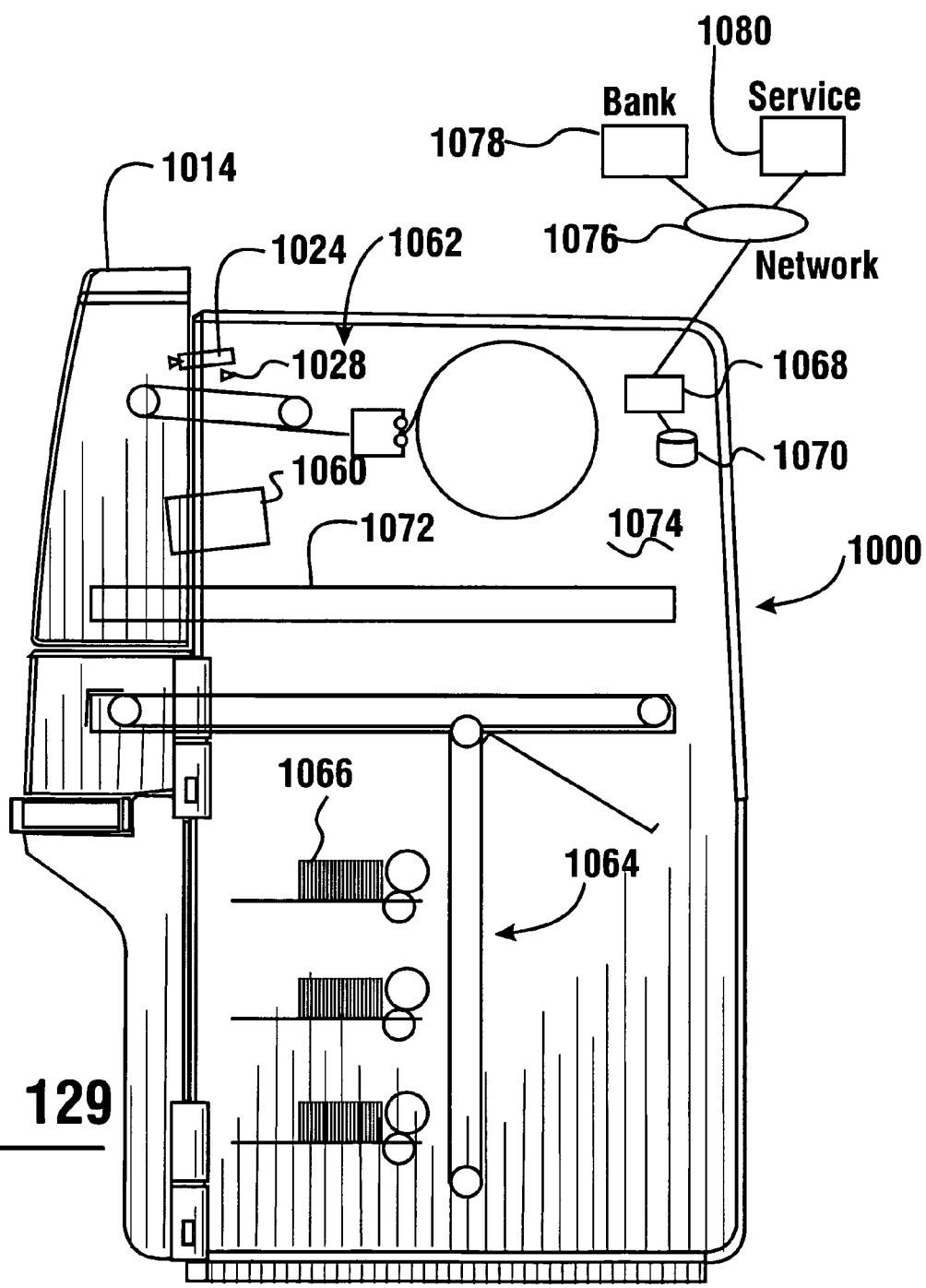
FIG. 129 shows an another view of the ATM in FIG. 128.

FIG. 129 shows cut away side view the ATM 1000. FIG. 129 likewise shows the fascia portion 1014, camera 1024, and speaker 1028. The ATM 1000 also includes transaction function devices, including a card reader 1060 (i.e., an input device), receipt printer 1062 (i.e., an output device), and a currency dispenser device 1064. The ATM 1000 further includes cash 1066, a machine controller 1068 (i.e., one or more computers), a data store 1070, and a rollout tray 1072. The rollout tray 1072 enables the fascia portion 1014 to be moved outward relative to the ATM housing, thereby providing access to an interior area 1074. The ATM can communicate through one or more networks 1076 (e.g., Internet) with a bank (host) computer 1078, a service provider computer 1080, and other computers in carrying out a financial transaction.

Thus the novel apparatus and method of the present invention achieves at least one of the above stated objectives, eliminates difficulties encountered in the use of prior devices and systems, solves problems and attains the desirable results described herein.

In the foregoing description certain terms have been used for brevity, clarity, and understanding. However no unnecessary limitations are to be implied therefrom because such terms are used for descriptive purposes and are intended to be broadly construed. Moreover the descriptions and illustrations given herein are by way of examples and the invention is not limited to the exact details shown and described.

In the following claims any feature described is a means for performing a function shall be construed as encompassing any means capable of performing the recited function known to those skilled in the art, and shall not be limited to the particular means shown in the foregoing description as performing the recited function or means merely equivalent thereto.

Having described the features, discoveries and principals of the invention, the manner in which it is constructed, operated and utilized, and the advantages and useful results attained; the new and useful structures, devices, elements, arrangements, parts, combinations, systems, equipment, operations, methods, and relationships are set forth in the appended claims.

We claim:

1. Apparatus comprising:
   a portable handheld terminal, including:
   a card reader, wherein the card reader is operative to read card data from at least one of a debit and a credit card, wherein the card data corresponds to a financial account;
   at least one processor, wherein the at least one processor is in operative connection with the card reader;
   at least one memory, wherein the at least one memory is in operative connection with the at least one processor, wherein the at least one processor is operative to cause data corresponding to the card data to be stored in the at least one memory;
   at least one manual input device, wherein the at least one manual input device is operative to receive at least one identifying input from a terminal user, wherein the at least one identifying input has a predetermined relationship with the card data;
   a wireless communication device, wherein the wireless communication device is in operative connection with the at least one processor;
   wherein the at least one processor is operative to cause the wireless communication device to wirelessly communicate with at least one remote computer, wherein the communication includes sending data corresponding to at least a portion of the card data and at least a portion of the at least one identifying input to the at least one remote computer, and wherein the at least one communication is operative to cause a transfer of funds at least one of to and from the financial account.

2. The apparatus according to claim 1 wherein the terminal further includes:
   a display, wherein the display is in operative connection with the at least one processor, and wherein the display is operative responsive to the at least one processor to output indicia corresponding to at least one account balance.

3. Apparatus comprising:
   a portable handheld terminal including:
   at least one memory, wherein the at least one memory includes data corresponding to card data, wherein the card data corresponds to at least one financial account;
   at least one processor, wherein the at least one processor is in operative connection with the at least one memory;
   at least one manual input device, wherein the at least one manual input device is in operative connection with the at least one processor;
   a wireless communication device, wherein the wireless communication device is in operative connection with the at least one processor;
   wherein the at least one processor is operative responsive to at least one input through the at least one manual input device to cause the terminal to communicate with at least one remote computer through operation of the wireless communication device, wherein the communication is operative to cause a financial transfer involving the at least one financial account.

4. The apparatus according to claim 3 wherein the terminal further includes:
   a card reader, wherein the card reader is in operative connection with the at least one processor, and wherein the card reader is operative to read the card data from at least one of a credit and debit card,
   and wherein the at least one processor is operative to cause the card data read through operation of the card reader to be stored in the at least one memory.

5. The apparatus according to claim 3 wherein the terminal comprises at least one of a personal digital assistant and a cell phone.

6. The apparatus according to claim 5 wherein the communication is operative to cause a transfer of funds at least one of to and from the at least one financial account.

7. The apparatus according to claim 5 wherein the communication is operative to cause data corresponding to a receipt for the transfer to be received by the terminal, and wherein the at least one processor is operative to cause data corresponding to the receipt to be stored in the at least one memory.

8. The apparatus according to claim 3 wherein the at least one memory includes data corresponding to a plurality of financial accounts;
   wherein the at least one manual input corresponds to one financial account;
   wherein the communication is operative to cause the financial transfer at least one of to and from the one financial account.

9. The apparatus according to claim 8 wherein the one financial account corresponds to a debit card account;
   wherein the at least one manual input corresponds to a personal identification number having a predetermined relationship to the card data corresponding to the debit card account;
   and wherein the wireless communication device is operative to communicate data corresponding to the card data corresponding to the debit card account and the personal identification number to the at least one remote computer.

10. The apparatus according to claim 9 wherein the communication is operative to cause funds to be transferred from the debit card account.

11. The apparatus according to claim 10 wherein the communication is operative to cause funds transferred from the debit card account to be transferred to another account.

12. The apparatus according to claim 10 wherein the communication is operative to cause an amount of funds to be transferred from the debit card account to the terminal.

13. The apparatus according to claim 12 wherein the at least one processor is operative to store data corresponding to the amount transferred to the terminal from the debit card account, in the at least one memory.

14. The apparatus according to claim 13 wherein the at least one manual input device is operative to receive at least one further input,
   wherein the at least one processor is operative responsive to the at least one further input to cause the wireless communication device to further wirelessly communicate with a merchant system, wherein the further communication is operative to cause a further transfer of at least a portion of the amount to the merchant system.

15. The apparatus according to claim 9 wherein the portable terminal includes a display, and wherein the display is in operative connection with the at least one processor, and wherein the display is operative responsive to operation of the processor to output indicia corresponding to at least one account balance.

16. The apparatus according to claim 3 wherein the communication is further operative to cause data corresponding to a receipt for the financial transfer to be received by the terminal, and wherein the at least one processor is operative to cause data corresponding to the receipt to be stored in the at least one memory.

17. The apparatus according to claim 3
wherein the at least one financial account comprises a first financial account,
  wherein the at least one memory includes data corresponding to the first financial account,
wherein the at least one manual input device is operative to receive a personal identification number (PIN),
  wherein the at least one manual input corresponds to a PIN having a predetermined relationship to the first financial account,
wherein the at least one processor is operative to cause the wireless communication device to communicate data corresponding to both the first financial account and the PIN to the at least one remote computer, to cause a financial transfer involving the first financial account.

18. The apparatus according to claim 3 wherein the at least one financial account comprises a first financial account, wherein the at least one memory stores a neutralizer code, wherein the neutralizer code is associated with an item purchased using the first financial account during an in-store self-service checkout transaction, wherein the neutralizer code is operative to neutralize an anti-theft RFID tag associated with the item.

19. The apparatus according to claim 3 wherein the at least one financial account comprises a first financial account, wherein the at least one memory stores a redeemable network code which corresponds to a cash amount transferred from the first financial account, wherein the network code is redeemable for a specific amount of cash at any of a plurality of ATMs in an ATM network.

20. The apparatus according to claim 3 wherein the at least one financial account comprises a first financial account, wherein the at least one memory stores ATM display panel settings data, wherein the settings data is readable by an ATM having a flexible display panel, wherein the settings data is operative to cause the ATM to change a radius of curvature of the flexible display panel to a configuration which corresponds to the settings data.

21. Apparatus comprising:
  a portable handheld terminal including:
    at least one input device, wherein the at least one input device is operative to receive card data corresponding to data included on at least one of a debit and credit card, wherein the card data corresponds to at least one financial account;
    at least one processor, wherein the at least one processor is in operative connection with the at least one input device;
    at least one memory, wherein the at least one memory is in operative connection with the at least one processor,
    a wireless communication device, wherein the wireless communication device is in operative connection with the at least one processor,
    wherein the at least one processor is operative to cause data corresponding to the card data to be stored in the at least one memory;
    and wherein the at least one processor is operative to cause the terminal to wirelessly communicate and to be in operative connection with at least one remote computer, wherein the communication includes communication of at least a portion of the card data from the terminal to the at least one remote computer, and wherein the communication is operative to cause a financial transfer at least one of to and from the financial account.

22. The apparatus according to claim 21 wherein the at least one input device includes a card reader, wherein the card reader is in operative connection with the at least one processor, and wherein the card reader is operative to read card data from the at least one debit card and credit card.

23. The apparatus according to claim 21 wherein the at least one input device includes at least one manual input device.

24. The apparatus according to claim 21 wherein the terminal comprises a cell phone.

\* \* \* \* \*